(12) United States Patent
Schnittman et al.

(10) Patent No.: US 10,991,108 B2
(45) Date of Patent: Apr. 27, 2021

(54) DENSELY COMPOSITING ANGULARLY SEPARATED SUB-SCENES

(71) Applicant: Owl Labs, Inc., Somerville, MA (US)

(72) Inventors: Mark Steven Schnittman, Somerville, MA (US); Maksim Makeev, Somerville, MA (US)

(73) Assignee: OWL LABS, INC, Somerville, MA (US)

( * ) Notice: Subject to any disclaimer, the term of this patent is extended or adjusted under 35 U.S.C. 154(b) by 385 days.

(21) Appl. No.: 15/088,644

(22) Filed: Apr. 1, 2016

(65) Prior Publication Data
US 2016/0295128 A1 Oct. 6, 2016

Related U.S. Application Data

(60) Provisional application No. 62/141,822, filed on Apr. 1, 2015.

(51) Int. Cl.
*H04N 5/262* (2006.01)
*H04N 5/265* (2006.01)
(Continued)

(52) U.S. Cl.
CPC ............ *G06T 7/33* (2017.01); *G06K 9/00228* (2013.01); *G06K 9/00255* (2013.01);
(Continued)

(58) Field of Classification Search
CPC ........ H04N 7/15; H04N 7/14; H04N 5/23238; H04N 5/265; H04N 7/142; H04N 7/147;
(Continued)

(56) References Cited

U.S. PATENT DOCUMENTS

| 2004/0008423 A1 | 1/2004 | Driscoll, Jr. et al. |
| 2004/0254982 A1 | 12/2004 | Hoffman et al. |

(Continued)

FOREIGN PATENT DOCUMENTS

| AU | 2016242980 B2 | 11/2019 |
| JP | H 5-122689 A | 10/1991 |

(Continued)

OTHER PUBLICATIONS

Notification of Transmittal of the International Search Report and the Written Opinion of the International Searching Authority, or the Declaration and the Written Opinion of the International Seaching Authority for International Patent Application No. PCT/US2016/025557 (Jul. 14, 2016).

(Continued)

*Primary Examiner* — Albert Kir
(74) *Attorney, Agent, or Firm* — Jenkins, Wilson, Taylor & Hunt P.A.

(57) ABSTRACT

A densely composited single camera signal may be formed from a panoramic video signal having an aspect ratio of substantially 2.4:1 or greater, captured from a wide camera. Two or more sub-scene video signals are subsampled at respective bearings of interest, and may be composited side-by-side to form a stage scene video signal having an aspect ratio of substantially 2:1 or less. 80% or more of the area of the stage scene video signal may be subsampled from the panoramic video signal.

18 Claims, 30 Drawing Sheets

(51) Int. Cl.
*H04N 5/268* (2006.01)
*G06T 7/33* (2017.01)
*H04N 7/18* (2006.01)
*G06K 9/00* (2006.01)
*G06T 3/40* (2006.01)
*H04N 7/14* (2006.01)
*G10L 21/028* (2013.01)
*G10L 25/57* (2013.01)
*H04N 5/232* (2006.01)

(52) U.S. Cl.
CPC .......... *G06T 3/4038* (2013.01); *G10L 21/028* (2013.01); *G10L 25/57* (2013.01); *H04N 7/142* (2013.01); *H04N 7/147* (2013.01); *H04N 7/18* (2013.01); *H04N 5/23238* (2013.01); *H04N 5/265* (2013.01)

(58) Field of Classification Search
CPC .. H04N 7/18; G06F 15/16; G06T 7/33; G06T 3/4038; G06K 9/00228; G06K 9/00255; G10L 21/028; G10L 25/57
USPC .................. 348/211.12, 14.08, 36, 360, 361; 709/204
See application file for complete search history.

(56) References Cited

U.S. PATENT DOCUMENTS

| | | |
|---|---|---|
| 2004/0263611 A1 | 12/2004 | Cutler |
| 2004/0263636 A1* | 12/2004 | Cutler .................. H04N 7/15 348/211.12 |
| 2005/0099492 A1* | 5/2005 | Orr .................... H04L 12/1827 348/14.08 |
| 2006/0164552 A1 | 7/2006 | Cutler |
| 2007/0263076 A1 | 11/2007 | Andrews et al. |
| 2007/0297682 A1 | 12/2007 | Zhang et al. |
| 2008/0218582 A1 | 9/2008 | Buckler |
| 2009/0002476 A1 | 1/2009 | Cutler |
| 2009/0079812 A1 | 3/2009 | Crenshaw et al. |
| 2009/0219387 A1 | 9/2009 | Marman et al. |
| 2010/0157016 A1 | 6/2010 | Sylvain |
| 2011/0033086 A1 | 2/2011 | Kubota |
| 2012/0154513 A1 | 6/2012 | Su |
| 2013/0271560 A1* | 10/2013 | Diao .................... H04N 7/15 348/14.08 |
| 2014/0114664 A1 | 4/2014 | Khan et al. |
| 2014/0233801 A1 | 8/2014 | Cho et al. |
| 2015/0304366 A1* | 10/2015 | Bader-Natal ........ H04L 65/1096 348/14.03 |
| 2015/0341719 A1 | 11/2015 | Sun |
| 2016/0150186 A1 | 5/2016 | Huber et al. |
| 2016/0292884 A1 | 10/2016 | Schnittman et al. |

FOREIGN PATENT DOCUMENTS

| | | | |
|---|---|---|---|
| JP | H 11-331827 A | | 5/1998 |
| JP | H10145763 A | | 5/1998 |
| JP | 2009182980 A | * | 8/2009 |
| JP | 2009182980 A | | 8/2009 |
| JP | 2012-099906 A | | 5/2012 |
| WO | WO 2014/178235 A1 | | 11/2014 |

OTHER PUBLICATIONS

Communication of European publication number and information on the applicaton of Article 67(3) EPC for European Patent Application Serial No. 16774312.9 (dated Jan. 10, 2018).

Non-Final Office Action for U.S. Appl. No. 15/088,664 (dated Sep. 14, 2018).

Examination Report No. 1 for Australian Patent Application Serial No. 2016242980 (dated Jul. 26, 2018).

Restriction Requirement for U.S. Appl. No. 15/088,664 (dated Mar. 28, 2018).

Final Office Action and Examiner-Initiated Interview Summary for U.S. Appl. No. 15/088,664 (dated Apr. 17, 2019).

Communication of the Extended European Search Report for European Patent Application Serial No. 16774312.9 (dated Nov. 28, 2018).

Notice of Allowance and Fee(s) Due for U.S. Appl. No. 15/088,664 (dated Dec. 3, 2019).

Letter Regarding Office Action for Israeli Patent Application Serial No. 254812 (dated Nov. 10, 2019).

Notification of the First Office Action for Chinese Patent Application Serial No. 201680031904.8 (dated Oct. 15, 2019).

Notice of acceptance for patent application for Australian Patent Application Serial No. 2016242980 (dated Jul. 26, 2019).

First Office Action for Japanese Patent Application Serial No. 2018-502621 (dated Mar. 17, 2020).

* cited by examiner

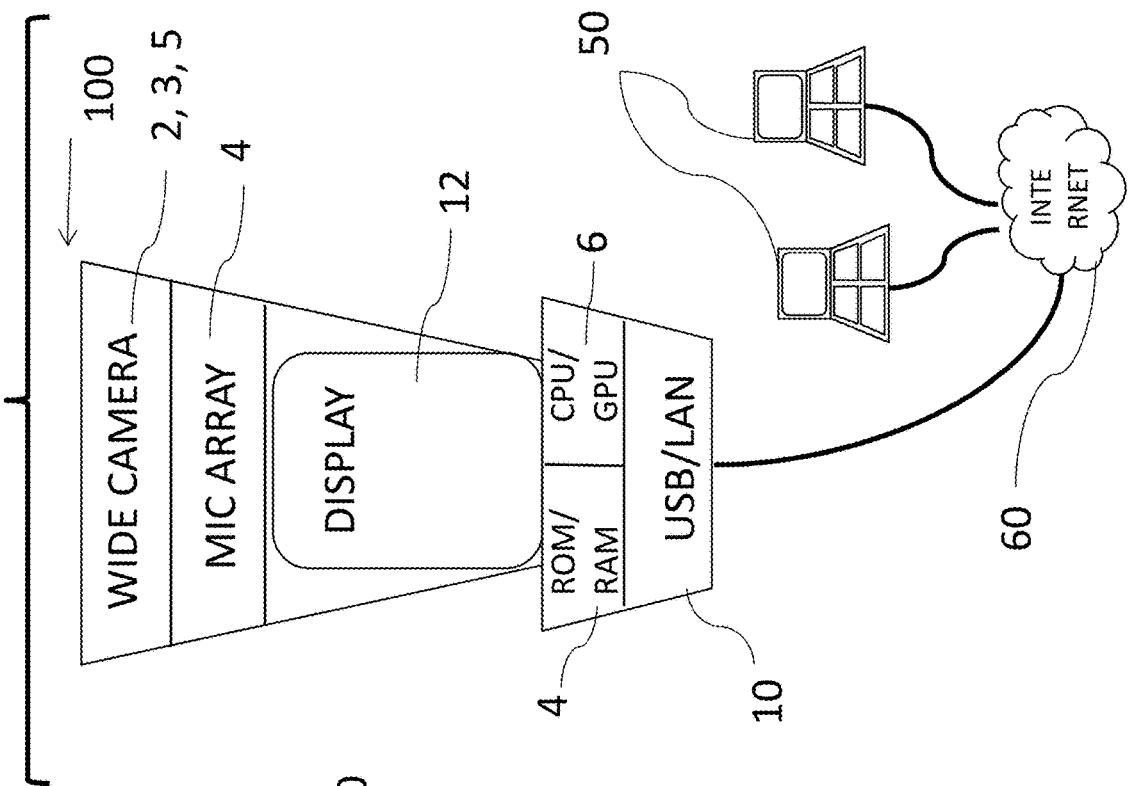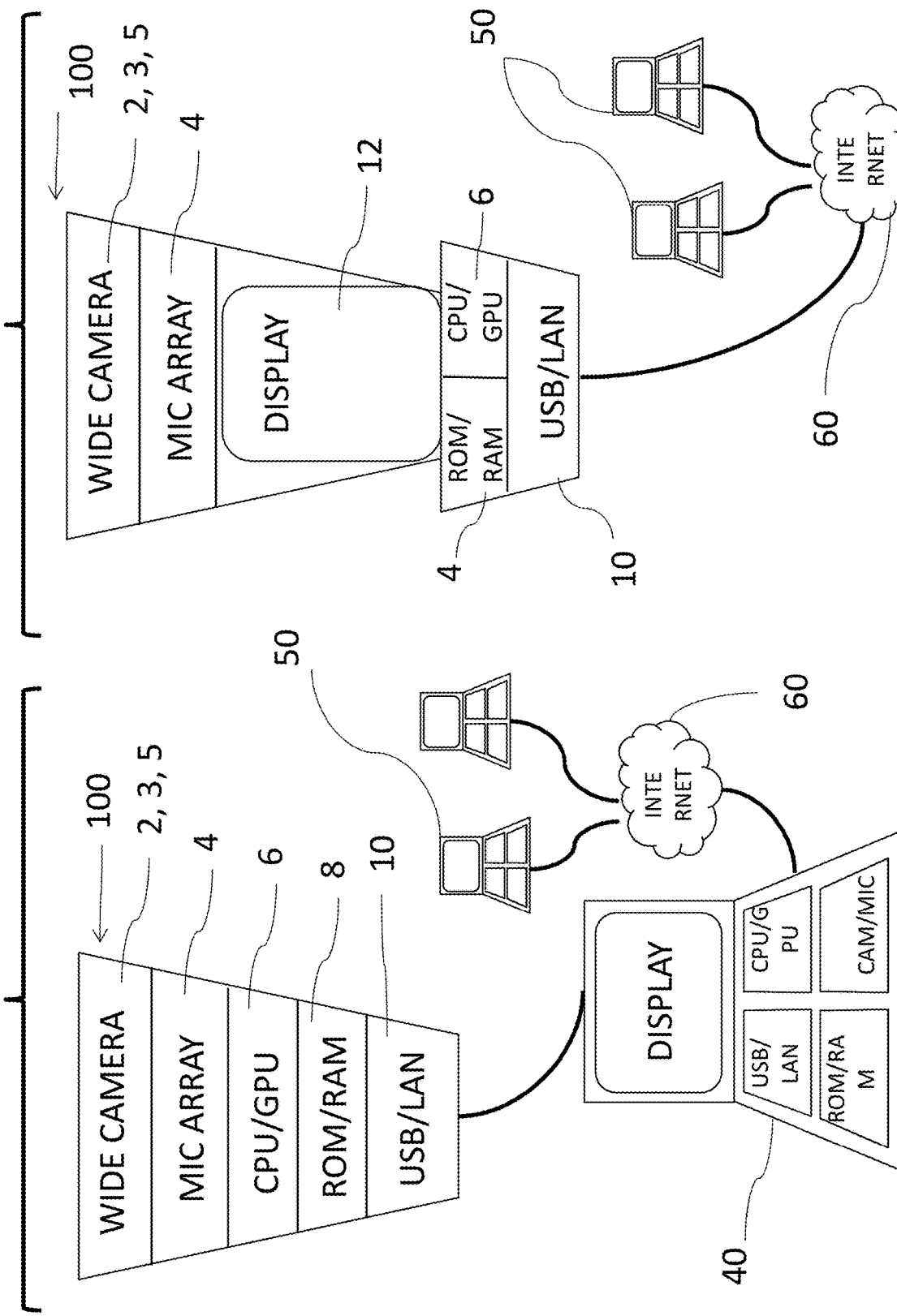

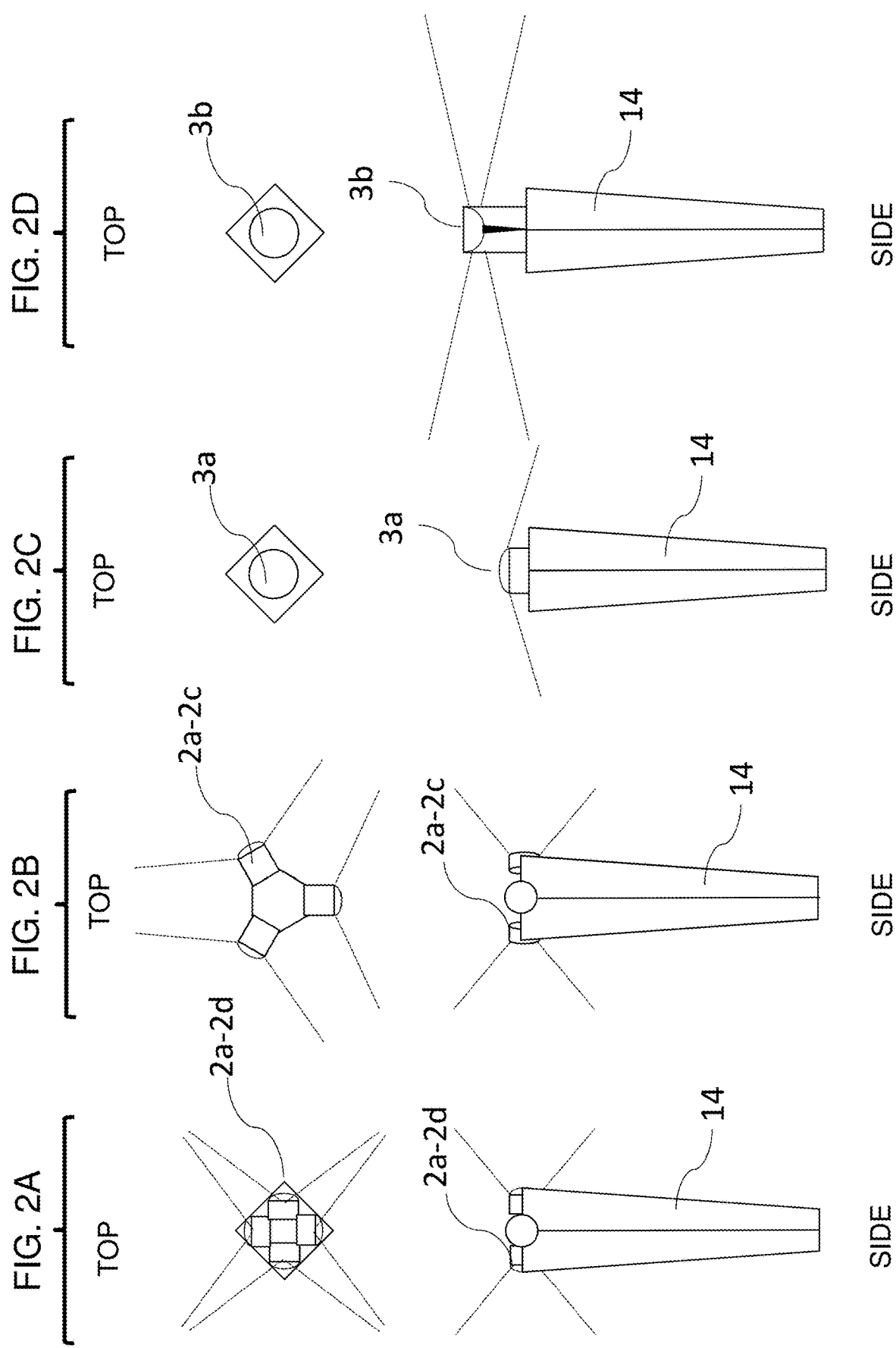

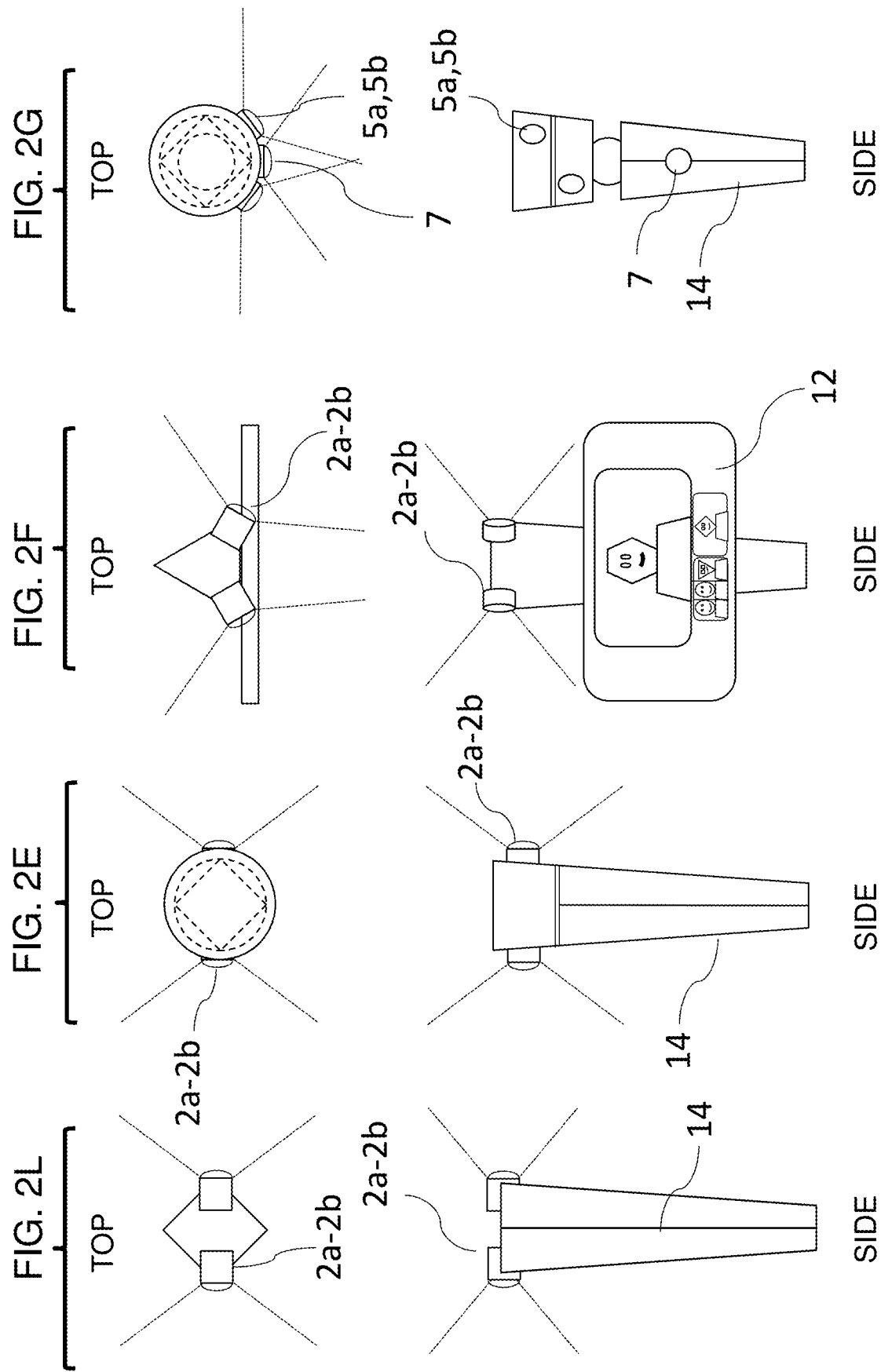

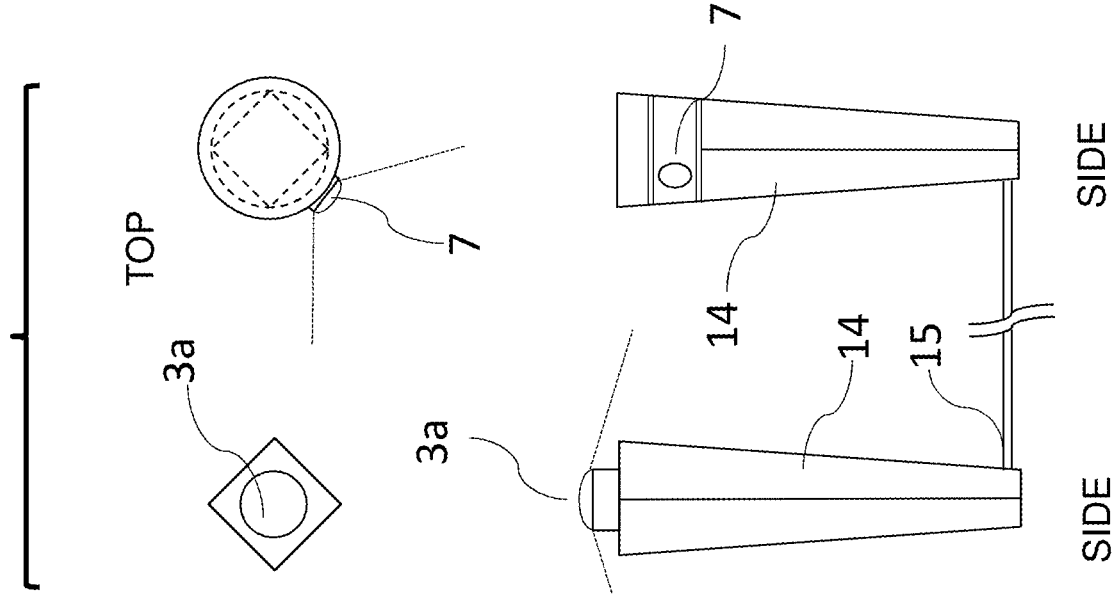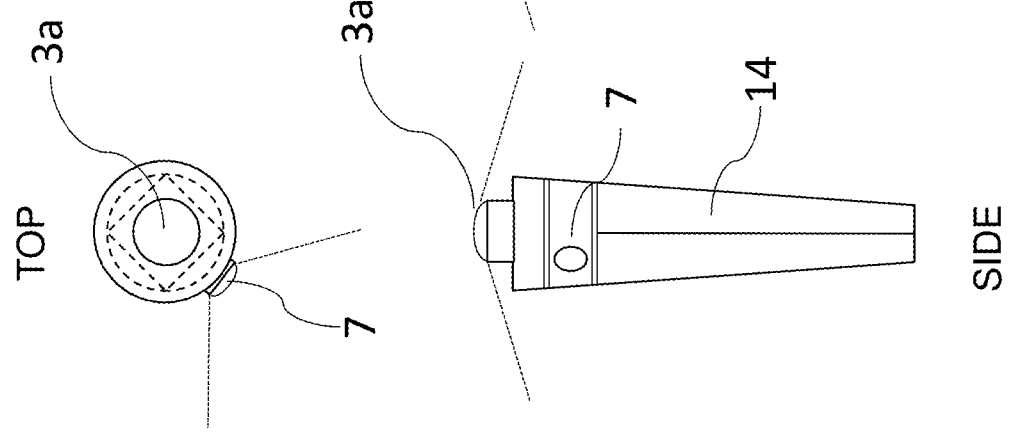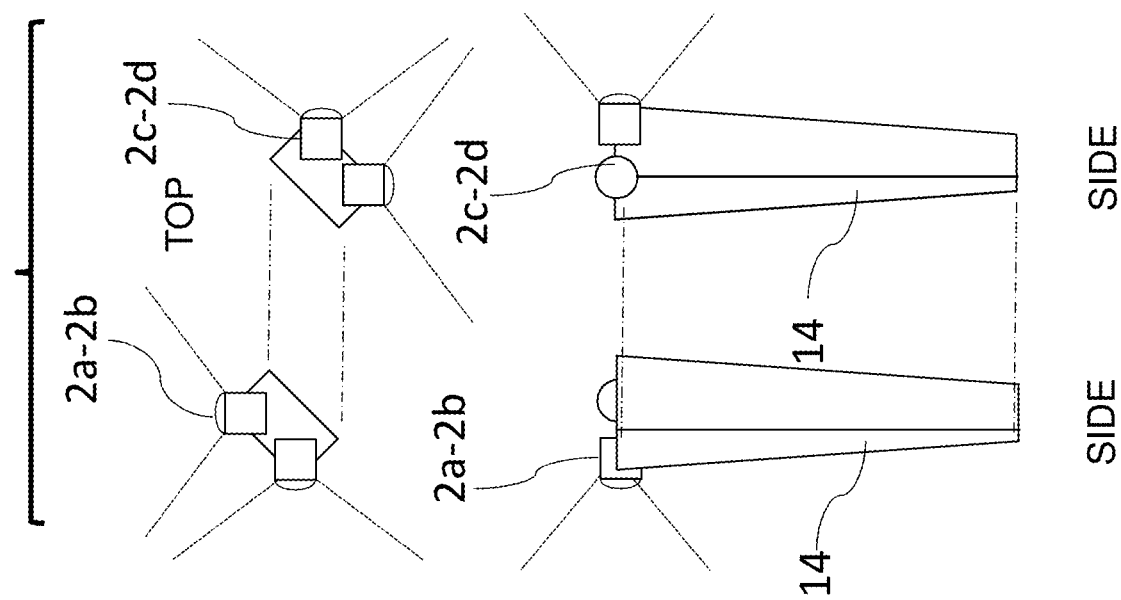

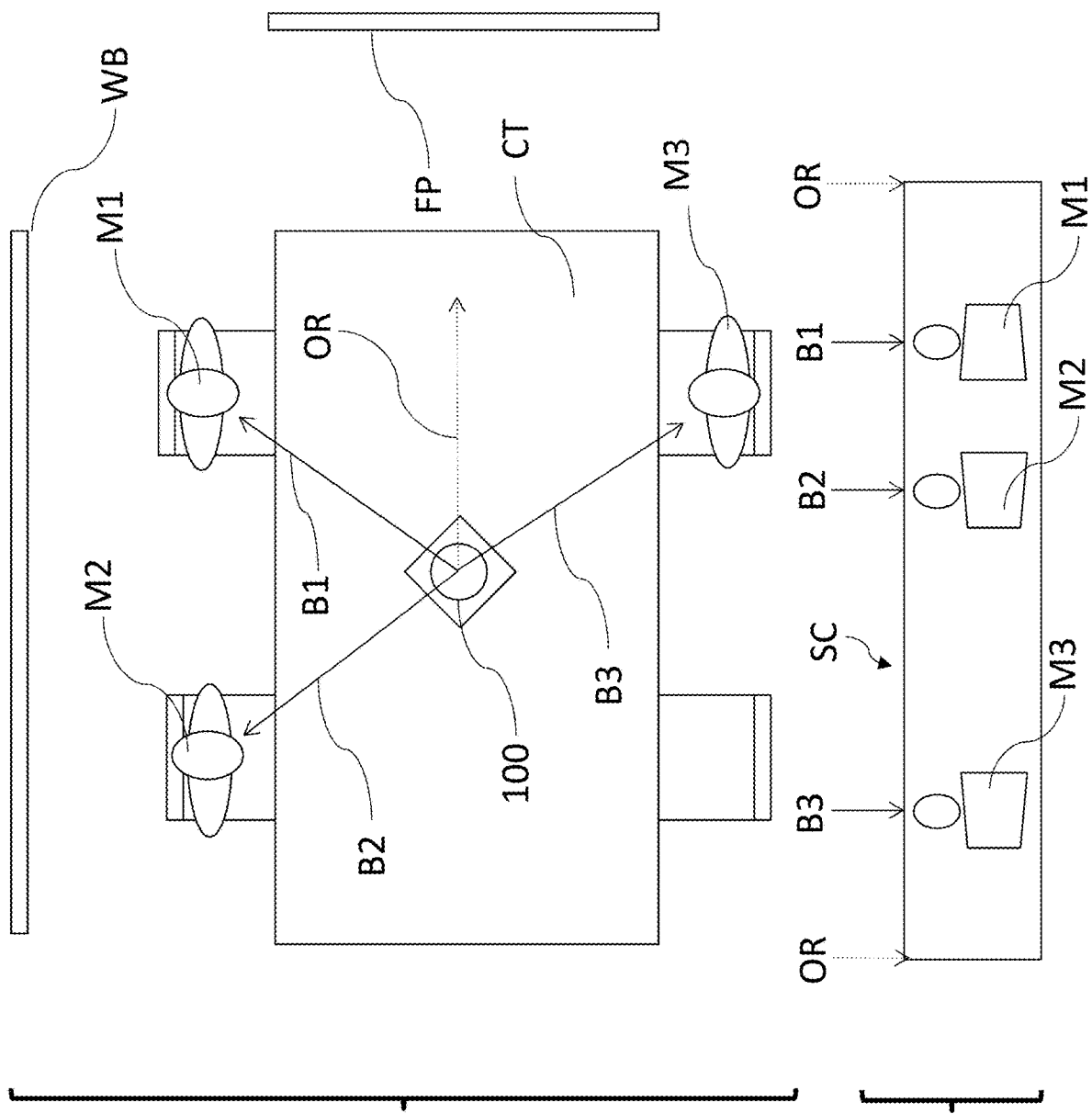

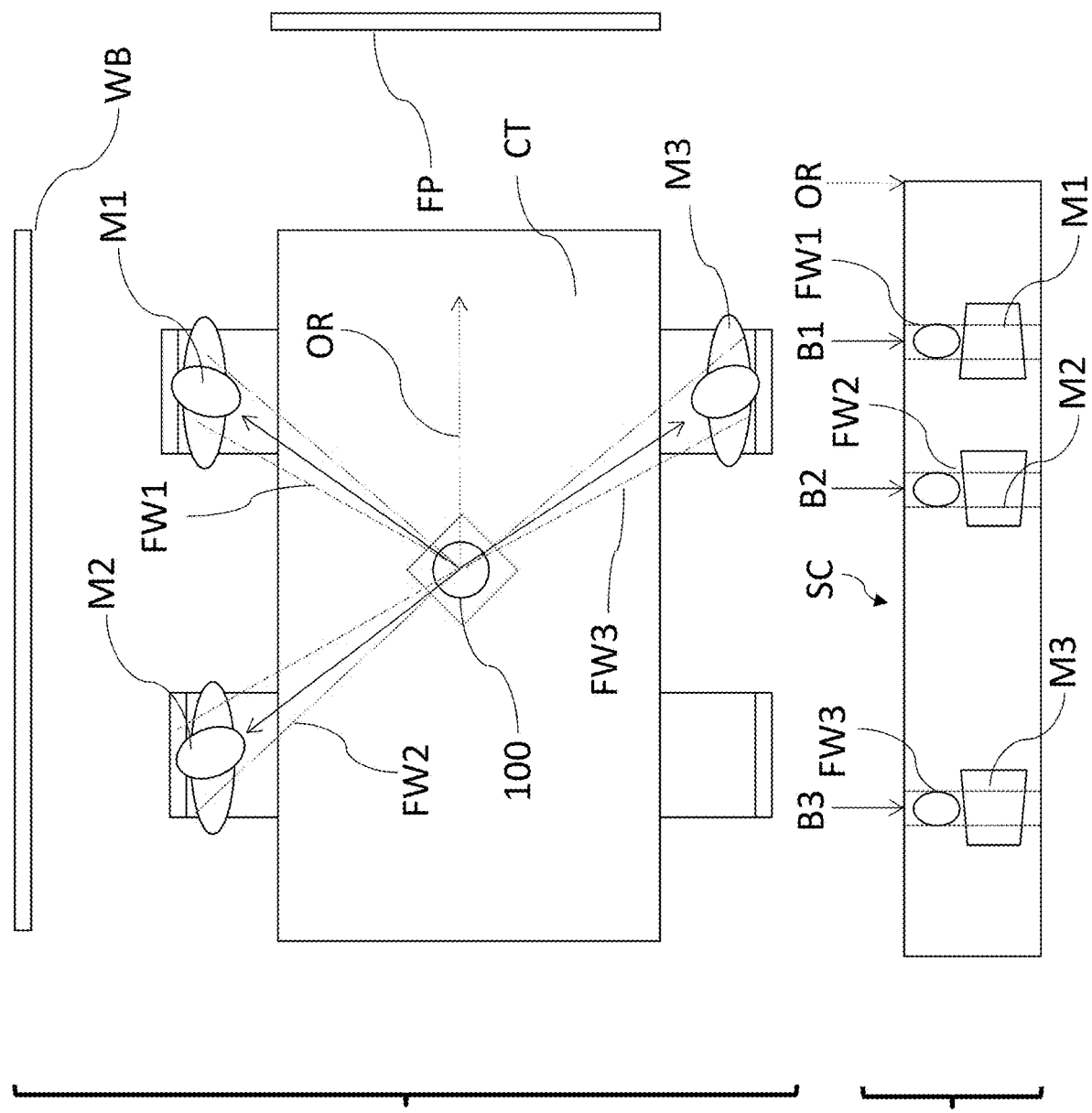

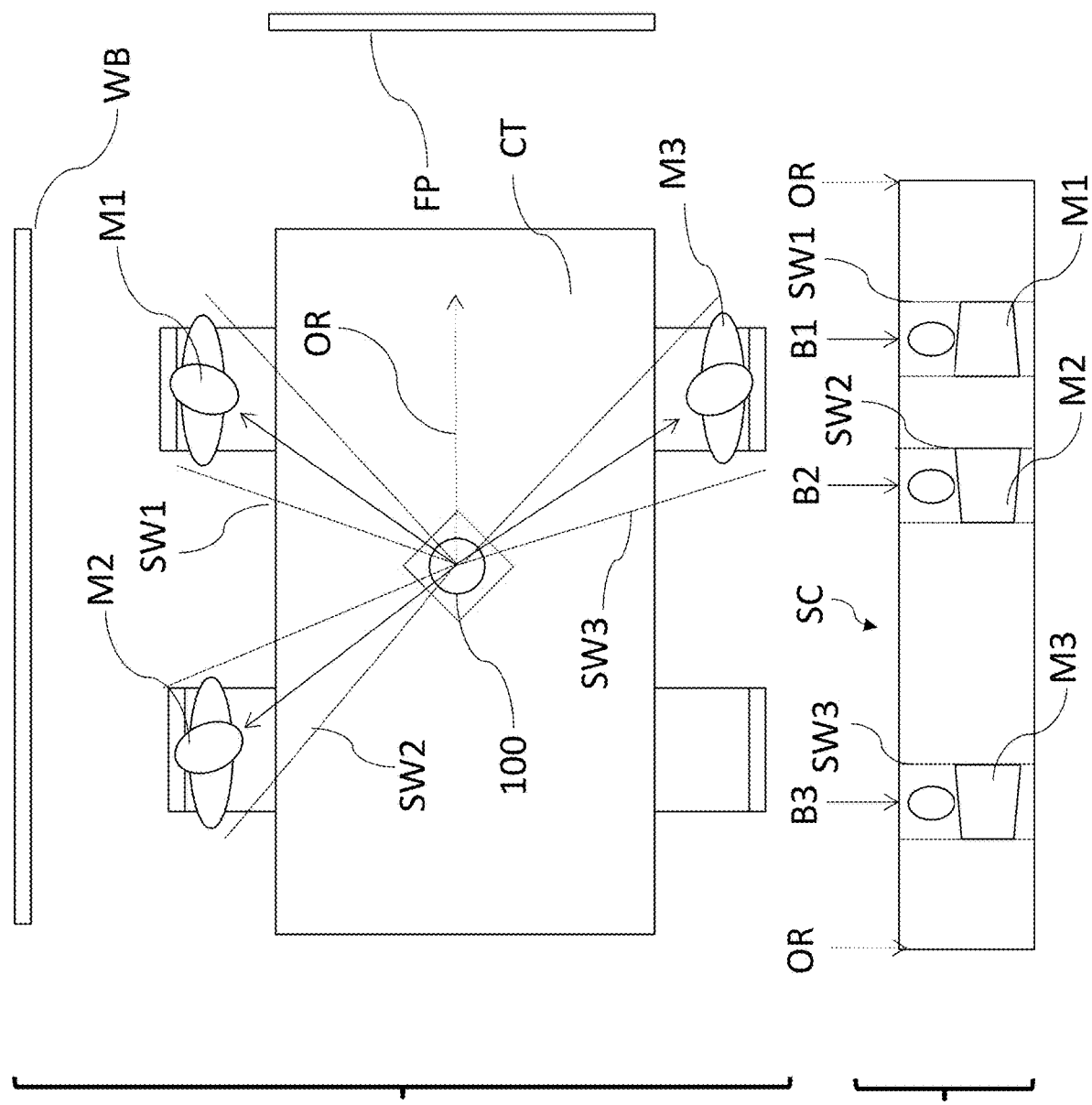

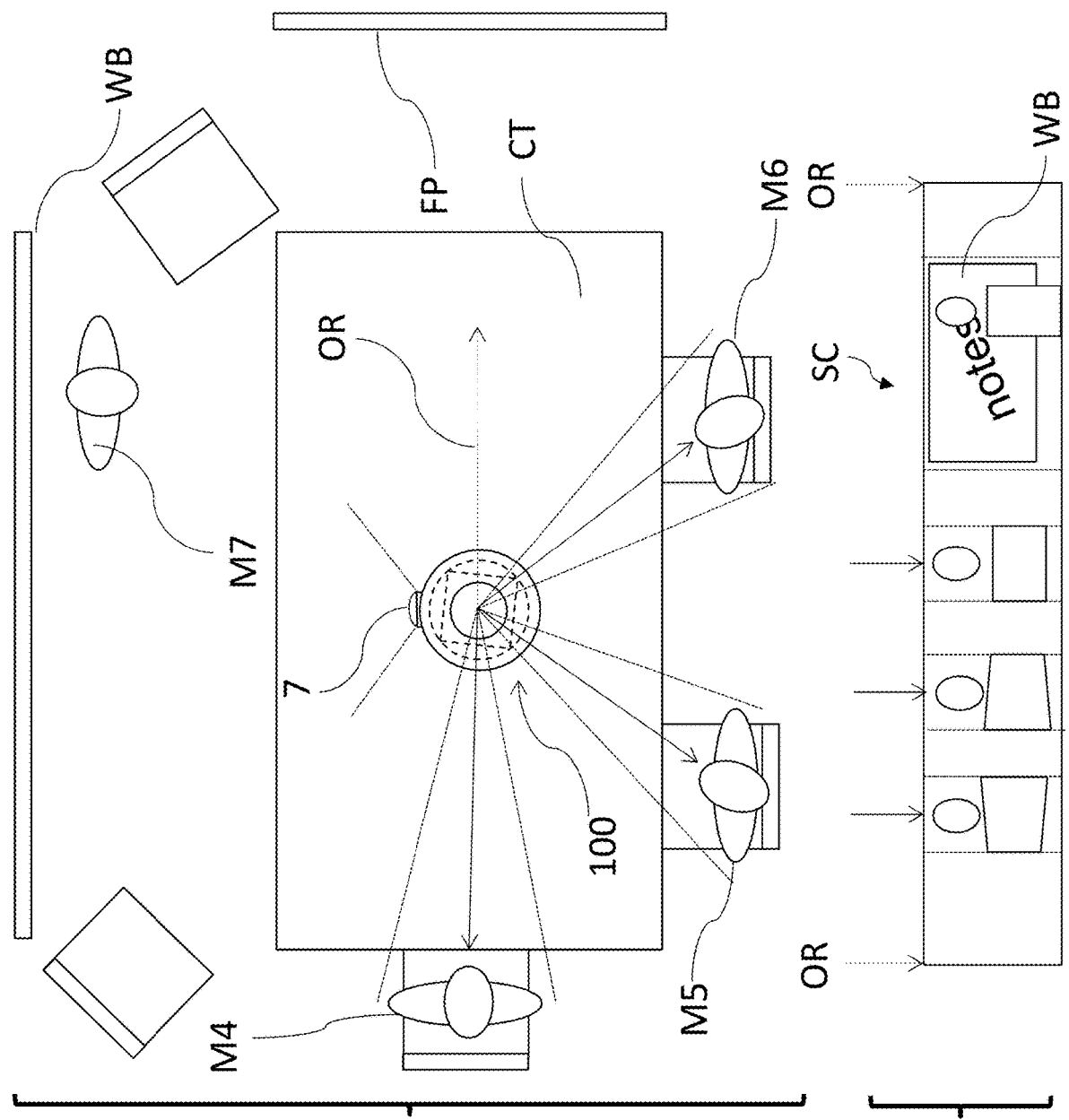

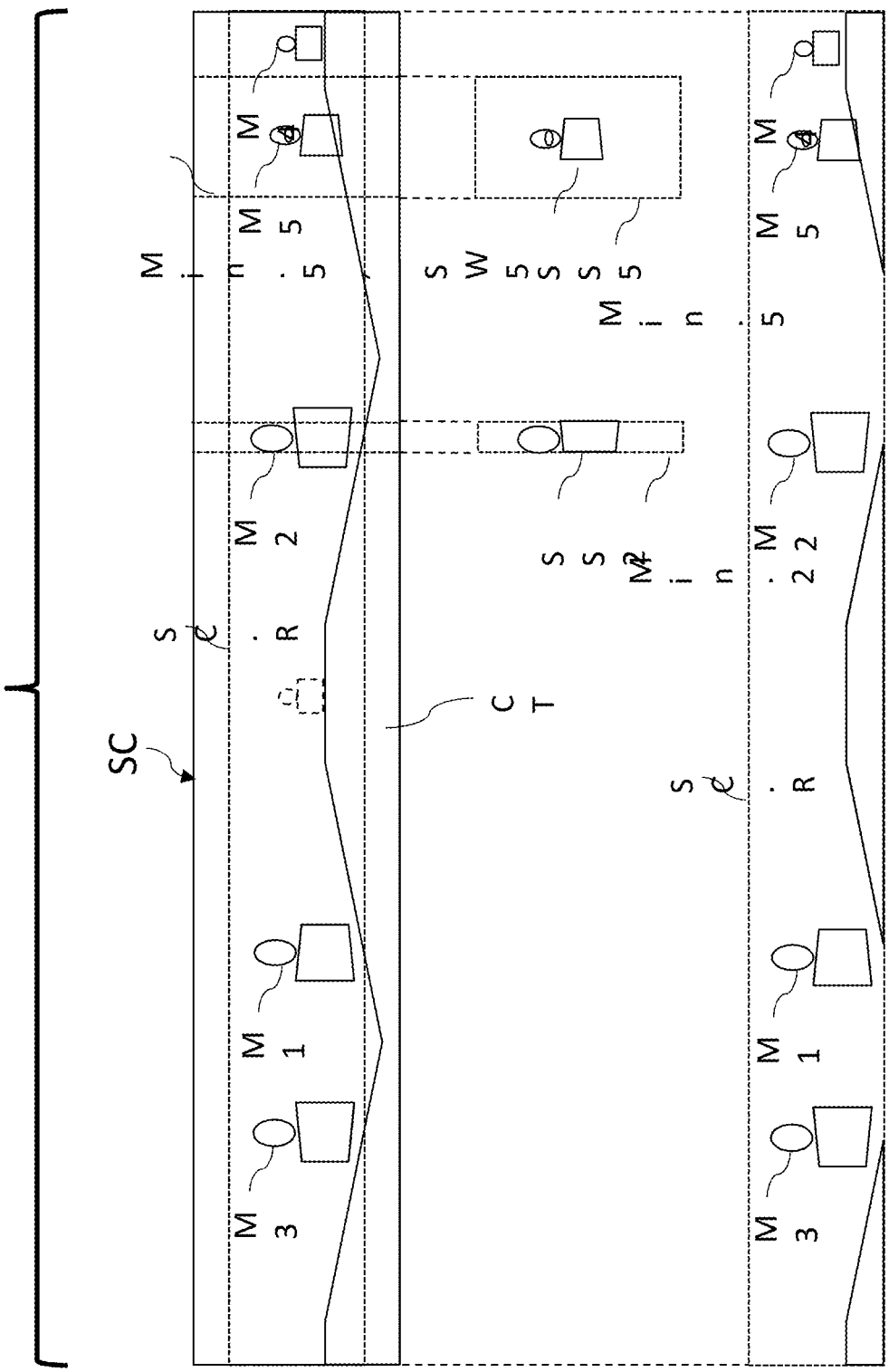

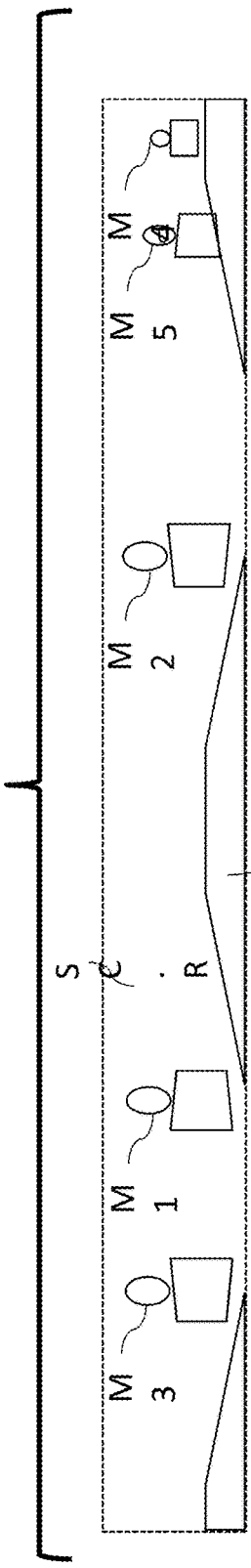
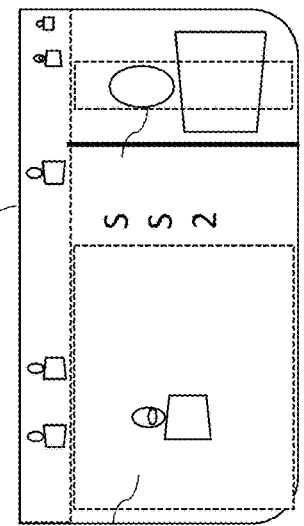
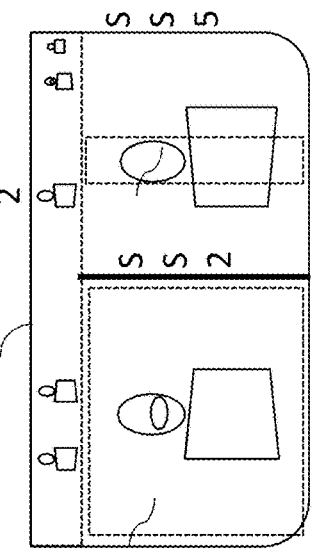
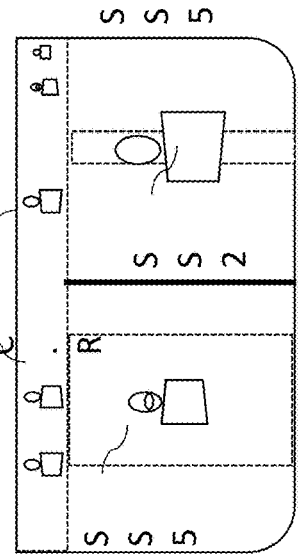
FIG. 8B
FIG. 8C
FIG. 8D
FIG. 8E

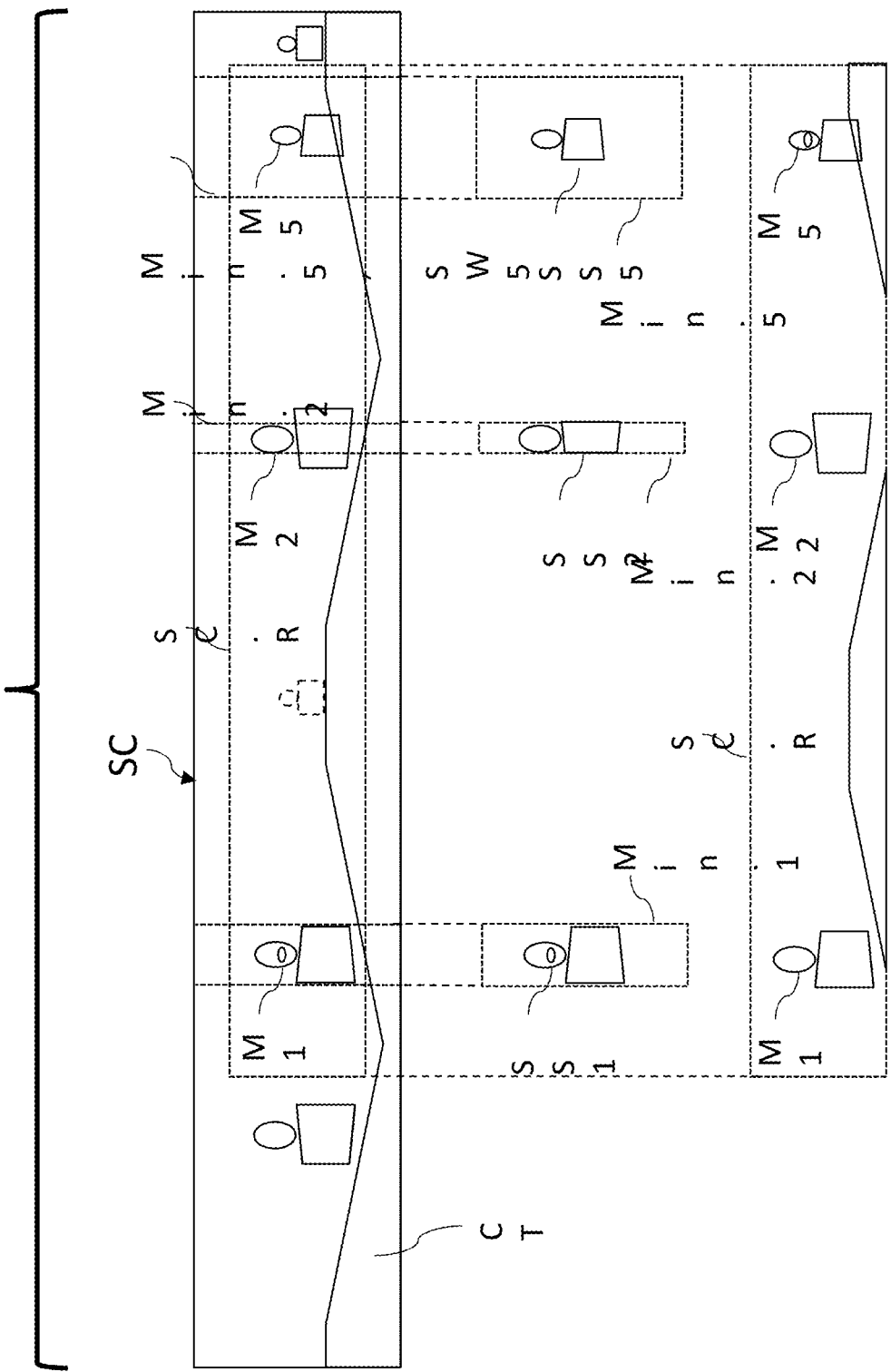

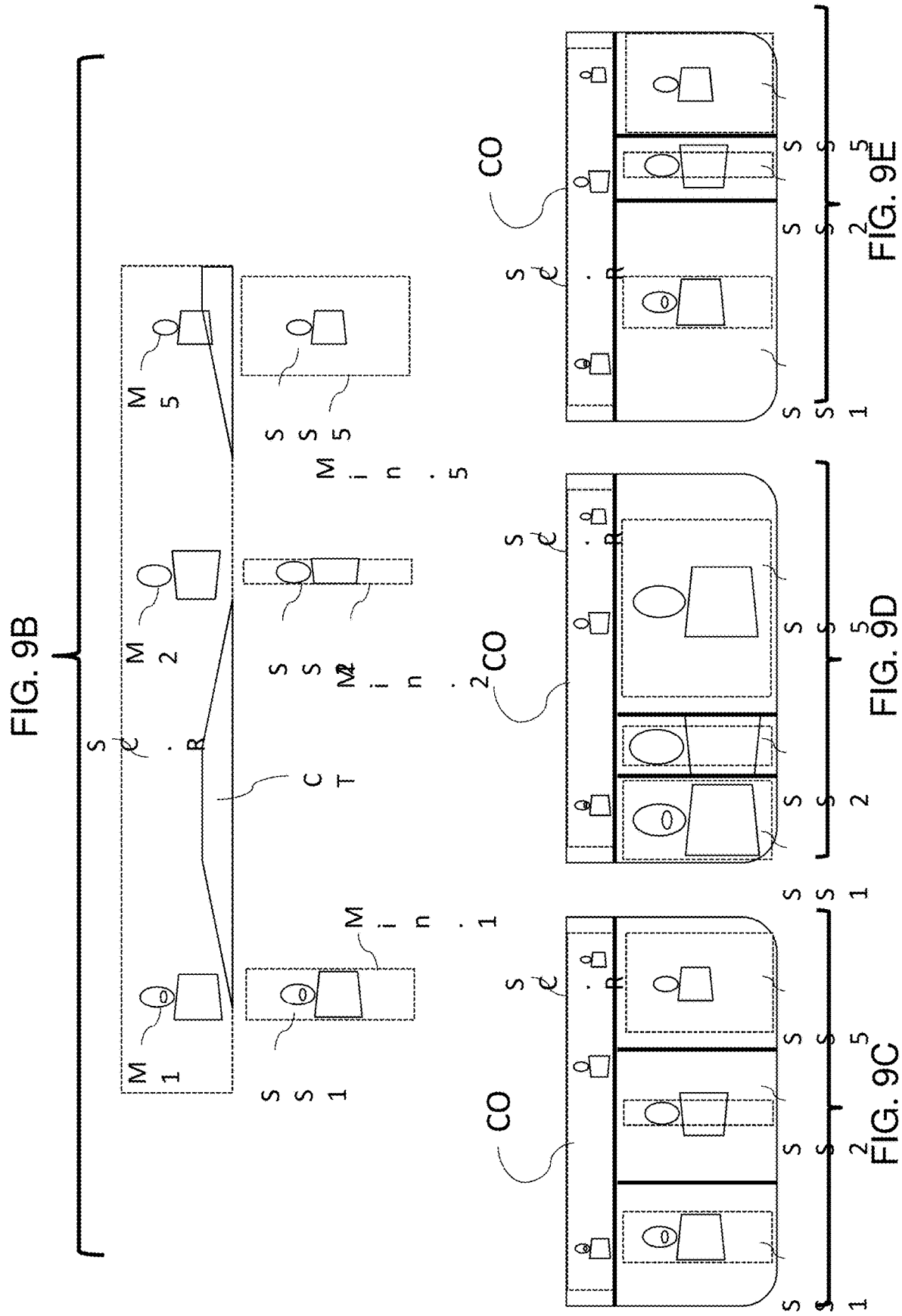

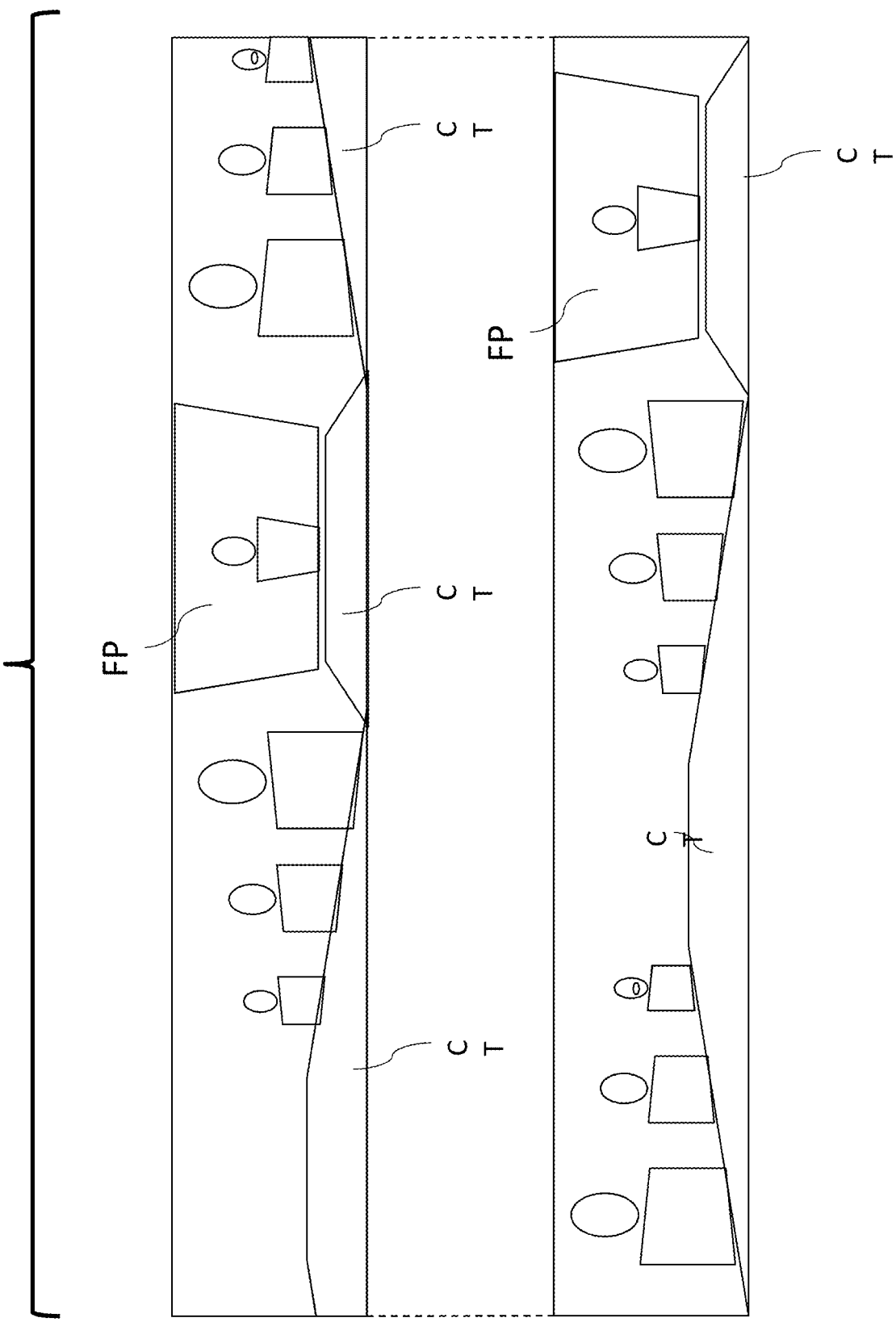

DENSELY COMPOSITING ANGULARLY SEPARATED SUB-SCENES

CROSS-REFERENCE TO RELATED APPLICATIONS

This application claims the benefit under 35 U.S.C. § 119(e) of U.S. provisional patent application Ser. No. 62/141,822, filed Apr. 1, 2015, the disclosure of which is herein incorporated by reference in its entirety.

FIELD

Aspects relate to apparatuses and methods for image capture and emphasis.

BACKGROUND

Multi-party remote meetings, video chats, and teleconferencing often take place with multiple participants together in a meeting room connected to at least one remote party.

In the case of a person-to-person mode of videoconferencing software, only one local camera, often of limited horizontal field of view (e.g., 70 degrees), is available. Whether this single camera is positioned in front of one participant or at the head of a table directed to all participants, it is difficult for the remote party to follow more distant audio, body language, and non-verbal cues given by those participants in the meeting room that are more remote from the single camera, or that are at sharp angles to the camera (e.g., viewing the profile of a person rather than the face).

In the case of a multi-person mode of videoconferencing software, the availability of the cameras of two or more mobile devices (laptop, tablet, or mobile phone) located in the same meeting room adds some different problems. The more meeting room participants that are logged in to the conference, the greater the audio feedback and crosstalk may become. The camera perspectives may be as remote from participants or as skewed as in the case of a single camera. Local participants may tend to engage the other participants via their mobile device, despite being in the same room (thereby inheriting the same weaknesses in body language and non-verbal cues as the remote party).

There is no known commercial or experimental technique for compositing, tracking, and/or displaying angularly separated sub-scenes and/or sub-scenes of interest within a wide scene (e.g., a wide scene of two or more meeting participants) in a way that makes the setup very easy for the same-room participants and the experience automatic and seamless from the viewpoint of the remote participants.

SUMMARY

In one aspect of the present embodiments, a process to output a densely composited single camera signal may record a panoramic video signal having an aspect ratio of substantially 2.4:1 or greater, captured from a wide camera having a horizontal angular field of view of substantially 90 degrees or greater. At least two sub-scene video signals may be subsampled at respective bearings of interest from the wide camera. Two or more sub-scene video signals may be composited side-by-side to form a stage scene video signal having an aspect ratio of substantially 2:1 or less. Optionally more than 80% of the area of the stage scene video signal is subsampled from the panoramic video signal. The stage scene video signal may be formatted as a single camera video signal. Optionally the panoramic video signal has an aspect ratio of substantially 8:1 or greater, captured from a wide camera having a horizontal angular field of view of substantially 360 degrees.

In a related aspect of the present embodiments, a meeting camera is configured to output a densely composited single camera signal. An imaging element or wide camera of the meeting camera may be configured to capture and/or record a panoramic video signal having an aspect ratio of substantially 2.4:1 or greater, the wide camera having a horizontal angular field of view of substantially 90 degrees or greater. A processor operatively connected to the imaging element or wide camera may be configured to subsample two or more sub-scene video signals at respective bearings of interest from the wide camera. The processor may be configured to composite to memory (e.g., buffer and/or video memory) the two or more sub-scene video signals as side-by-side video signals to form a stage scene video signal having an aspect ratio of substantially 2:1 or less. The processor may be configured to composite to memory (e.g., buffer and/or video memory) the sub-scene video signals so that more than 80% of the area of the stage scene video signal is subsampled from the panoramic video signal. The processor may also be configured to format the stage scene video signal as a single camera video signal, e.g., transported over USB.

In either of the above aspects, the processor may be configured to execute subsampling of an additional sub-scene video signal at a respective bearing of interest from the panoramic video signal, and compositing the two or more sub-scene video signals together with the one or more additional sub-scene video signals to form a stage scene video signal having an aspect ratio of substantially 2:1 or less, including a plurality of side-by-side sub-scene video signals. Optionally, compositing the two or more sub-scene video signals together with the one or more additional sub-scene video signals to form a stage scene video signal includes transitioning the one or more additional sub-scene video signals into the stage scene video signal by replacing at least one of the two or more sub-scene video signals to form a stage scene video signal having an aspect ratio of substantially 2:1 or less.

Further optionally, each sub-scene video signal may be assigned a minimum width, and upon completing each respective transition into the stage scene video signal, each sub-scene video signal may e composited side-by-side at substantially no less than its minimum width to form the stage scene video signal. Alternatively or in addition, a composited width of each respective sub-scene video signal being transitioned may increase throughout the transition until the composited width is substantially equal to or greater than the corresponding respective minimum width. Further alternatively or in addition, a sub-scene video signal may be composited side-by-side at substantially no less than its minimum width, and each may be composited at a respective width at which the sum of all composited sub-scene video signals substantially equals a width of the stage scene video signal.

In some cases, the width of sub-scene video signals within the stage scene video signal may be composited to change according to an activity criterion detected at one or more bearings of interest corresponding to a sub-scene video signal, while a width of the stage scene video signal is kept constant. In other case, compositing the two or more sub-scene video signals together with the one or more additional sub-scene video signals to form a stage scene video signal includes transitioning the one or more additional sub-scene video signals into the stage scene video signal by reducing a width of at least one of the two or more sub-scene video signals by an amount corresponding to the width of the one or more additional sub-scene video signals.

Further optionally, each sub-scene video signal may be assigned a respective minimum width, and each sub-scene video signal may be composited side-by-side at substantially no less than the corresponding respective minimum width to form the stage scene video signal. When a sum of the respective minimum widths of the two or more sub-scene video signals together with the one or more additional sub-scene video signals exceeds a width of the stage scene video signal, at least one of the two or more sub-scene video signals may be transitioned to be removed from the stage scene video signal. Optionally, the sub-scene video signal transitioned to be removed from the stage scene video signal corresponds to a respective bearing of interest at which an activity criterion was least recently satisfied.

In either of the above aspects, a left to right order with respect to the wide camera among respective bearings of interest of the two or more sub-scene video signals and the one or more additional sub-scene video signal may be preserved as the two or more sub-scene video signals are composited together with the one or more additional sub-scene video signals to form the stage scene video signal.

Further in either of the above aspects, each respective bearing of interest from the panoramic video signal may be selected dependent upon a selection criterion detected at the respective bearing of interest with respect to the wide camera. After a selection criterion is no longer true, the corresponding sub-scene video signal may be transitioned to be removed from the stage scene video signal. Alternatively, or in addition, the selection criteria may includes the presence of an activity criterion satisfied at the respective bearing of interest. In this case, the processor may count time since the activity criterion was satisfied at the respective bearing of interest. A predetermined period of time after the activity criterion was satisfied at the respective bearing of interest, the respective sub-scene signal may be transitioned to be removed from the stage scene video signal.

In a further variation of the above aspects, the processor may carry out subsampling a reduced panorama video signal of substantially 8:1 aspect ratio or greater from the panoramic video signal, as well as compositing the two or more sub-scene video signals together with the reduced panorama video signal to form a stage scene video signal having an aspect ratio of substantially 2:1 or less, including a plurality of side-by-side sub-scene video signals and the panoramic video signal. Optionally, the two or more sub-scene video signals may be composited together with the reduced panorama video signal to form a stage scene video signal having an aspect ratio of substantially 2:1 or less, including a plurality of side-by-side sub-scene video signals and the panoramic video signal above the plurality of side-by-side sub-scene video signals, the panoramic video signal being no more than ⅕ of the area of the stage scene video signal and extending substantially across the width of the stage scene video signal.

In a further variation of the above aspects, the processor or a related processor may subsample a text video signal from a text document, and transition the text video signal into the stage scene video signal by replacing at least one of the two or more sub-scene video signals with the text video signal.

Optionally, the processor may set at least one of the two or more sub-scene video signals as a protected sub-scene video signal protected from transition based on a retention criterion. In this case, the processor may transition the one or more additional sub-scene video signal into the stage scene video signal by replacing at least one of the two or more sub-scene video signals, and/or by transitioning a sub-scene video signal other than the protected sub-scene.

In some cases, the processor may alternatively or in addition set a sub-scene emphasis operation based on an emphasis criterion, wherein at least one of the two or more sub-scene video signals is emphasized according to the sub-scene emphasis operation based on a corresponding emphasis criterion. Optionally, the processor may set a sub-scene participant notification operation based on a sensed criterion from a sensor, wherein a local reminder indicium (such as a light, blinking, or a sound) is activated according to the notification operation based on a corresponding sensed criterion.

BRIEF DESCRIPTION OF THE DRAWINGS

FIGS. 1A and 1B are schematic block representations of embodiments of devices suitable for compositing, tracking, and/or displaying angularly separated sub-scenes and/or sub-scenes of interest within wide scenes collected by the devices 100.

FIGS. 2A through 2H and 2J through 2L are schematic representations of embodiments of meeting camera 14 or camera tower 14 arrangements for the devices 100 of FIGS. 1A and 1B and suitable for collecting wide and/or panoramic scenes.

FIGS. 3A and 3B show a top down view of a meeting camera use case, and a meeting camera panorama image signal, respectively, showing three participants.

FIGS. 4A and 4B show a top down view of a meeting camera use case showing a conference table, and a meeting camera panorama image signal, respectively, showing three participants, and including a depiction of an identification of a face width setting or sub-scene.

FIGS. 5A and 5B show a top down view of a meeting camera use case showing a conference table, and a meeting camera panorama image signal, respectively, showing three participants, and including a depiction of an identification of a shoulder width setting or sub-scene.

FIGS. 6A and 6B show a top down view of a meeting camera use case showing a conference table, and a meeting camera panorama image signal, respectively, showing three participants and a white board, and including a depiction of an identification of a wider sub-scene.

FIG. 8A shows a schematic view of a meeting camera video signal, minimum widths, and extraction of sub-scene video signals and a panorama video signal to be composited to a stage scene video signal.

FIG. 8B shows a schematic view of sub-scene video signals and a panorama video signal to be composited to a stage scene video signal, and FIGS. 8C through 8E show three possible composited outputs or stage scene video signals.

FIG. 9A shows a schematic view of a meeting camera video signal, minimum widths, and extraction of alternative sub-scene video signals and an alternative panorama video signal to be composited to a stage scene video signal.

FIG. 9B shows a schematic view of alternative sub-scene video signals and an alternative panorama video signal to be composited to a stage scene video signal, and FIGS. 9C through 9E show three possible alternative composited outputs or stage scene video signals.

FIG. 9F shows a schematic view of a panorama video signal adjusted so that a conference table image is arranged in a more natural, less jarring view.

DETAILED DESCRIPTION

Meeting Camera

Figure 7A:
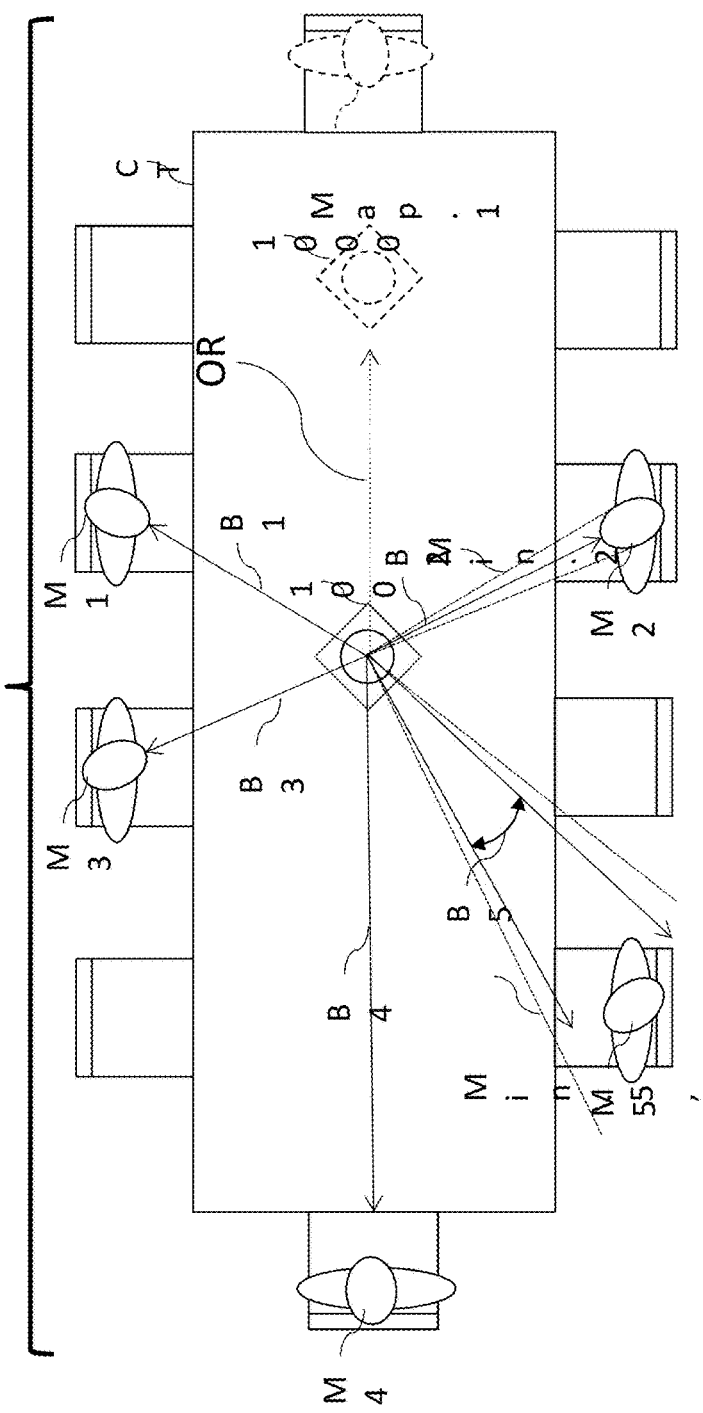
FIGS. 7A and B show a top down view of a meeting camera use case showing a ten seat conference table, and a meeting camera panorama image signal, respectively, showing five participants, and including a depiction of an identification of a visual minimum width and bearing and an acoustic minimum width and bearing.

FIGS. 1A and 1B are schematic block representations of embodiments of devices suitable for compositing, tracking, and/or displaying angularly separated sub-scenes and/or sub-scenes of interest within wide scenes collected by the devices 100.

FIG. 1A shows a device 100 constructed to communicate as a meeting camera or meeting "webcam", i.e., as a USB peripheral connected to a USB host or hub of a connected laptop, tablet, or mobile device 40; and to provide a single video image of an aspect ratio, pixel count, and proportion commonly used by off-the-shelf video chat or videoconferencing software such as "Google Hangouts", "Skype" or "Facetime". The device 100 includes a "wide camera" 2, 3, or 5, e.g., a camera capable of capturing more than one attendee, and directed to survey a meeting of attendees M1, M2 . . . Mn. The camera 2, 3, or 5 may include one digital imager or lens, or 2 or more digital imagers or lenses (E.g., stitched in software or otherwise). It should be noted that depending on the location of the device 100 within a meeting, the field of view of the wide camera 2, 3, or 5 may be no more than 70 degrees. However, in one or more embodiments the wide camera is useful in the center of the meeting, and in this case the wide camera may have a field of view of more than 140 degrees (not necessarily contiguously).

In large conference rooms (e.g., conference rooms designed to fit 8 people or more) it may be useful to have multiple wide-angle camera devices recording wide field of views and collaboratively stitching together a very wide scene to capture the most pleasing angle; for example, a wide angle camera at the far end of a long (20') table may result in an unsatisfying, distant view of the speaker but having multiple cameras spread across a table (e.g., 1 for every 5 seats) may yield at least one satisfactory or pleasing view. The camera 2 may image or record a panoramic scene (e.g., of 2:1 through 10:1 H:V horizontal to vertical proportion) and/or make this signal available via the USB connection.

As discussed with respect to FIGS. 2A-2L, the height of the wide camera 2, 3, 5 from the base of the device 100 is preferably more than 8 inches, so that the camera may be higher than typical laptop screens at a meeting, and thereby have an unobstructed and/or approximately eye-level view to meeting attendees M1, M2 . . . Mn. A microphone array 4 includes at least two microphones, and obtains bearings to sounds nearby by beam forming, localizing, or received signal strength differential as is known in the art. The microphone array 4 may include a plurality of microphone pairs directed to cover at least substantially the same angular range as the wide camera 2 field of view.

The microphone array 4 is optionally arranged together with the wide camera 2, 3, 5 at a height of higher than 8 inches, again so that a direct "line of sight" exists between the array 4 and attendees M1, M2 . . . Mn as they are speaking, unobstructed by typical laptop screens. A CPU and/or GPU (and associated circuits such as a camera circuit) 6, for processing computing and graphical events, are connected to each of the wide camera 2, 3, 5 and microphone array 4. ROM and RAM 8 are connected to the CPU and GPU 6 for retaining and receiving executable code. Network interfaces and stacks 10 are provided for USB, Ethernet, and/or WiFi, connected to the CPU 6.

The camera circuit may output a processed or rendered image or video stream as a single camera image signal, video signal or stream from 1.25:1 to 2.4:1 or 2.5:1 "H:V" horizontal to vertical proportion or aspect ratio (e.g., inclusive of 4:3, 16:10, 16:9 proportions) in landscape orientation, and/or, as noted, with a suitable lens and/or stitching circuit, a panoramic image or video stream as a single camera image signal of substantially 2.4:1 or greater. The device 100 of FIG. 1A is normally connected as a USB peripheral to a laptop, tablet, or mobile device 40 (having a display, network interface, compute, memory, camera and microphone sections) upon which teleconferencing software is hosted, and connectable for teleconferencing to remote clients 50 via the internet 60.

FIG. 1B is a variation of FIG. 1A in which both the device 100 of FIG. 1A and the teleconferencing device 40 are integrated. Camera circuit output as a single camera image signal, video signal or stream is directly available to, and the teleconferencing software is hosted instead by, the CPU, GPU, associated circuits and memory 5, 6, and the device 100 is directly connectable (e.g., via WiFi or Ethernet) for teleconferencing to remote clients 50 via the internet 60. A display 12 provides a user interface for operating the teleconferencing software and showing the teleconferencing views and graphics discussed herein to meeting attendees M1, M2 . . . M3. The device 100 of FIG. 1A may alternatively be connect directly to the internet 60, thereby allowing video to be recorded directly to a remote server, or accessed live from such a server, by remote clients 50.

FIGS. 2A through 2L are schematic representations of embodiments of meeting camera 14 or camera tower 14 arrangements for the devices 100 of FIGS. 1A and 1B and suitable for collecting wide and/or panoramic scenes. "Camera tower" 14 and "meeting camera" 14 may be used herein substantially interchangeably, although a meeting camera need not be a camera tower. The height of the wide camera 2, 3, 5 from the base of the device 100 in FIGS. 2A-2L is preferably more than 8 inches and less than 15 inches.

In the camera tower 14 arrangement of FIG. 2A, multiple cameras are peripherally arranged at the camera tower 14 camera level (8 to 15 inches), equiangularly spaced. The number of cameras is determined by field of view of the cameras and the angle to be spanned, and in the case of forming a panoramic stitched view, the cumulative angle spanned should have overlap among the individual cameras. In the case of, for example, FIG. 2A, four cameras 2a, 2b, 2c, 2d (labeled 2a-2d) each of 100-110 degree field of view (shown in dashed lines) are arranged at 90 degrees to one another, to provide cumulative view or a stitchable or stitched view of 360 degrees about the camera tower 14.

In the case of, for example, FIG. 2B, three cameras 2a, 2b, 2c (labeled 2a-2c) each of 130 or higher degree field of view (shown in dashed lines) are arranged at 120 degrees to one another, again to provide a 360 degree cumulative or stitchable view about the tower 14. The vertical field of view of the cameras 2a-2d is less than the horizontal field of view, e.g. less than 80 degrees. Images, video or sub-scenes from each camera 2a-2d may be processed to identify bearings or sub-scenes of interest before or after known optical correction such as stitching, dewarping, or distortion compensation, but would typically be so corrected before output.

In the camera tower 14 arrangement of FIG. 2C, a single fisheye or near-fisheye camera 3a, directed upward, is arranged atop the camera tower 14 camera level (8 to 15 inches). In this case, the fisheye camera lens is arranged with a 360 continuous horizontal view, and approximately a 215 (e.g., 230-190) degree vertical field of view (shown in dashed lines). Alternatively, a single catadioptric "cylindrical image" camera or lens 3b, e.g., having a cylindrical transparent shell, top parabolic mirror, black central post, telecentric lens configuration as shown in FIG. 2D, is arranged with a 360 degree continuous horizontal view, with an approximately 40-80 degree vertical field of view, centered approximately on the horizon. In the case of each of the fisheye and cylindrical image cameras, the vertical field of view, positioned at 8-15 inches above a meeting table, extends below the horizon, permitting attendees M1, M2 . . . Mn about a meeting table to be imaged to waist level or below. Images, video or sub-scenes from each camera 3a or 3b may be processed to identify bearings or sub-scenes of interest before or after known optical correction for fisheye or catadioptric lenses such as dewarping, or distortion compensation, but would typically be so corrected before output.

In the camera tower 14 arrangement of FIG. 2L, multiple cameras are peripherally arranged at the camera tower 14 camera level (8 to 15 inches), equiangularly spaced. The number of cameras is not in this case intended to form a completely contiguous panoramic stitched view, and the cumulative angle spanned does not have overlap among the individual cameras. In the case of, for example, FIG. 2L, two cameras 2a, 2b each of 130 or higher degree field of view (shown in dashed lines) are arranged at 90 degrees to one another, to provide a separated view inclusive of approximately 260 degrees or higher on both sides of the camera tower 14. This arrangement would be useful in the case of longer conference tables CT. In the case of, for example, FIG. 2E, the two cameras 2a-2b are panning and/or rotatable about a vertical axis to cover the bearings of interest B1, B2 . . . Bn discussed herein. Images, video or sub-scenes from each camera 2a-2b may be scanned or analyzed as discussed herein before or after optical correction.

In FIGS. 2F and 2G, table head or end arrangements are shown, i.e., each of the camera towers 14 shown in FIGS. 2F and 2G are intended to be placed advantageously at the head of a conference table CT. As shown in FIGS. 3A-6A, often a large flat panel display FP for presentations and videoconferencing is placed at the head or end of a conference table CT, and the arrangements of FIGS. 2F and 2G are alternatively placed directly in front of and proximate the flat panel FP. In the camera tower 14 arrangement of FIG. 2F, two cameras of approximately 130 degree field of view are placed 120 degrees from one another, covering two sides of a long conference table CT. A display and touch interface 12 is directed down-table (particularly useful in the case of no flat panel FP on the wall) and displays a client for the videoconferencing software. This display 12 may be a connected, connectable or removable tablet or mobile device. In the camera tower arrangement of FIG. 2G, one high resolution, optionally tilting camera 7 (optionally connected to its own independent teleconferencing client software or instance) is directable at an object of interest (such as a whiteboard WB or a page or paper on the table CT surface), and two independently panning/or tilting cameras 5a, 5b of, e.g., 100-110 degree field of view are directed or directable to cover the bearings of interest.

Images, video or sub-scenes from each camera 2a, 2b, 5a, 5b, 7 may be scanned or analyzed as discussed herein before or after optical correction. FIG. 2H shows a variation in which two identical units, each having two cameras 2a-2b or 2c-2d of 100-130 degrees arranged at 90 degree separation, may be independently used as >180 degree view units at the head(s) or end(s) of a table CT, but also optionally combined back-to-back to create a unit substantially identical to that of FIG. 2A having four cameras 2a-2d spanning an entire room and well-placed at the middle of a conference table CT. Each of the tower units 14, 14 of FIG. 2H would be provided with a network interface and/or a physical interface for forming the combined unit. The two units may alternatively or in addition be freely arranged or arranged in concert as discussed with respect to FIGS. 2K, 6A, 6B, and 14 below.

In FIG. 2J, a fisheye camera or lens 3a (physically and/or conceptually interchangeable with a catadioptric lens 3b) similar to the camera of FIG. 2C, is arranged atop the camera tower 14 camera level (8 to 15 inches). One rotatable, high resolution, optionally tilting camera 7 (optionally connected to its own independent teleconferencing client software or instance) is directable at an object of interest (such as a whiteboard WB or a page or paper on the table CT surface).

Figure 14:
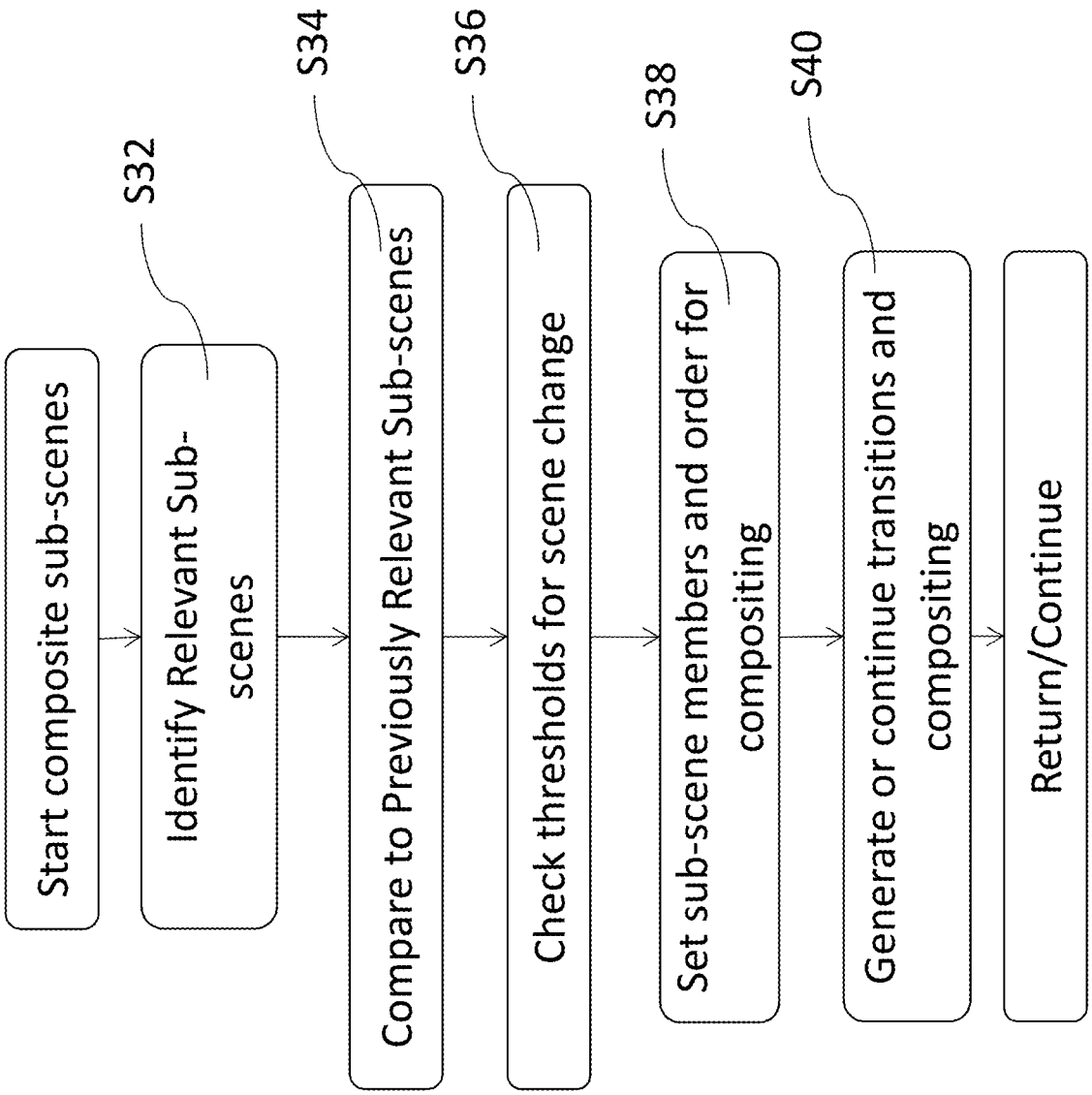
FIG. 14 shows a detailed flow chart including steps for compositing sub-scenes into a stage scene video signal.

As shown in FIGS. 6A, 6B, and 14, this arrangement works advantageously when a first teleconferencing client (in FIG. 14 upon or connected to "Meeting Room (Local) Display) receives the composited sub-scenes from the scene SC camera 3a, 3b as a single camera image or Composited Output CO, e.g., via first physical or virtual network interface or channel 10a, and a second teleconferencing client (in FIG. 14, resident within the device 100 and connected to the internet via second physical or virtual network interface or channel 10b) receives the independent high resolution image from camera 7.

FIG. 2K shows a similar arrangement, similarly in which separate videoconferencing channels for the images from cameras 3a, 3b and 7 may be advantageous, but in the arrangement of FIG. 2K, each camera 3a, 3b vs. 7 has its own tower 14 and is optionally connected to the remaining tower 14 via interface 15 (which may be wired or wireless). In the arrangement of FIG. 2K, the panoramic tower 14 with the scene SC camera 3a, 3b may be placed in the center of the meeting conference table CT, and the directed, high resolution tower 14 may be placed at the head of the table CT, or anywhere where a directed, high resolution, separate client image or video stream would be of interest. Images, video or sub-scenes from each camera 3a, 7 may be scanned or analyzed as discussed herein before or after optical correction.

Meeting Camera Usage

Figure 12:
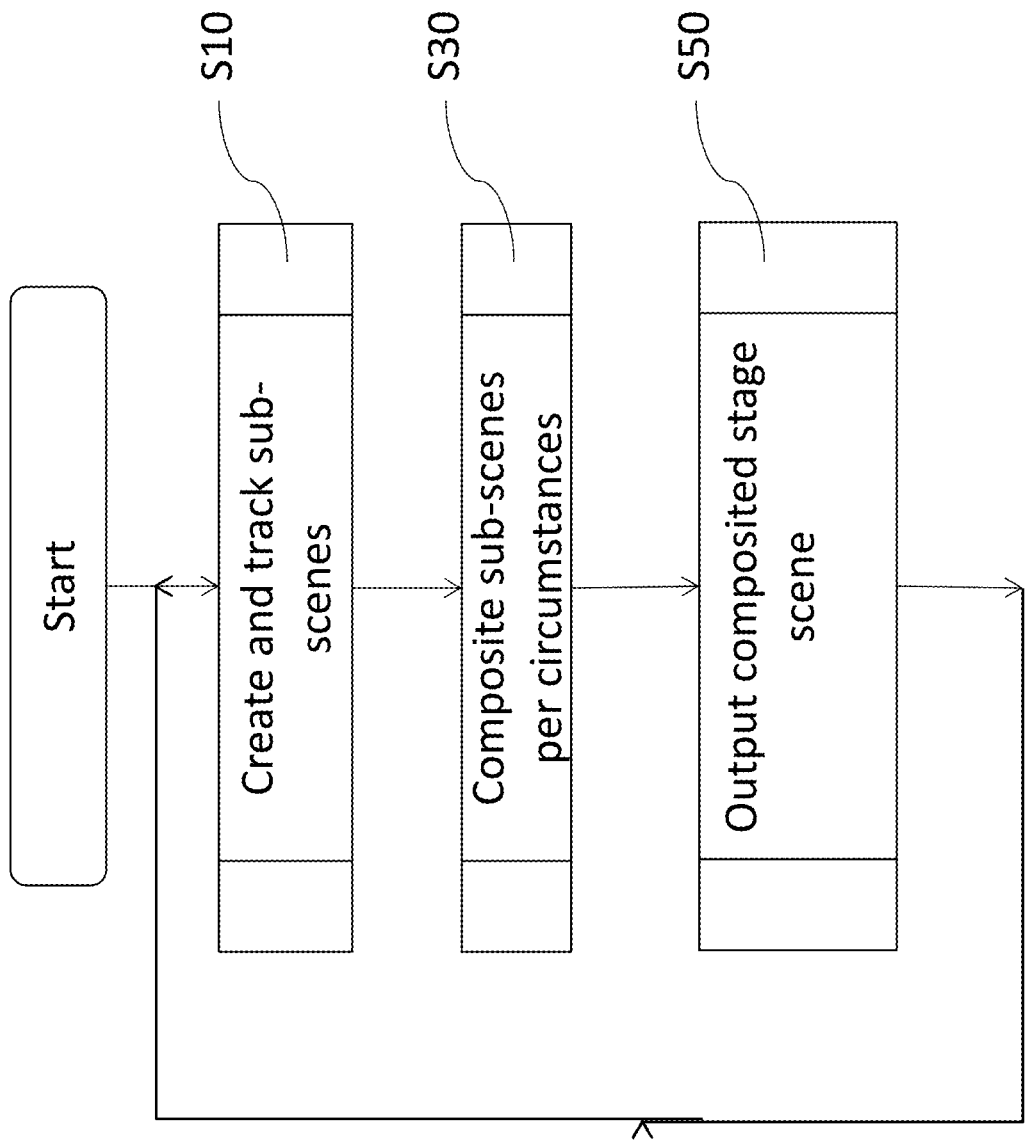
FIG. 12 shows a flow chart including steps for compositing a stage scene (video signal) video signals.

With reference to FIGS. 3A, 3B, and 12, according to an embodiment of the present method of compositing and outputting photographic scenes, a device 100 (or 200) is placed atop, for example, a circular or square conference table CT. The device 100 may be located according to the convenience or intent of the meeting participants M1, M2, M3.

In any typical meeting, participants M1, M2 . . . Mn will be angularly distributed with respect to the device 100. If the device 100 is placed in the center of the participants M1, M2 . . . Mn, the participants can be captured, as discussed herein, with a panoramic camera. Conversely, if the device 100 is placed to one side of the participants (e.g., at one end of the table, or mounted to a flat panel FP), then a wide camera (e.g., 90 degrees or more) may be sufficient to span the participants M1, M2 . . . Mn.

As shown in FIG. 3A, participants M1, M2 . . . Mn will each have a respective bearing B1, B2 . . . Bn from the device 100, e.g., measured for illustration purposes from an origin OR. Each bearing B1, B2 . . . Bn may be a range of angles or a nominal angle. As shown in FIG. 3B, an "unrolled", projected, or dewarped fisheye, panoramic or wide scene SC includes imagery of each participant M1, M2 . . . Mn, arranged at the expected respective bearing B1, B2 . . . Bn. Particularly in the case of rectangular tables CT and/or an arrangement of the device 100 to one side of the table CT, imagery of each participant M1, M2 . . . Mn may be foreshortened or distorted in perspective according to the facing angle of the participant (roughly depicted in FIG. 3B and throughout the drawings with an expected foreshortening direction). Perspective and/or visual geometry correction as is well known to one of skill in the art may be applied to foreshortened or perspective distorted imagery, sub-scenes, or the scene SC, but may not be necessary.

Face Detection and Widening

As one example, modern face detection libraries and APIs (e.g., Android's FaceDetector. Face class, Objective C's CIDetector class and CIFaceFeature object, OpenCV's CascadeClassifier class using Haar cascades, among more than 50 available API and SDK) which use common algorithms usually return interpupillary distance, as well as positions of facial features and facial pose in space. A rough floor for face width may be about two times the interpupillary distance/angle, with a rough ceiling of three times the interpupillary distance/angle if the participant Mn's ears are to be included in the range. A rough floor for portrait width (i.e., head and some shoulder width) may be twice face width/angle, with a rough ceiling of four times face width/angle. In the alternative, a fixed angle or other more direct setting of sub-scene width may be used.

FIGS. 4A-4B and 5A-5B show one exemplary two-step and/or separate identification of both face width and shoulder width (either of which may be a minimum width as discussed herein for setting an initial sub-scene width). As shown in FIG. 4A, and 4B, a face width FW1, FW2 . . . FWn set according to interpupillary distance or other dimensional analysis of facial features (feature, class, color, segment, patch, texture, trained classifier, or other feature) is obtained from the scene SC.

Compositing Angularly Separated Sub-Scenes

FIGS. 7A and B show a top down view of a meeting camera use case showing a ten seat conference table, and a meeting camera panorama image signal, respectively, showing five participants, and including a depiction of an identification of a visual minimum width and bearing and an acoustic minimum width and bearing.

FIG. 7A, meeting camera 100 is located in the middle of a 10 person long conference table. As such, participants M1, M2, M3 toward the middle of the table are the least foreshortened and occupy the most image area and angular view of the camera 100, while participants M5 and M4 toward the end of the table are the most foreshortened and occupy the least image area.

Figure 7B:
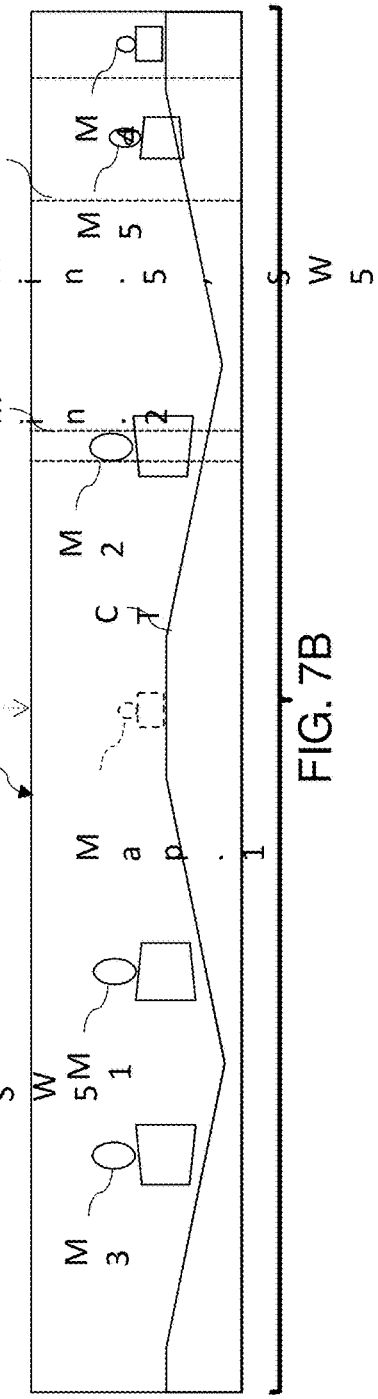

FIG. 7B, the overall scene video signal SC is a 360 degree video signal, including all the participants. The meeting table CT appears with a highly distorted "W" shape characteristic of panorama views, while the participants M1 . . . M5 appear in different sizes and with different foreshortened aspects (simply and schematically represented with rectangular bodies and oval heads) depending on their position and distance from the meeting camera. As shown in FIGS. 7A and 7B, each participant M1 . . . M5 may be represented in memory 8 by a respective bearing B1 . . . B5, determined by acoustic or visual or sensor localization of sound, motion, or features. As depicted in FIGS. 7A and 7B, participant M2 may have been localized by detection of a face (and has a corresponding vector-like bearing B2 and minimum width Min.2 recorded in memory, determined proportionate to the face width derived from a face detection heuristic), and participant M5 may have been localized by beam forming, relative signal strength, and/or time of flight of speech-like audio signals (and has a corresponding sector-like bearing B5, and minimum width Min.5 recorded in memory, determined proportionate to an approximated resolution of the acoustic array 4).

FIG. 8A shows a schematic view of a meeting camera video signal, minimum widths, and extraction of sub-scene video signals and a panorama video signal to be composited to a stage scene video signal. The top portion of FIG. 8A essentially reproduces FIG. 7B. As shown in FIG. 8A, the overall scene video signal SC from FIG. 7B may be sub-sampled according to the bearings of interest (limited in this example to bearing B2 and B5) and widths (limited in this example to width Min.2 and Min.5). Sub-scene video signal SS2 is at least as wide as (visually determined) face-width limit Min.2, but may become wider or be scaled wider relative to the width, height, and/or available area of the stage STG or composite output CO aspect ratio and available area. Sub-scene video signal SS5 is at least as wide as (acoustically determined) acoustic approximation Min.5, but may become or be scaled wider, and be limited, similarly. Reduced panorama scene SC.R in this capture is a top and bottom cropped version of the overall scene SC, in this case cropped to an aspect ratio of 10:1. Alternatively, the reduced panorama scene may be derived from the overall panorama scene video signal SC by proportionate or anamorphic scaling (e.g., the top and bottom sections remain, but are compressed more than the middle portions). In any case, in the example of FIGS. 8A and 8B, three different video signal sources SS2, SS5, and SC.R are available to be composited to a stage STG or composited output CO.

FIG. 8B essentially reproduces the lower portion of FIG. 8A, and shows a schematic view of sub-scene video signals and a panorama video signal to be composited to a stage scene video signal. FIGS. 8C through 8E show three possible composited outputs or stage scene video signals.

In the composited output CO or stage scene video signal STG shown in FIG. 8C, the reduced panorama video signal SC.R is composited entirely across the top of the stage STG, occupying in this case less than ⅕ of the stage area. The sub-scene SS5 is composited to occupy at least its minimum area, is not scaled overall, but is widened to fill approximately ½ of the stage width. The sub-scene SS2 is also composited to occupy at least its (considerably lesser) minimum area, is not scaled overall, and also is widened to fill approximately ½ of the stage width. In this composited output CO, the two sub-scenes are given approximately the same area, but the participants are of different apparent sizes corresponding to their distance from the camera 100. Note, also, the left-right or clockwise order of the two sub-scenes as composited is the same as the order of the participants within the room or bearings of interest from the camera 100 (and as appearing in the reduced panorama view SC.R). Further, any of the transitions discussed herein may be used in compositing the sub-scene video signals SS2, SS5 into the stage video signal STG.

In the composited output CO or stage scene video signal STG shown in FIG. 8D, the reduced panorama video signal SC.R is similarly composited into the scene STG, but each of the signals SS5 and SS2 have been proportionately scaled or zoomed such that the participants M5, M2 occupy more of the stage STG. The minimum width of each signal SS5 and SS2 is also depicted zoomed, with the signals SS5 and SS2 still occupying no less than their respective minimum widths but each widened to fill about ½ of the stage (in the case of SS5, the minimum width occupies ½ of the stage). The participants M5, M3 are of substantially equivalent size upon the stage STG or within the composited output signal CO.

In the composited output CO or stage scene video signal STG shown in FIG. 8E, the reduced panorama video signal SC.R is similarly composited into the scene STG, but each of the signals SS5 and SS2 have been situationally scaled or zoomed. Sub-scene signals SS5 and SS2 still occupy no less than their respective minimum widths but each is widened to fill different amounts of the stage. In this case sub-scene signal SS5 has not been scaled up or zoomed, but has a wider minimum width as well as occupying more than ⅔ of the stage SG. On the other hand, the minimum width of signal SS2 is depicted zoomed, occupying about 3 times its minimum width. One situation in which the relative proportions and state of FIG. 8E would arise may be in which no visual localization may be made upon participant M5, giving a wide and uncertain (low confidence level) bearing of interest and wide minimum width; and further where participant M5 continues to speak for a long period of time, optionally increasing the sub-scene SS5's share of the stage STG. At the same time, participant M2 may have a highly reliable face width detection, permitting the sub-scene SS2 to be scaled and/or widened to consume more than its minimum width.

FIG. 9A shows a schematic view of a meeting camera video signal, minimum widths, and extraction of alternative sub-scene video signals and an alternative panorama video signal to be composited to a stage scene video signal. The top portion of FIG. 9A essentially reproduces FIG. 7B, except that participant M1 has become the latest speaker, with a corresponding sub-scene SS1 having a corresponding minimum width Min.1. As shown in FIG. 9A, the overall scene video signal SC from FIG. 7B may be subsampled according to the bearings of interest (now bearings B1, B2 and B5) and widths (now widths Min.1, Min.2 and Min.5). Sub-scene video signals SS1, SS2 and SS5 are each at least as wide as (visually, acoustically, or sensor determined) their respective minimum widths Min.1, Min.2, and Min.5, but may become wider or be scaled wider relative to the width, height, and/or available area of the stage STG or composite output CO aspect ratio and available area. Reduced panorama scene SC.R in this capture is a top, bottom, and side cropped version of the overall scene SC, in this case cropped to span only the most relevant/recent speakers M1, M2, and M5, with an aspect ratio of about 7.5:1. In the example of FIGS. 9A and 9B, four different video signal sources SS1, SS2, SS5, and SC.R are available to be composited to a stage STG or composited output CO.

FIG. 9B essentially reproduces the lower portion of FIG. 9A, and shows a schematic view of sub-scene video signals and a panorama video signal to be composited to a stage scene video signal. FIGS. 9C through 9E show three possible composited outputs or stage scene video signals.

In the composited output CO or stage scene video signal STG shown in FIG. 9C, the reduced panorama video signal SC.R is composited nearly entirely across the top of the stage STG, occupying in this case less than ¼ of the stage area. The sub-scene SS5 is again composited to occupy at least its minimum area, is not scaled overall, but is widened to fill approximately ⅓ of the stage width. The sub-scenes SS2 and SS1 are also composited to occupy at least their lesser minimum areas, are not scaled overall, and are also is widened to fill approximately ⅓ of the stage width each. In this composited output CO, the three sub-scenes are given approximately the same area, but the participants are of different apparent sizes corresponding to their distance from the camera 100. The left-right or clockwise order of the two sub-scenes as composited or transitioned remains the same as the order of the participants within the room or bearings of interest from the camera 100 (and as appearing in the reduced panorama view SC.R). Further, any of the transitions discussed herein may be used in compositing the sub-scene video signals SS1, SS2, SS5 into the stage video signal STG.

In the composited output CO or stage scene video signal STG shown in FIG. 9D, the reduced panorama video signal SC.R is similarly composited into the scene STG, but each of the signals SS1, SS2, and SS5 have been proportionately scaled or zoomed such that the participants M1, M2, M5 occupy more of the stage STG. The minimum width of each signal SS1, SS2, SS5 is also depicted zoomed, with the signals SS1, SS2, SS5 still occupying no less than their respective zoomed minimum width but sub-scene SS5 widened to fill slightly more than its zoomed minimum width on the stage, with SS5 occupying 60 percent of the width of the stage, SS2 occupying just 15 percent, and SS3 occupying the remaining 25 percent The participants M1, M2, M5 are of substantially equivalent height or face size upon the stage STG or within the composited output signal CO, although participant M2 and sub-scene SS2 may be substantially cropped to show only a little more than the head and/or body width.

In the composited output CO or stage scene video signal STG shown in FIG. 9E, the reduced panorama video signal SC.R is similarly composited into the scene STG, but each of the signals SS1, SS2, SS5 have been situationally scaled or zoomed. Sub-scene signals SS1, SS2, SS5 still occupy no less than their respective minimum widths but each is widened to fill different amounts of the stage. In this case none of the sub-scene signal SS1, SS2, SS5 have been scaled up or zoomed, but sub-scene SS1, with the most recent or relevant speaker M1, has occupies more than ½ of the stage SG. On the other hand, each of sub-scenes SS2 and SS5 occupy a smaller or reduced share of the stage STG, but with the minimum width of sub-scene SS5 causing any further reduction in share of the stage STG to be taken from sub-scene SS2 or SS1. One situation in which the relative proportions and state of FIG. 9E would arise may be in which a visual localization may be made upon participant M1, but where participant M1 continues to speak for a long period of time, optionally increasing the sub-scene SS1's share of the stage STG versus the other two sub-scenes.

In the panoramic scene SC or reduced panoramic scene SC.R depicted in FIG. 9F, the meeting camera 1000 has been placed not at the center of the table CT, but instead toward one end of the table CT (e.g., as shown by the dashed line position to the right of FIG. 7A), with a flat panel FP showing a remote meeting participant. In this case, the conference table CT again appears as a highly distorted "W" shape. As shown at the top of FIG. 9F, if the meeting camera 100 or an index direction or origin OR of the panoramic scene SC is oriented such that the limits of the high aspect ratio panoramic scene SC "splits" the conference table CT, it is quite difficult to reference the positions of persons around the table CT. However, should the meeting camera 100 or index direction or origin OR of the panoramic scene be arranged so that the table CT is contiguous and/or all persons are positioned toward one side, the scene is more natural. According to the present embodiments, the processor 6 may conduct an image analysis to change the index position or origin position of the panorama image. In one example, an index position or origin position of the panorama image may be "rotated" so that a single contiguous segmentation of image patches corresponding to the table areas is maximized in area (e.g. the table is not split). In another example, an index position or origin position of the panorama image may be "rotated" so that the two closest or largest face recognitions are most distant from one another (e.g., the table is not split). In a third example, In another example, an index position or origin position of the panorama image may be "rotated" so that the lowest height segmentation of image patches corresponding to the table areas is located at the panorama edge (e.g., the "W" shape is rotated to put the table edge closest to the meeting camera 100 at the panorama edge).

Figure 10B:
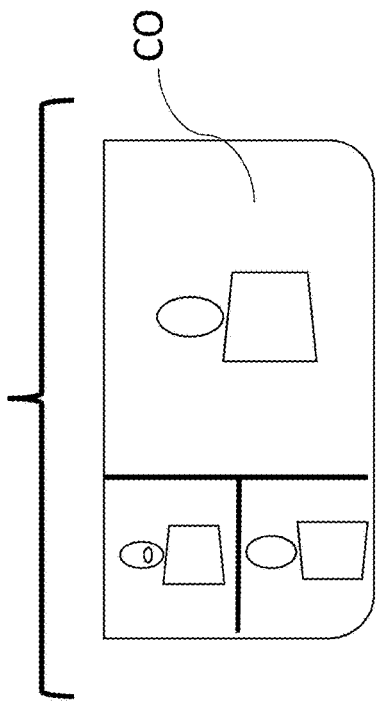
FIGS. 10A-10B show schematic views of a possible composited output or stage scene video signal.
Figure 10A:
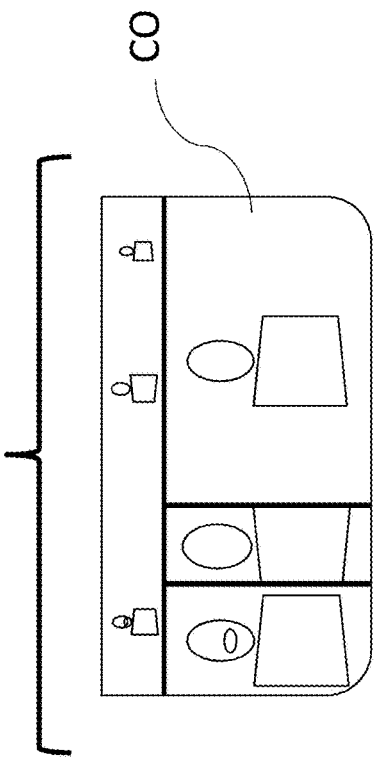

FIG. 10A shows a schematic view of a possible composited output or stage scene video signal, and substantially reproduces the composite output signal CO or stage video signal STG of FIG. 9D, with a reduced panorama signal composited to occupy less than ¼ of the top of the stage STG, and three different sub-scene video signals composited to occupy different amounts of the remainder of the stage STG. FIG. 10B shows an alternative schematic view of a possible composited output or stage scene video signal, with three different sub-scene video signals adjacent to one another composited to occupy different amounts of the stage STG or composite output signal CO.

Figure 11B:
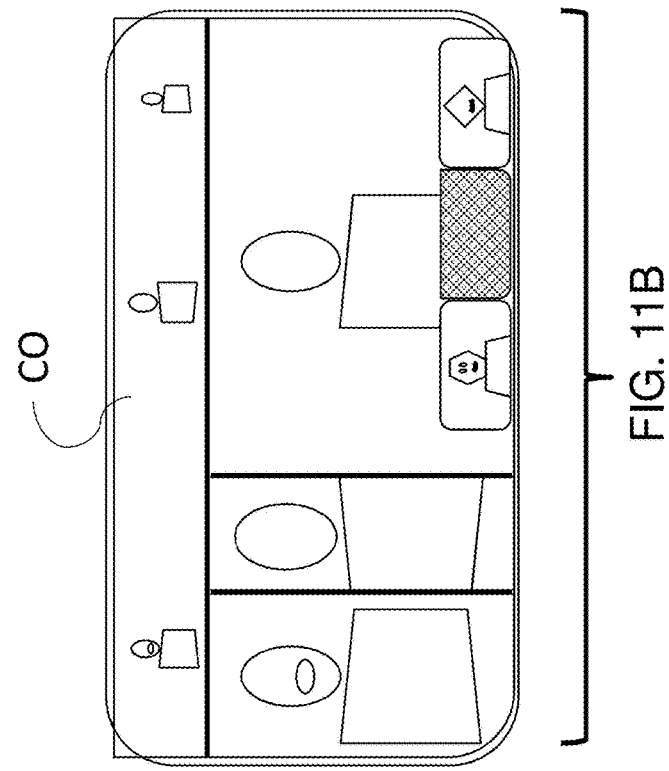
FIGS. 11A and 11B show schematic views of two alternative ways videoconferencing software may display the composited output or stage scene video signal.
Figure 11A:
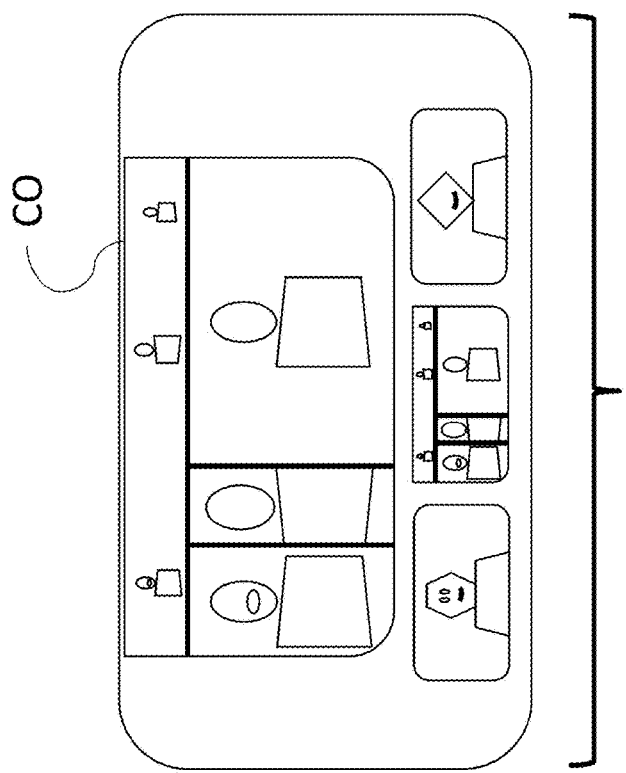

FIGS. 11A and 11B show schematic views of two alternative ways videoconferencing software may display the composited output or stage scene video signal. In FIG. 11A and FIG. 11B, the composite output signal CO is received (e.g., via the USB port) as a single camera signal with accompanying audio, and is integrated into the videoconferencing application as a single camera signal. As shown in FIG. 11A, each single camera signal is given a separate window, and a selected or active or foreground signal such as the composite output signal CO is reproduced as a thumbnail. In contrast, in the example shown in FIG. 11B, a selected single camera signal is given as much area on the display as is pragmatic, and the selected or active or foreground signal such as the composite output signal CO is presented as a shaded out thumbnail or greyed out thumbnail.

Sub-Scene Identification and Compositing

As shown in FIG. 12, new sub-scenes SS1, SS2 . . . SSn may be created and tracked depending upon the scene, e.g., upon recognitions within panoramic video signal SC, at step S10. Subsequently, in step S30, the subscenes SS1, SS2 . . . SSn may be composited according to the bearings of interest, conditions, and recognitions discussed herein. The composited output or stage scene STG, CO may then be output in step S50.

Figure 13:
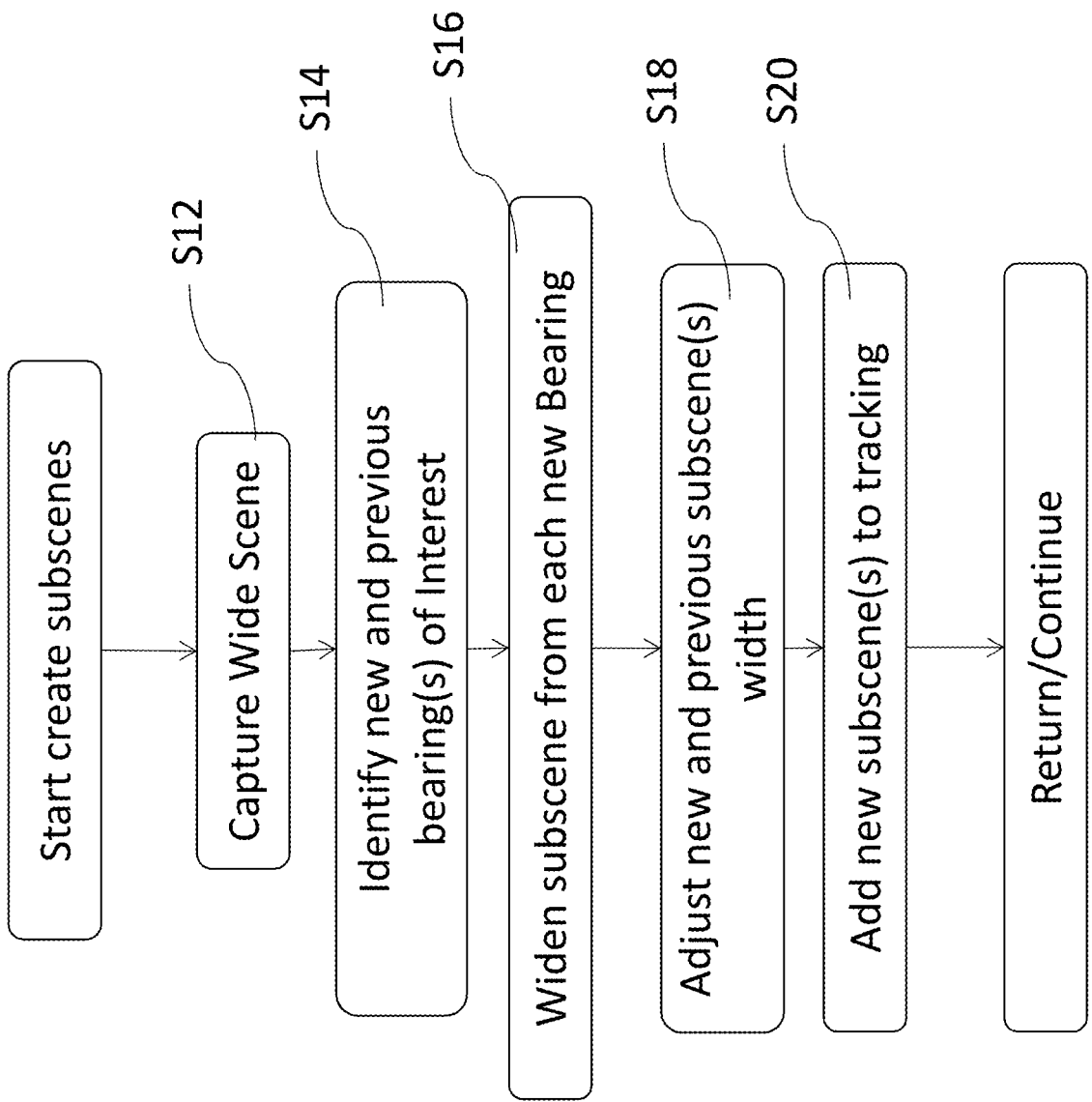
FIG. 13 shows a detailed flow chart including steps for compositing creating sub-scenes (sub-scene video signals) based on bearings of interest.

In additional detail as shown in FIG. 13, and as shown in FIGS. 3A and 3B, in step S12 the device 100 captures at least a 90 degree angular field of view wide angle (e.g., an angle between 90-360 degrees) scene SC from the one or more at least partially panoramic camera(s) 2 or 2a . . . 2n.

Subsequent processing for tracking and sub-scene identification may be carried out on a native, distorted or unstitched scene SC, or may be carried out on an unrolled, distortion corrected, or stitched scene SC.

At step S14, new bearings of interest B1, B2 . . . Bn are obtained from the wide angle view SC using one or more recognition, identification, vectoring, or homing techniques.

In step S16, one or more new bearings are widened from an initial angular range (e.g., 0-5 degrees) to an angular range sufficient to span a typical person's head, and/or, a typical person's shoulders. Note that the order of analysis may be reversed, e.g., first a face may be detected, then a bearing to the face may be determined. Widening may take place in one, two, or more steps, with two noted herein as an example; and "widening" does not require a progressive widening process, e.g., "widening" may mean directly setting an angular range based on a detection, recognition, threshold, or value. Different methods may be used to set the angular range of a sub-scene. In some cases, such as when two or more faces are in close proximity to one another, "widening" may be chosen so as to include all these faces, even though only one is at the precise bearing of interest B1.

In step S16, (and as shown in FIGS. 5A and 5B), a shoulder width sub-scene SS1, SS2 . . . SSn may be set as in or adjusted as in step S18 according to interpupillary distance or measurement taken from other facial, head, torso, or other visible features (feature, class, color, segment, patch, texture, trained classifier, or other feature), may be obtained from the scene SC. The sub-scene SS1, SS2 . . . SSn width may be set according to a shoulder width (alternatively according to a face width FW).

Alternatively, in step S16, an upper and/or lower limit on sub-scene width for each or all bearings of interest may be set, or adjusted in step S18 as, e.g., a peak, average, or representative shoulder width SW and face width FW, respectively. It should be noted that notations FW and SW are used interchangeably herein as a "face width" FW or "shoulder width" SW (i.e., a span of a face or shoulders to be angularly captured as a sub-scene) and a resulting face width or shoulder width sub-scene SS representing the face width FW or shoulder width SW (i.e., a block of pixels or sub-scene of corresponding width identified, obtained, adjusted, selected or captured from the wide scene SC).

In step S16, or alternatively or in addition in steps S16-S18, a first discrete sub-scene of at least 20 degrees angular field of view (e.g., FW1 and/or SW1) is obtained from the wide angle scene SC at a first bearing of interest B1. Alternatively or in addition to the at least 20 degrees angular field of view (e.g., FW1 and/or SW1) setting, the first discrete sub-scene FW1 and/or SW1 may be obtained from the wide angle scene SC as an angular field of view spanning at least 2 to 12 times an interpupillary distance (e.g., specific to M1 or representative of M1, M2 . . . Mn), or alternatively or in addition an angular field of view scaled to capture a width between an interpupillary distance (e.g., specific to M1 or representative of M1, M2 . . . Mn) and a shoulder width (e.g., specific to M1 or representative of M1, M2 . . . Mn). A sub-scene capture of a wider or shoulder width SWn may record a narrower face width FWn for later reference.

If a second bearing of interest B2 is available, in step S16, or alternatively or in addition in steps S16-S18, a second discrete sub-scene (e.g., FW2 and/or SS2) is obtained in similar manner(s) from the wide angle view SC at a second bearing of interest B2. If successive bearings of interest B3 . . . Bn are available, successive discrete sub-scenes (e.g., FW3 . . . n, and/or SS3 . . . n) are obtained in similar manner(s) from the wide angle view SC at successive bearings of interest B3 . . . Bn.

The second bearing of interest B2 (and subsequent bearings of interest B3 . . . Bn), whether obtained by a stitching of different camera images or from a single panoramic camera, have a substantially common angular origin to the first bearing of interest because they are obtained from the same device 100. Optionally, one or more additional bearings of interest Bn from a different angular origin may be obtained from a separate camera 5 or 7 of the device 100, or from a camera on a connected device (e.g., connected laptop, tablet, or mobile device 40 of FIG. 1A; or connected satellite camera 7 on satellite tower 14b of FIG. 2K).

As noted, the set, obtained, or widened sub-scenes SS representing widths FW or SW may be adjusted in step S18, e.g., (i) to be of equivalent or matching size to other sub-scenes; (ii) to be evenly divided or dividable with respect to the aspect ratio of the output image or stream signal (e.g., divided into 2, 3, or 4 segments), optionally not below the width floor or above the ceiling previously noted; (iii) to avoid overlap with other sub-scenes at nearby bearings of interest; and/or (iv) to match brightness, contrast, or other video properties with other sub-scenes.

In step S20 (which may include steps from FIGS. 16-18 Modes One, Two, or Three, in reasonable and operative combinations), data and/or metadata regarding identified bearings of interest B1, B2 . . . Bn and sub-scenes FW1, FW2 . . . FWn and/or SS1, SS2 . . . SSn are recorded for tracking purposes. For example, the relative location from origin OR, widths, height, and/or any adjusted parameters noted above may be recorded.

Alternatively in step S20, predictive or tracking data associated with sub-scenes may be recorded, e.g., added to a sub-scene, bearing, or other feature tracking database in step S20. For example sub-scenes FW1, FW2 . . . FWn and/or SS1, SS2 . . . SSn may be momentary images, image blocks, or video blocks, identified within an image or video scene SC. In the case of video, depending on compression/decompression approach for video, predictive data may be associated with a scene or sub-scene and may be recorded as data or metadata associated with a sub-scene, but will tend to be part of add new sub-scene(s) to tracking.

Following the recording of tracking or other data of interest, processing returns to the main routine.

Compositing Sub-Scenes per Circumstance

In step S30 of FIG. 12, the process composites sub-scenes per circumstances (e.g., per data, flags, indicia, settings, or other action parameter recorded as tracking data or as scene data in, e.g., step S20), i.e., combines the first, optionally second, and optionally subsequent discrete sub-scenes FW1, FW2 . . . FWn and/or SW1, SW2 . . . SWn into a composited scene or single camera image. Herein, single camera image may refer to a single frame of video or a single composited video frame, representing a USB (or other peripheral bus or network) peripheral image or video signal or stream corresponding to a single USB (or other peripheral bus or network) camera.

In step S32, the device 100, its circuits, and/or its executable code may identify relevant sub-scenes to be arranged in a composited, combined image or video stream. "Relevant" may be determined according to the criteria discussed with respect to identification in step S14 and/or update and tracking in step S20. For example, one relevant sub-scene would be that of the most recent speaker; and a second relevant sub-scene may be that of the second most recent speaker. The two most recent speakers may be the most relevant until a third speaker becomes more relevant by speaking. An embodiment herein accommodates three speakers within sub-scenes within the composited scene, each with either an equally wide segment or a segment wide enough to hold their head and/or shoulders. However, two speakers or four speakers or more may be readily accommodated as well, at respectively wider or narrower shares of composited screen width.

Up to eight speakers could be reasonably accommodated by selecting sub-scenes encapsulating a face only in height and width (e.g., four in a top row, four in a bottom row of the composited scene); and arrangements from four to eight speakers may be accommodated by appropriate screen and/or window (sub-scenes corresponding to windows) buffering and compositing (e.g., presenting sub-scenes as a deck of cards with overlap, or as a foreshortened ring of views with more relevant speakers larger and to the front and less relevant speakers smaller and toward the back). The scenes may also include whiteboard content whenever the system determines that WB is the most relevant scene to show. The WB may be presented prominently, taking up the majority or major portion of the scene, while the speakers may be optionally presented picture-in-picture with the WB content.

In step S34, the relevant sub-scene set is compared to previously relevant sub-scenes. Steps S34 and S32 may be performed in reverse order. The comparison determines whether previously relevant sub-scenes are available, should remain on screen, should be removed from screen, should be recomposited in a smaller or larger size or perspective, or otherwise need to be changed from a previously composited scene. If new sub-scenes should be displayed, there may be too many candidate sub-scenes for scene change. In step S36, for example, a threshold for scene change may be checked (this step may be performed before or between steps S32 and S34). For example, when a number of discrete sub-scenes becomes greater than a threshold number (e.g., 3), it may be preferable to output the entire wide angle scene SC (e.g., either as is, or segmented and stacked to fit within the aspect ratio of a USB peripheral device camera). As a single camera scene instead of the composited scene of multiple sub-scenes or as the Composited Output CO.

In step S38, the device 100, its circuits, and/or its executable code may set sub-scene members and an order for composited to the Composted Output CO. In other words, having determined the candidate members for the sub-scene complement to be output, and whether any rules or thresholds for scene change are met or exceeded, the order of the scenes and the transitions by which they are added, removed, switched, or rearranged may be determined in step S38. It should be noted that step S38 is more or less significant depending on the previous steps and speaker history. If two or three speakers are identified and to be displayed simultaneously as the device 100 is beginning to operate, step S38 starts with a clean slate and follows default relevance rules (e.g., present speakers clockwise; start with no more than three speakers in the Composite Output CO). If the same three speakers remain relevant, sub-scene members, order, and composition may not change in step S38.

As previously noted, identifications discussed with reference to step S18 and predictions/updates discussed with reference to step S20 may cause changes in Composited Output CO in steps S32-S40. In step S40, the transition and compositions to be performed are determined.

For example, the device 100 may obtain from the wide angle scene SC a subsequent (e.g., third, fourth, or more) discrete sub-scene at a subsequent bearing of interest. In steps S32-S38, the subsequent sub-scene may be set to be composited or combined into the composited scene or Composited Output CO. Further, in steps S32-S38, another sub-scene other than that subsequent sub-scene (e.g., a prior or less relevant sub-scene) may be set to be removed (by composited transition) from the composited scene (then composited and output as the composited scene or Composited Output CO formatted as a single camera scene in step S50).

As an additional or alternative example, the device 100 may in steps S32-S38, according to the setting of an addition criterion or criteria as discussed with reference to steps S18 and/or S20 (e.g., time of speaking, frequency of speaking, audio frequency cough/sneeze/doorbell, amplitude of sound, coincidence of speech angle and face recognition), set a sub-scene may be set to be composited or combined into or removed from the composited scene or Composited Output CO. In steps S32-S38, only subsequent sub-scenes satisfying the addition criteria may be set to be combined into the composited scene. In step S40, the transition and compositions to be performed are determined. The composited scene is then composited and output as the Composited Output CO formatted as a single camera scene in step S50.

As an additional or alternative example, the device 100 may in steps S32-S38, set a sub-scene as a protected sub-scene protected from removal based on a retention criterion or criteria as discussed with reference to steps S18 and/or S20 (e.g., time of audio/speaking, frequency of audio/speaking, time since last speaking, tagged for retention). In steps S32-S38, removing a sub-scene other than the subsequent sub-scene does not set a protected sub-scene to be removed from the composited scene. In step S40, the transition and compositions to be performed are determined. The composited scene is then composited and output as the Composited Output CO formatted as a single camera scene in step S50.

As an additional or alternative example, the device 100 may in steps S32-S38, set a sub-scene emphasis operation as discussed with reference to steps S18 and/or S20 (e.g., scaling, blinking, genie, bouncing, card sorting, ordering, cornering) based on an emphasis criterion or criteria (e.g., repeated speaker, designated presenter, most recent speaker, loudest speaker, object being rotated in hands/scene changes, high frequency scene activity in frequency domain, hand up). In steps S32-S38, at least of one of the discrete sub-scenes may be set to be emphasized according to the sub-scene emphasis operation based on a respective or corresponding emphasis criterion or criteria. In step S40, the transition and compositions to be performed are determined. The composited scene is then composited and output as the Composited Output CO formatted as a single camera scene in step S50.

As an additional or alternative example, the device 100 may in steps S32-S38, set a sub-scene participant notification or reminder operation as discussed with reference to steps S18 and/or S20 (e.g., blinking a light at the person on the side of the sub-scene) based on a sensor or sensed criterion or criteria (e.g., too quiet, remote poke). In steps S32-S38, a local reminder indicium may be set to be activated according to the notification or reminder operation based on a respective or corresponding sensed criterion or criteria. In step S40, the transition and compositions to be performed are determined. The composited scene is then composited and output as the Composited Output CO formatted as a single camera scene in step S50.

In step S40, the device 100, its circuits, and/or its executable code generates transition and composition to render changes in the sub-scene complement of the composited image smoothly. Following the composition of the Composited Output CO of tracking or other data of interest, processing returns to the main routine.

Composited Output

Figure 15:
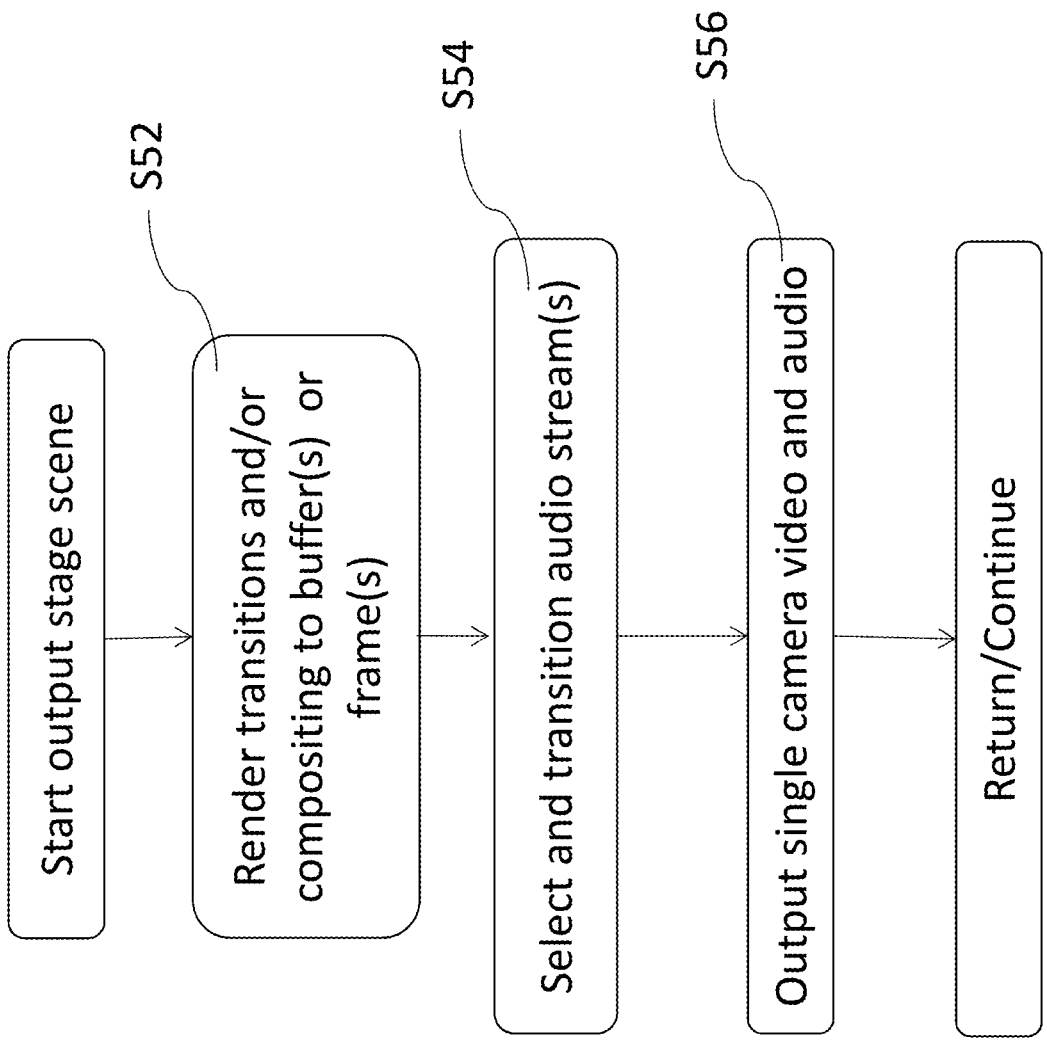
FIG. 15 shows a detailed flow chart including steps for outputting a composited stage scene video signal as a single camera signal.

In steps S52-S56 of FIG. 15, (optionally in reverse order) the composited scene is formatted, i.e., composited, to be received as a single camera scene; and/or transitions are rendered or composited to screen or frame (in this case, "screen" or "frame" corresponding to the single camera view output. The device 100, its circuits, and/or its executable code may use a compositing window or screen manager, optionally with GPU acceleration, to provide an off-screen buffer for each sub-scene and composite the buffers, together with peripheral graphics and transition graphics, into a single camera image representing a single camera view, and writes the result into the output or display memory. The compositing window or subscreen manager circuit may perform blending, fading, scaling, rotation, duplication, bending, contortion, shuffling, blurring or other processing on buffered windows, or render drop shadows and animations such as flip switching, stack switching, cover switching, ring switching, grouping, tiling, and the like. The compositing window manager may provide visual transitions wherein a sub-scene entering the composited scene may be composited to be added, removed, or switched with a transition effect. Sub-scenes may fade in or out, visibly shrink in or out, smoothly radiate in or outward.

In step S52, transitions or compositing are (as necessary, repeatedly, progressively, or continuously) rendered to frame, buffer, or video memory (noting the transitions and compositing may apply to individual frames or video streams, and may be ongoing processes through many frames of video of the entire scene STG, CO and individual component sub-scenes SS1, SS2 . . . SSn.

In step S54, the device 100, its circuits, and/or its executable code may select and transition audio stream(s). Similar to the window, scene, video, or sub-scene composition manager, audio stream(s) may be emphasized or de-emphasized, particularly in the case of a beam forming array 4, to emphasize the sub-scenes being composited. Similarly, syncing audio with the composited video scene may be performed.

In step S56, the device 100, its circuits, and/or its executable code output the simulation of single camera video and audio as the Composition Output CO. As noted, this output is of an aspect ratio and pixel count simulating a single, e.g., webcam view of a peripheral USB device, and may be used by group teleconferencing software as an external webcam input. When rendering the webcam input as a displayed view, the teleconferencing software will treat the Composition Output CO as any other USB camera, and all clients interacting with the host device 40 (or directly connected device 100 version of FIG. 1B) will present the Composition Output CO in all main and thumbnail views corresponding to the host device (or directly connected device 100 version of FIG. 1B).

Examples of Sub-Scene Compositing

As discussed with reference to FIGS. 12-16, the meeting camera 100 and processor 6 may composite (in step S30) and output (in step S50) a single camera video signal STG, CO. The processor 6, operatively connected to the ROM/RAM 8, may record a panoramic video signal SC (in step S12) having an aspect ratio of substantially 2.4:1 or greater, captured from a wide camera 2, 3, 5 having a horizontal angular field of view of substantially 90 degrees or greater. In one optional version, the panoramic video signal has an aspect ratio of substantially 8:1 or greater, captured from a wide camera having a horizontal angular field of view of substantially 360 degrees.

The processor 6 may subsample (e.g., in steps S32-S40) at least two sub-scene video signals SS1, SS2 . . . SSn (e.g., in FIGS. 8C-8E and 9C-9E, SS2 and SS5) at respective bearings of interest B1, B2 . . . Bn from the wide camera 100 (e.g., in step S14). The processor 6 may composite (to buffer, frame, or video memory, in steps S32-S40) two or more sub-scene video signals SS1, SS2 . . . SSn (e.g., in FIGS. 8C-8E and 9C-9E, SS2 and SS5) side-by-side to form a stage scene video signal CO, STG (in steps S52-S56) having an aspect ratio of substantially 2:1 or less. Optionally, in order to densely fill as much of a single camera video signal as possible (leading to larger views of participants), substantially 80% or more of the area of the stage scene video signal CO, STG may be subsampled from the panoramic video signal SC. The processor 6, operatively connected to the USB/LAN interface 10, may output the stage scene video signal CO, STG formatted as a single camera video signal (as in steps S52-S56).

Optionally, the processor 6 subsample an additional (e.g., third, fourth, or subsequent) sub-scene video signal SS1, SS2 . . . SS3 (e.g., in FIGS. 9C-9E, SS1) at a respective bearing of interest B1, B2 . . . Bn from the panoramic video signal SC (and/or optionally from buffer, frame or video memory, e.g., in GPU 6 and/or ROM/RAM 8, and/or directly from the wide camera 2, 3, 5). The processor may then composite the two or more sub-scene video signals SS1, SS2 . . . SS3 (e.g., in FIGS. 9C-9E, SS2 and SS5) initially composited onto the stage STG, CO together with one or more additional sub-scene video signals SS1, SS2 . . . SSn (e.g., in FIGS. 9C-9E, SS1) to form a stage scene video signal STG, CO having an aspect ratio of substantially 2:1 or less, and including a plurality of side-by-side sub-scene video signals (e.g., two, three, four or more subscene video signals SS1, SS2 . . . SSn composited in a row, or in a grid). It should be noted that the processor 6 may set or store in memory one or more addition criteria for one or more bearings of interest or a sub-scene video signals SS1, SS2 . . . SSn. In this case, for example, only those additional sub-scene video signals SS1, SS2 . . . SSn satisfying an addition criteria (e.g., sufficient quality, sufficient illumination, or the like) may be transitioned into the stage scene video signal STG, CO.

Alternatively, or in addition, the additional sub-scene video signal SS1, SS2 . . . SSn may be composited by the processor 6 into the stage scene video signal STG, CO by replacing one or more of the sub-scene video signals SS1, SS2 . . . SSn which may already be composited to the stage STG, CO to form a stage scene video signal STG, CO, still having an aspect ratio of substantially 2:1 or less. Each sub-scene video signal SS1, SS2 . . . SSn to be composited may be assigned a minimum width Min.1, Min.2 . . . Min.n, and upon completing each respective transition into the stage scene video signal STG, CO, each sub-scene video signal SS1, SS2 . . . SSn may be composited side-by-side at substantially no less than its minimum width Min.1, Min.2 . . . Min.n to form the stage scene video signal STG, CO.

In some cases, e.g., step S16-S18, the processor 6 may increase the composited width of each respective sub-scene video signal SS1, SS2 . . . SSn being transitioned to increase throughout the transition until the composited width is substantially equal to or greater than the corresponding respective minimum width Min.1, Min.2 . . . Min.n. Alternatively, or in addition, each sub-scene video signal SS1, SS2 . . . SSn may be composited by the processor 6 side-by-side at substantially no less than its minimum width Min.1, Min.2 . . . Min.n, and each SS1, SS2 . . . SSn at a respective width at which the sum of all composited sub-scene video signals SS1, SS2 . . . SSn substantially equals a width of the stage scene video signal or composited output STG, CO.

Additionally, or in the alternative, the width of sub-scene video signals SS1, SS2 . . . SSn within the stage scene video signal STG, CO are composited by the processor 6 to change (e.g., as in step S16-S18) according to one or more activity criteria (e.g., visual motion, sensed motion, acoustic detection of speech, or the like) detected at one or more bearing of interest B1, B2 . . . Bn corresponding to a sub-scene video signal SS1, SS2 . . . SSn, while a width of the stage scene video signal or composited output STG, CO is kept constant.

Optionally, the processor 6 may composite one or more sub-scene video signals SS1, SS2 . . . SSn (e.g., in FIGS. 9C-9E, SS2 and SS5) together with one or more additional sub-scene video signals SS1, SS2 . . . SSn (e.g., in FIGS. 9C-9E, SS1) to form a stage scene video signal by transitioning one or more additional sub-scene video signals SS1, SS2 . . . SSn (e.g., in FIGS. 9C-9E, SS1) into the stage scene video signal STG, CO by reducing a width of one or two or more sub-scene video signals SS1, SS2 . . . SSn (e.g., in FIGS. 9C-9E, SS2 and SS5) by an amount corresponding to the width of one or more added or subsequent sub-scene video signals SS1, SS2 . . . SSn (e.g., in FIGS. 9C-9E, SS1).

In some cases, the processor 6 may assign each sub-scene video signal SS1, SS2 . . . SSn a respective minimum width Min.1, Min.2 . . . Min.n, and may composite each sub-scene video signal SS1, SS2 . . . SSn side-by-side at substantially no less than the corresponding respective minimum width Min.1, Min.2 . . . Min.n to form the stage scene video signal or composited output STG, CO. When a sum of the respective minimum widths Min.1, Min.2 . . . Min.n of the two or more sub-scene video signals SS1, SS2 . . . SSn, together with one ore more additional sub-scene video signals SS1, SS2 . . . SSn exceeds a width of the stage scene video signal STG, CO, one or more of the two sub-scene video signals SS1, SS2 . . . SSn may be transitioned by the processor 6 to be removed from the stage scene video signal or composited output STG, CO.

In another alternative, the processor 9 may select at least one of two or more sub-scene video signals SS1, SS2 . . . SSn to be transitioned to be removed from the stage scene video signal STG, CO to correspond to a respective bearing of interest B1. B2 . . . Bn at which one or more activity criteria (e.g., visual motion, sensed motion, acoustic detection of speech, time since last speech or the like) were least recently satisfied.

In many cases, and as shown in FIG. 8B-8E and 9B-9E, the processor 6 may preserve a left to right (from top down, clockwise) order with respect to the wide camera 2, 3, 5 among respective bearings of interest B1, B2 . . . Bn of the two or more sub-scene video signals SS1, SS2 . . . SSn (e.g., in FIGS. 9C-9E, SS2 and SS5) and the one or more additional sub-scene video signals SS1, SS2 . . . SSn (e.g., in FIGS. 9C-9E, SS1) as the two or more sub-scene video signals SS1, SS2 . . . SSn are composited together with the at least one subsequent sub-scene video signals SS1, SS2 . . . SSn to form the stage scene video signal or composited output STG, CO.

Alternatively, or in addition, the processor 6 may select each respective bearing of interest B1, B2 . . . Bn from the panoramic video signal SC dependent upon one or more selection criteria (e.g., visual motion, sensed motion, acoustic detection of speech, time since last speech or the like) detected at the respective bearing of interest B1, B2 . . . Bn with respect to the wide camera 2, 3, 5. After the one or more selection criteria is no longer true, the processor 6 may transition the corresponding sub-scene video signal SS1, SS2 . . . SSn to be removed from the stage scene video signal or composited output STG, CO. The selection criteria may include the presence of an activity criteria satisfied at the respective bearing of interest B1, B2 . . . Bn. The processor 9 may counts time since one or more activity criteria were satisfied at the respective bearing of interest B1, B2 . . . Bn,. A predetermined period of time after one or more activity criteria were satisfied at the respective bearing of interest B1, B2 . . . Bn, the processor 6 may transition the respective sub-scene signal SS1, SS2 . . . SSn to be removed from the stage scene video signal STG.

With respect to the reduced panorama video signal SC.R shown in FIGS. 8A-8C, 9A-9C, 10A, 1B, 11A, 11B, and 22, the processor 6 may subsample a reduced panorama video signal SC.R of substantially 8:1 aspect ratio or greater from the panoramic video signal SC. The processor 6 may then composite two or more sub-scene video signals (e.g., in FIGS. 8C-8E and 9C-9E, SS2 and SS5) together with the reduced panorama video signal SC.R to form a stage scene video signal STG, CO having an aspect ratio of substantially 2:1 or less, including a plurality of side-by-side sub-scene video signals (e.g., in FIGS. 8C-8E, SS2 and SS5, and in FIGS. 9C-9E, SS1, SS2, and SS5) and the panoramic video signal SC.R.

In this case, the processor 6 may composite the two or more sub-scene video signals (e.g., in FIGS. 8C-8E, SS2 and SS5, and in FIGS. 9C-9E, SS1, SS2, and SS5) together with the reduced panorama video signal SC.R to form a stage scene video signal having an aspect ratio of substantially 2:1 or less including a plurality of side-by-side sub-scene video signals (e.g., in FIGS. 8C-8E, SS2 and SS5, and in FIGS. 9C-9E, SS1, SS2, and SS5) and the panoramic video signal SC.R above the plurality of side-by-side sub-scene video signals, the panoramic video signal being no more than ⅕ of the area of the stage scene video signal or composited output STG or CO and extending substantially across the width of the stage scene video signal or composited output STG or CO.

Figure 24:
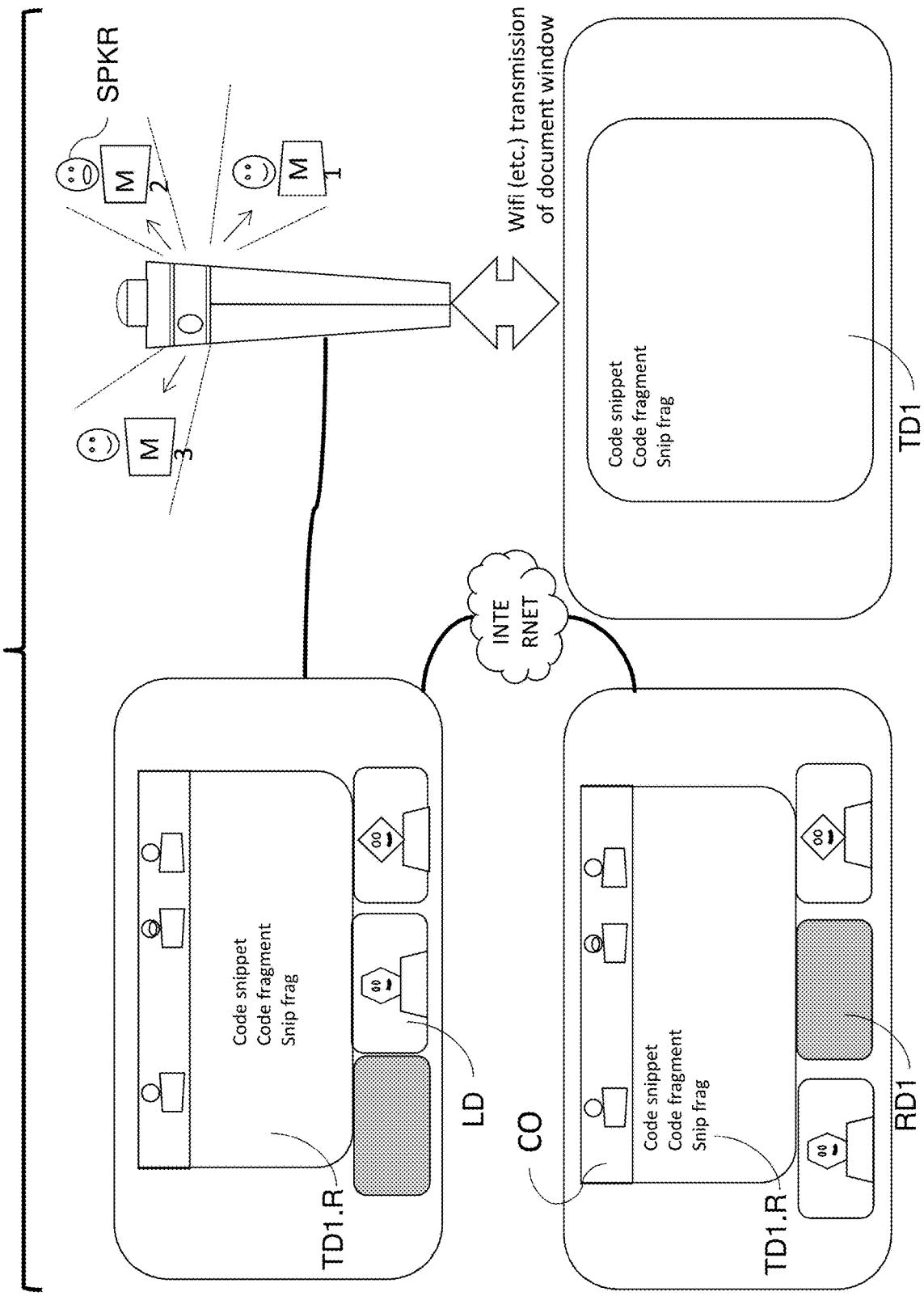
FIG. 24 shows a variation of the system of FIGS. 19-21 including a high-resolution text document view (e.g., text editor, word processing, presentation, or spreadsheet).

In an alternative, as shown in FIG. 24, the processor 6 may subsample or be provided with a subsample from a text video signal TD1 from a text document (e.g., from a text editor, word processor, spreadsheet, presentation, or any other document which renders text). The processor 6 may then transition the text video signal TD1 or a rendered or reduced version thereof TD1.R into the stage scene video signal STG, CO by replacing at least one of the two or more sub-scene video signals with the text video signal TD1 or equivalent TD1.R.

Optionally, the processor 6 may set one or more of two sub-scene video signals as a protected sub-scene video signal SS1, SS2 . . . SSn protected from transition based on one or more retention criteria (e.g., visual motion, sensed motion, acoustic detection of speech, time since last speech or the like). In this case, the processor 6 may transition one or more additional sub-scene video signals SS1, SS2 . . . SSn into the stage scene video signal by replacing at least one of the two or more sub-scene video signals SS1, SS2 . . . SSn, but in particular by transitioning a sub-scene video signal SS1, SS2 . . . SSn other than the protected sub-scene.

Alternatively, the processor 6 may set a sub-scene emphasis operation (e.g., blinking, highlighting, outlining, icon overlay, etc.) based on one or more emphasis criteria (e.g., visual motion, sensed motion, acoustic detection of speech, time since last speech or the like). In this case, one or more sub-scene video signal is emphasized according to the sub-scene emphasis operation, and based on a corresponding emphasis criteria.

In an additional variation, the processor 6 may set a sub-scene participant notification operation based on a sensed criterion from a sensor (e.g. detecting sound waves, vibrations, electromagnetic radiation, heat, UV radiation, radio, microwaves, electrical property, or depth/range detected by a sensor such as an RF element, passive infrared element or a rangefinding element). The processor 6 may activate one or more local reminder indicia according to the notification operation, based on a corresponding sensed criteria.

Examples of Bearings of Interest

For example, bearings of interest may be those bearing(s) corresponding to one or more audio signal or detection, e.g., a participant M1, M2 . . . Mn speaking, angularly recognized, vectored, or identified by a microphone array 4 by, e.g., beam forming, localizing, or comparative received signal strength, or comparative time of flight using at least two microphones. Thresholding or frequency domain analysis may be used to decide whether an audio signal is strong enough or distinct enough, and filtering may be performed using at least three microphones to discard inconsistent pairs, multipath, and/or redundancies. Three microphones have the benefit of forming three pairs for comparison.

As another example, in the alternative or in addition, bearings of interest may be those bearing(s) at which motion is detected in the scene, angularly recognized, vectored, or identified by feature, image, pattern, class, and or motion detection circuits or executable code that scan image or motion video or RGBD from the camera 2.

As another example, in the alternative or in addition, bearings of interest may be those bearing(s) at which facial structures are detected in the scene, angularly recognized, vectored, or identified by facial detection circuits or executable code that scan images or motion video or RGBD signal from the camera 2. Skeletal structures may also be detected in this manner.

As another example, in the alternative or in addition, bearings of interest may be those bearing(s) at which color, texture, and/or pattern substantially contiguous structures are detected in the scene, angularly recognized, vectored, or identified by edge detection, corner detection, blob detection or segmentation, extrema detection, and/or feature detection circuits or executable code that scan images or motion video or RGBD signal from the camera 2. Recognition may refer to previously recorded, learned, or trained image patches, colors, textures, or patterns.

As another example, in the alternative or in addition, bearings of interest may be those bearing(s) at which a difference from known environment are detected in the scene, angularly recognized, vectored, or identified by differencing and/or change detection circuits or executable code that scan images or motion video or RGBD signal from the camera 2. For example, the device 100 may keep one or more visual maps of an empty meeting room in which it is located, and detect when a sufficiently obstructive entity, such as a person, obscures known features or areas in the map.

As another example, in the alternative or in addition, bearings of interest may be those bearing(s) at which regular shapes such as rectangles are identified, including 'whiteboard' shapes, door shapes, or chair back shapes, angularly recognized, vectored, or identified by feature, image, pattern, class, and or motion detection circuits or executable code that scan image or motion video or RGBD from the camera 2.

As another example, in the alternative or in addition, bearings of interest may be those bearing(s) at which fiducial objects or features recognizable as artificial landmarks are placed by persons using the device 100, including active or passive acoustic emitters or transducers, and/or active or passive optical or visual fiducial markers, and/or RFID or otherwise electromagnetically detectable, these angularly recognized, vectored, or identified by one or more techniques noted above.

If no initial or new bearing(s) of interest is obtained in this manner (e.g., because no participant M1, M2 . . . Mn is yet speaking), a default view may be set instead of a composited scene for output as a single camera scene. For example, as one default view, an entire panoramic scene (e.g., of 2:1 through 10:1 H:V horizontal to vertical proportion) may be fragmented and arranged into the output single camera proportion (e.g., generally from 1.25:1 to 2.5:1 H:V horizontal to vertical proportion in landscape orientation, although the corresponding 'turned' portrait orientation proportions are also possible). As another example default view before a bearing of interest is initially obtained, a "window" corresponding to the output scene proportion may be tracked at an, e.g., fixed rate across the scene SC, e.g., as a simulation of a slowly panning camera. As another example default view may be comprised of a "headshot"(plus 5-20% additional width in margin) of each meeting attendant M1, M2 . . . Mn, with margin adjusted so as to optimized the available display area.

Examples of Aspect Ratios

While aspects of the embodiments and invention may be useful with any angular range or aspect ratio, the benefits are optionally greater when sub-scenes are formed from a camera providing a panoramic video signal having aspect ratio of substantially 2.4:1 or greater (the aspect ratio expressing either frame or pixel dimensions), and are composited into a multi-participant stage video signal having an overall aspect ratio of substantially 2:1 or less (e.g., such as 16:9:, 16:10, or 4:3) as is found in most laptop or television displays, and additionally, optionally if the stage video signal sub-scenes fill up more than 80% of the composited overall frame, and/or if the stage video signal sub-scenes and any additionally composited thumbnail form of the panoramic video signal fill up more than 90% of the composited overall frame. In this way, each shown participant fills the screen nearly as much as is practicable.

A corresponding ratio between vertical and horizontal angles of view may be determined as a ratio from $\alpha=2 \arctan(d/2f)$, where d is the vertical or horizontal dimension of the sensor and f is an effective focal length of the lens. Different wide angle cameras for meetings may have a 90 degree, 120 degree, or 180 degree field of view from a single lens, yet each may output a 1080p image (e.g., a 1920×1080 image) of aspect ratio 1.78:1 or a much wider image of aspect ratio 3.5:1, or other aspect ratio. When observing meeting scenes, the lesser aspect ratios (e.g., 2:1 or lower) combined with wide cameras of 120 degrees or 180 degrees may show more ceiling, wall, or table than may be desired. Consequently, while the aspect ratio of the scene or panorama video signal SC and angles of view FOV of a camera 100 may be independent, it is optionally advantageous of the present embodiments to match a wider camera 100 (90 degrees or higher) with a wider aspect ratio (e.g., 2.4:1 or higher) video signal, and further optionally with the widest camera (e.g., 360 degrees panoramic view) being matched with the widest aspect ratios (e.g., 8:1 or greater).

Examples of Tracking of Sub-Scenes or Bearings

Figure 16:
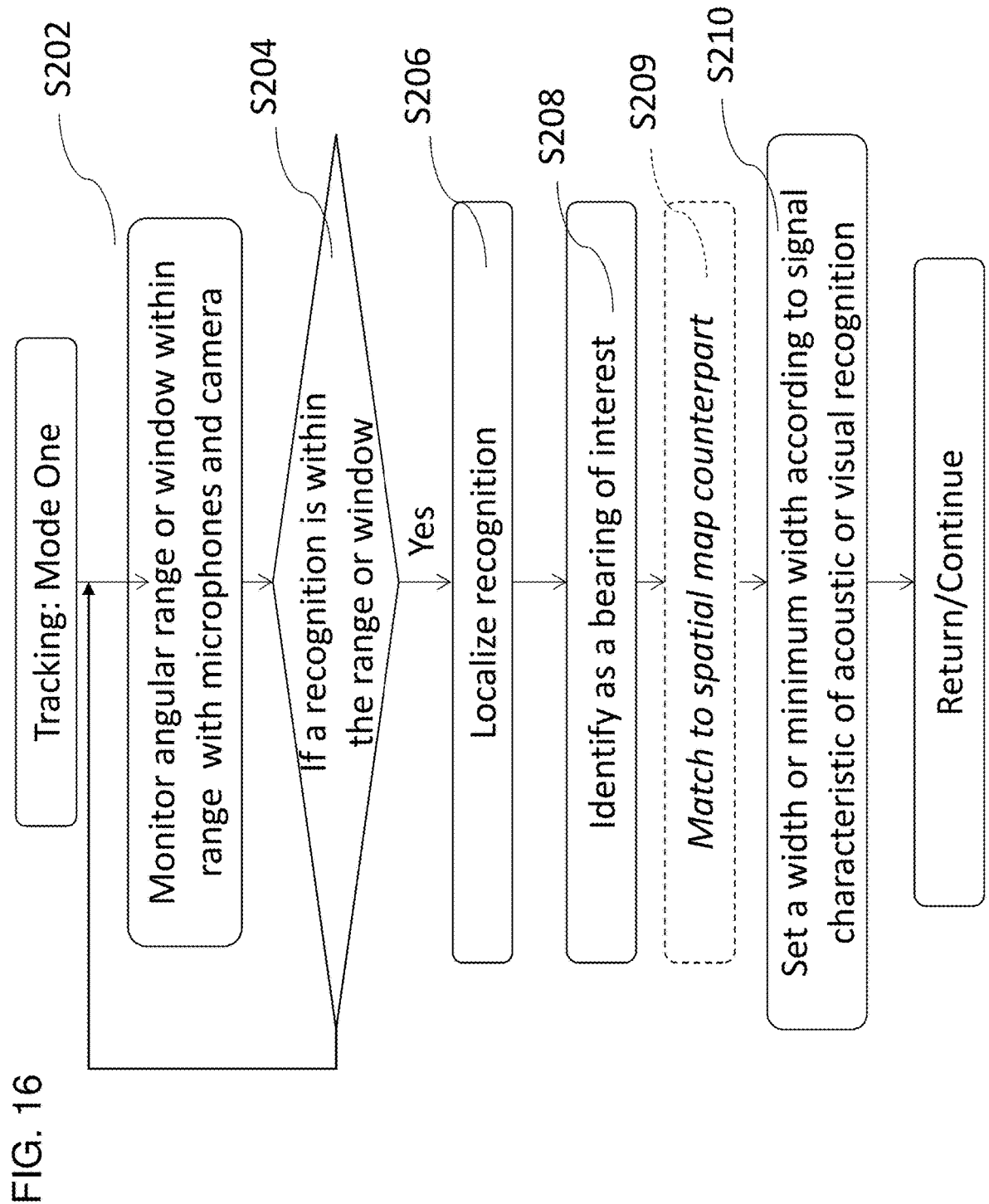
FIG. 16 shows a detailed flow chart including a first mode of conducting steps for localizing and/or bearings of interest and/or setting widths of sub-scenes.

The process carried out by the devices of FIGS. 1A and 1B, as shown in FIGS. 12-18, particularly 16-18, may include tracking the sub-scenes FW, SS at the bearings of interest B1, B2, . . . Bn within a wide video signal SC. As shown in FIG. 16, the processor 6, operatively connected to the acoustic sensor or microphone array 4 (with optional beam forming circuits) as well as the wide camera 2, 3, 5, monitors in step S202 the substantially common angular range, which is optionally or preferably substantially 90 degrees or greater.

The processor 6 may execute code or include or be operatively connected to circuits identifying a first bearing of interest B1, B2, . . . Bn along a localization (e.g., a measurement representing a position in Cartesian or polar coordinates, or a direction, or the like) of one or both of an acoustic recognition (e.g., frequency, pattern, or other voice recognition) or a visual recognition (e.g., motion detection, face detection, skeletal detection, color blob segmentation or detection) within the angular range of the wide camera 2, 3, 5 in step S204 and step S206. As in step S10, and in step S12 and S14, a sub-scene video signal SS is subsampled from the wide camera 2, 3, 5 (e.g., either newly sampled from the imaging element of the wide camera 2, 3, 5 or subsampled from the panoramic scene SC captured in step S12) along the bearing of interest B1, B2 . . . Bn identified in step S14. A width (e.g., minimum width Min.1, Min.2 . . . Min.n, or sub-scene display width DWid.1, DWid.2 . . . DWid.n) of the sub-scene video signal SS may be set by the processor 6 according to a signal characteristic one or both of the acoustic recognition and the visual/visual recognition in step S210. The signal characteristic may represent quality or confidence level of either of the various acoustic or visual recognitions. As used herein, "acoustic recognition" may include any recognition (e.g., meeting a threshold for a measurement, matching a descriptor, or the like) based on sound waves or vibrations, including frequency analysis of waveforms such as Doppler analysis, while "visual recognition" may include any recognition (e.g., meeting a threshold for a measurement, matching a descriptor, or the like) corresponding to electromagnetic radiation, such as heat or UV radiation, radio or microwaves, electrical property recognition or depth/range detected by a sensor such as an RF element, passive infrared element or a rangefinding element.

For example, bearings of interest B1, B2 . . . Bn identified in step S14 may be determined by combinations of such acoustic and visual recognitions in different orders, some of which are shown as Mode One, Two, or Three (which may be reasonably and logically combined with one another) in FIGS. 16-18. In one order, e.g., as in step S220 of FIG. 18, bearings of acoustic recognitions are recorded first (although this order may be repeated and/or changed). Optionally, such bearings B1, B2 . . . Bn may be either an angle, an angle with a tolerance, or a bearing of approximate or angular range (such as bearing B5 in FIG. 7A). As shown in step S228-S232 of FIG. 18, the recorded acoustic recognition bearings may be refined (narrowed or reassessed) based on a visual recognition (e.g., a face recognition) if a sufficiently reliable visual recognition is substantially within a threshold angular range of a recorded acoustic recognition. In the same mode or combined with another mode, e.g., as in step S218 of FIG. 17, any acoustic recognition that is not associated with a visual recognition may remain as a candidate bearing of interest B1, B2 . . . Bn.

Optionally, as in step S210 of FIG. 16, the signal characteristic is representative of a confidence level of either or both of the acoustic recognition and the visual recognition. "Confidence level" need not meet a formal probabilistic definition, but may mean any comparative measurement which establishes a degree of reliability (e.g., crossing a threshold amplitude, signal quality, signal/noise ratio or equivalent, or success criteria). Alternatively, or in addition, as in step S210 of FIG. 16, the signal characteristic may be representative of the width of a feature recognized within one or both of the acoustic recognition (e.g., an angular range within which a sound may originate) or the visual recognition (e.g., interpupillary distance, face width, body width). For example, the signal characteristic may correspond to an approximated width of a human face recognized along a bearing of interest B1, B2 . . . Bn (e.g., determined by a visual recognition). A width of a first sub-scene video signal SS1, SS2 . . . SSn may be set according to a signal characteristic of the visual recognition.

Figure 18:
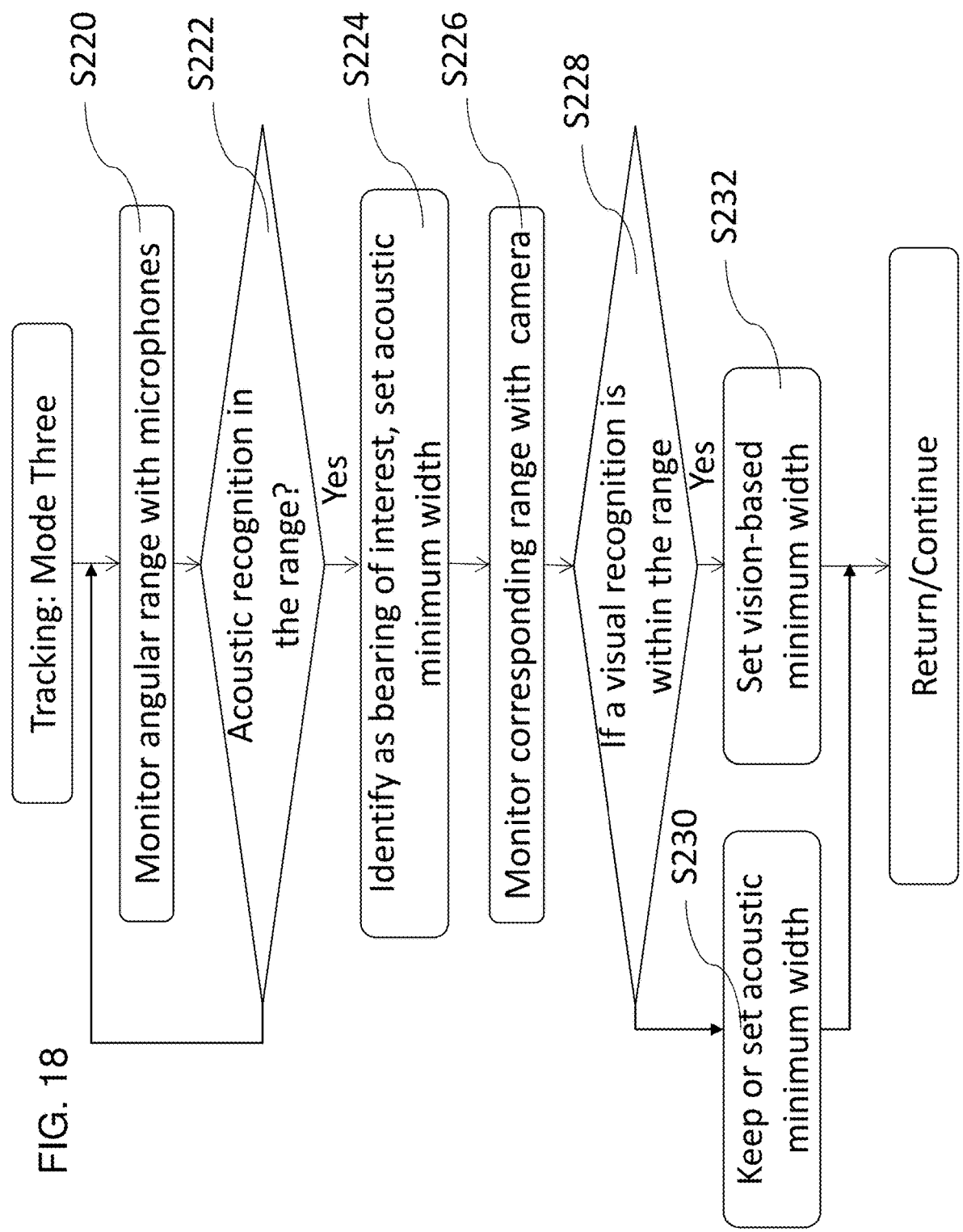
FIG. 18 shows a detailed flow chart including a third mode of conducting steps for localizing and/or bearings of interest and/or setting widths of sub-scenes.

In some cases, e.g., as in step S228 of FIG. 18, if a width is not set (for example, cannot be reliably set, or the like, in the case of an inability to recognize a width-defining feature) according to a signal characteristic of the visual recognition, as in step S230 of FIG. 18, a predetermined width may be set along a localization of an acoustic recognition detected within the angular range. For example, as in step S228 and S232 of FIG. 18, if no face may be recognized by image analysis along a bearing of interest B1, B2 . . . Bn evaluated to have an acoustic signal indicative of human speech, a default width (e.g., a sub-scene having a width equivalent to from $1/10$ to $1/4$ of the width entire scene SC) may be kept or set, e.g., as in step S230 along the acoustic bearing for defining a subscene SS. For example, FIG. 7A shows an attendee and speaker scenario in which the face of attendee M5 is directed toward attendee M4, and M5 is speaking. In this case, the acoustic microphone array 4 of the meeting camera 100 may be able to localize speaker M5 along a bearing of interest B5 (here, the bearing of interest B5 depicted as a bearing range rather than a vector), yet image analysis of the panoramic scene SC of the wide camera 2, 3, 5 video signal may not be able to resolve a face or other visual recognition. In such a case, the default width Min.5 may be set as a minimum width for initially defining, limiting, or rendering a sub-scene SS5 along bearing of interest B5.

In another embodiment, a bearing of interest B1, B2 . . . Bn may be identified directed toward an acoustic recognition detected within the angular range of the meeting camera 100. In this case, the processor 6 may identify a visual recognition proximate to the acoustic recognition as in step S209, optional, of FIG. 16 (e.g., within, overlapping, or next to the bearing of interest B1, B2 . . . Bn, e.g., within 5-20 degrees of arc of the bearing of interest B1, B2 . . . Bn). In this case, the width of the first sub-scene video signal SS1, SS2 . . . SSn may be set according to a signal characteristic of the visual recognition that was, or is, proximate or otherwise matched to the acoustic recognition. This may occur when, e.g., a bearing of interest B1, B2 . . . Bn is first identified with the acoustic microphone array 4, and is later validated or verified with a sufficiently nearby or otherwise matched facial recognition using the video image from the wide camera 100.

In a variation, as described with reference to FIGS. 17 and 16, the system including the meeting or wide camera 100 may make a spatial map as in step S218 of FIG. 17 using either potential visual recognitions or acoustic recognitions, then as in step S209 of FIG. 16 rely upon this spatial map to validate later, associated, matched, proximate, or "snapped to" recognitions by the same or a different or other recognition approach. For example, in some cases the overall panoramic scene SC may be too large to scan effectively on a frame by-frame basis for facial recognition or the like. In this case, because people do not remarkably move from place to place in a meeting situation where the camera 100 is used, and especially after taking their seats for the meeting, only a part of the overall panoramic scene SC may be scanned, e.g., per video frame.

Figure 17:
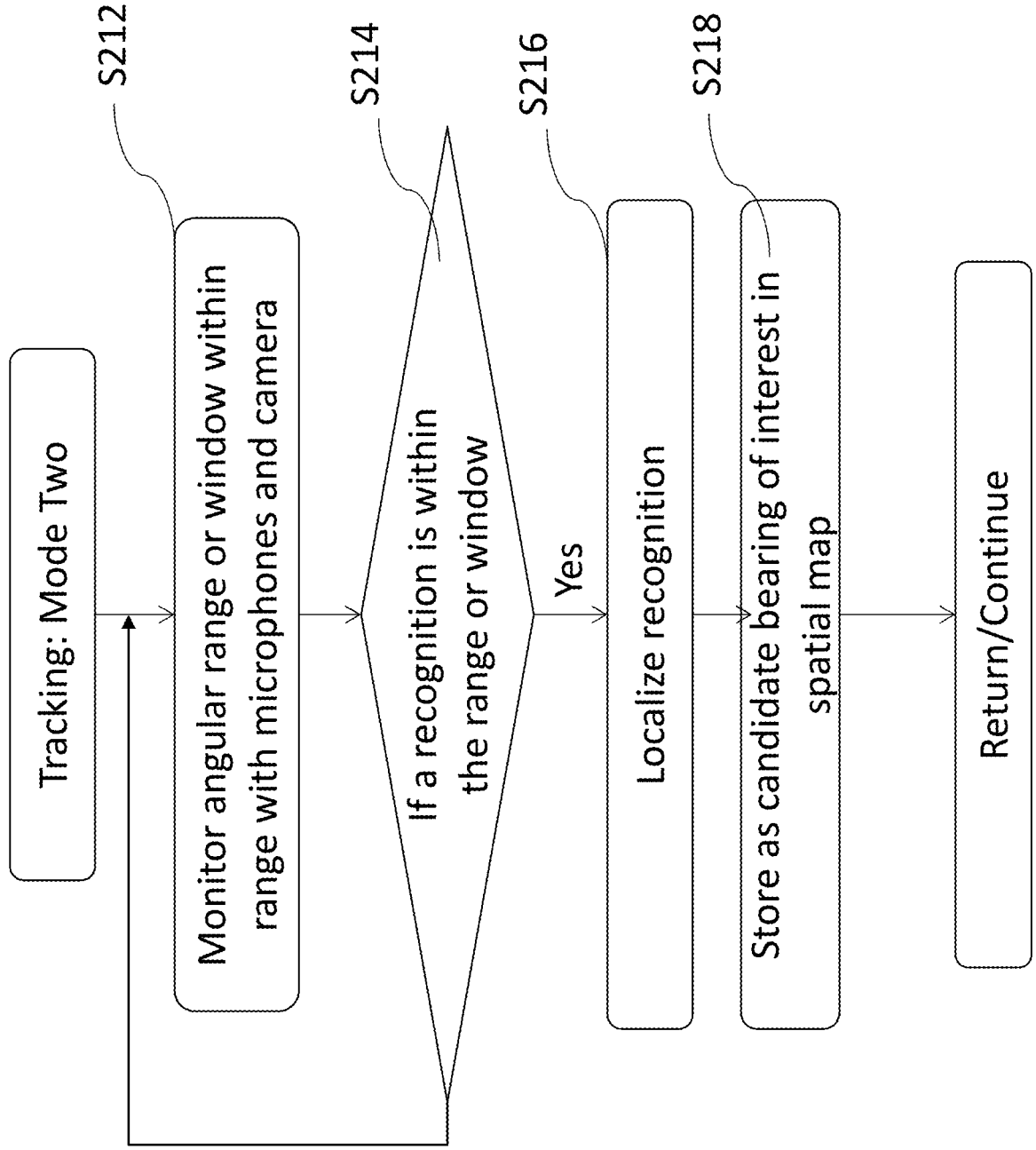
FIG. 17 shows a detailed flow chart including a second mode of conducting steps for localizing and/or bearings of interest and/or setting widths of sub-scenes.

For example, as in step S212 of FIG. 17, in order to track sub-scenes SS1, SS2 . . . SSn at bearings of interest B1, B2 . . . Bn within a wide video signal, the processor 6 may scan a subsampling window through a motion video signal SC corresponding to a wide camera 100 field of view of substantially 90 degrees or greater. The processor 6 or circuit associated therewith may identify candidate bearings of interest B1, B2 . . . Bn within the subsampling window, by substantially satisfying a threshold for defining a suitable signal quality for a candidate bearing of interest B1, B2 . . . Bn, e.g., as in step S214 of FIG. 17. Each bearing of interest B1, B2 . . . Bn may correspond to a localization of a visual recognition detected within the subsampling window, e.g., as in step S216 of FIG. 17. As in step S218 of FIG. 17, the candidate bearings B1, B2 . . . Bn may be recorded in a spatial map (e.g., a memory or database structure keeping track of the position, location, and/or direction of the candidate bearings). In this manner, for example, facial recognitions or other visual recognitions (e.g., motion) may be stored in the spatial map, even if no acoustic detection has yet occurred at that bearing. Subsequently, the angular range of the wide camera 100 may be monitored by the processor 6 with the acoustic sensor or microphone array 4 for an acoustic recognition (which may be used to validate the candidate bearings of interest B1, B2 . . . Bn).

With reference to FIG. 7A, for example, the processor 6 of the meeting camera 100 may scan a different subsampled window of the entire panoramic scene SC for visual recognitions (e.g., face, color, motion, or the like). Depending on lighting, motion, orientation of faces and the like, in FIG. 7, potential bearings of interest may be stored in the spatial map, corresponding to a facial, motion or similar detection of attendees M1 . . . M5. However, in the scenario shown in FIG. 7A, a potential bearing of interest toward attendee Map.1, if corresponding to a non-speaking attendee, may not be later validated by an acoustic signal (and this attendee may never be captured in a sub-scene, but only within the panoramic scene). Once an attendee M1 . . . M5 has spoken or is speaking, the potential bearings of interest including or toward these attendees may be validated and recorded as bearings of interest B1, B2 . . . B5.

Optionally, as in step S209 of FIG. 16, when an acoustic recognition is detected proximate to (substantially adjacent, near, or within +/−5-20 degrees of arc) one candidate bearing recorded in the spatial map, the processor 6 may snap a bearing of interest B1, B2 . . . Bn to correspond to substantially that one candidate bearing. Step S209 of FIG. 16 indicates that a bearing of interest is matched to a spatial map counterpart, and the "matching" may include associating, replacing or changing a bearing of interest value. For example, because a facial or motion recognition within the window and/or the panoramic scene SC may have a better resolution yet a more infrequent or less reliable detection than that of an acoustic or microphone array 4, the detected bearing of interest B1, B2 . . . Bn resulting from an acoustic recognition may be changed, recorded as, or otherwise corrected or adjusted according to the visual recognition. In this case, instead of subsampling the sub-scene video signal SS1, SS2 . . . SSn along the apparent bearing of interest B1, B2 . . . Bn derived from the acoustic recognition, the processor 6 may subsample the sub-scene video signal along the bearing of interest B1, B2 . . . Bn following the snapping operation, e.g. from the wide camera 100 and/or panoramic scene SC after the acoustic bearing of interest B1, B2 . . . Bn has been corrected using the previously mapped visual recognitions. In this case, as in step S210 of FIG. 16, the width of the sub-scene video signal SS may be set according to a detected face width or motion width, or alternatively, according to a signal characteristic (e.g., default width, resolution of the array 4, confidence level, width of a feature recognized within one or both of the acoustic recognition or the visual recognition, an approximated width of a human face recognized along the bearing of interest) of the acoustic recognition. As in step S210 of FIG. 16, or step S230 of FIG. 18, if a sub-scene SS width is not set according to a signal characteristic of the visual recognition such as a face width or a range of motion, a predetermined width (e.g., such as default width Min.5 as in FIG. 7A) may be set according to an acoustic recognition.

In the example of FIG. 18, the meeting camera 100 and processor 6 may track sub-scenes at bearings of interest B1, B2 . . . Bn by recording a motion video signal corresponding to a wide camera 100 field of view FOV of substantially 90 degrees or greater. The processor, in step S220, may monitor an angular range corresponding to the wide camera 100 field of view FOV with an acoustic sensor array 4 for an acoustic recognition, and when an acoustic recognition is detected in the range in step S222, in step S224, may identify a bearing of interest B1, B2 . . . Bn directed toward an acoustic recognition detected within the angular range. The processor 6 or associated circuits may in step S226 then locate a subsampling window in the motion video signal of the panoramic scene SC according to a corresponding range of the bearing of interest B1, B2 . . . Bn (e.g., similar to the range of bearing of interest B5 of FIG. 7A). The processor may then, if a visual recognition is detected within the range as in step S228, localize a visual recognition detected within the subsampling window. Subsequently, the processor 6 may subsample a sub-scene video signal SS captured from the wide camera 100 (directly from the camera 100 or from a panoramic scene recording SC) optionally substantially centered on the visual recognition. As in step S232, the processor 6 may then set width of the sub-scene video signal SS according to a signal characteristic of the visual recognition. In those cases where no visual recognition is possible, suitable, detected, or selected, as in step S228 of FIG. 18, the processor 6 may keep or select an acoustic minimum width, as in step S230 of FIG. 18.

Alternatively, the meeting camera 100 and processor 6 may track sub-scenes at bearings of interest B1, B2 . . . Bn within a wide video signal such as panoramic scene SC by, as in FIG. 16-18, by, e.g., in step S212 of FIG. 17, monitoring an angular range with an acoustic sensor array 4 and a wide camera 2, 3, 5 observing a field of view of substantially 90 degrees or greater. The processor 6 may identify a plurality of bearings of interest B1, B2 . . . Bn each directed toward a localization (acoustic or visual or sensor-based, as in step S216) within the angular range, and as the bearings of interest B1, B2 . . . Bn, corresponding recognitions, corresponding localizations, or data representative thereof are successively stored as in step S218 of FIG. 17, maintain a spatial map of recorded characteristics corresponding to the bearings of interest B1, B2 . . . Bn. Subsequently, for example, as in step S210 of FIG. 16, the processor 6 may subsample a sub-scene video signal SS1, SS2 . . . SSn from the wide camera 100 substantially along at least one bearing of interest B1, B2 . . . Bn, and set a width of the sub-scene video signal SS1, SS2 . . . SSn according to a recorded characteristic corresponding to the at least one bearing of interest B1, B2 . . . Bn.

Examples of Predictive Tracking

In the above description of structures, apparatuses, methods and techniques for identification of new bearings of interest, various detection, recognition, triggering, or other causation are described for identifying such new bearings of interest. The following description discusses updating, tracking, or predicting changes in bearing, direction, location, pose, width, or other characteristics of bearings of interest and sub-scenes, and this updating, tracking, and predicting may be applied to the above description as well. It should be noted that the description of methods for identification of new bearings of interest and updating or predicting changes in bearings or sub-scenes are related, in that the re-acquisition of a bearing of interest or sub-scene is facilitated by tracking or prediction. The methods and techniques discussed herein for identifying new bearings of interest in step S14 can be used to scan, identify, update, track, record, or re-acquire bearings and/or sub-scenes in step(s) S20, S32, S54, or S56, and vice versa.

Predictive video data may be recorded per sub-scene, e.g., data encoded according to or related to predictive HEVC, H.264, MPEG-4, other MPEG I-slices, P-slices, and B-slices (or frames, or macroblocks); other intra and inter frames, pictures, macroblocks, or slices; H.264 or other SIframes/slices, SPframes/slices (Switching P), and/or multiframe motion estimation; VP9 or VP10 superblock, block, macroblock or superframe, frame intra and inter prediction, compound prediction, motion compensation, motion vector prediction, and/or segmentation.

Other predictive or tracking data as noted above independent of a video standard or motion compensation SPI may be recorded, e.g., a motion vector derived from audio motion relative to the microphone array, or a motion vector derived from direct or pixel based methods (e.g., block-matching, phase correlation, frequency domain correlation, pixel recursion, optical flow), and/or indirect or feature based methods (feature detection such as corner detection with a statistical function such as RANSAC applied over a sub-scene or scene area).

In addition or in the alternative, updating or tracking per sub-scene may record, identify, or score indicia of relevance or data or information representative thereof, e.g., derived audio parameters such as amplitude, frequency of utterances, length of utterances, related attendees M1, M2 ... Mn (two sub-scenes with back and forth traffic), lead or moderating attendee M.Lead (a sub-scene which regularly briefly interjects audio), a recognized signal phrase (e.g., clapping, "keep camera on me" and other phrase and speech recognition. These parameters or indicia may be recorded independently of the tracking step or at a different time than during the tracking step. Tracking per sub-scene may also record, identify, or score indicia of error or irrelevance, e.g., audio representative of coughs or sneezes; regular or periodic motion or video representing machinery, wind, or flickering; transient motion or motion at a sufficiently high frequency to be transient.

In addition or in the alternative, updating or tracking per sub-scene may record, identify, or score indicia for setting and/or protecting a sub-scene from removal or data or information representative thereof, e.g., based on a retention criterion or criteria (e.g., time of audio/speaking, frequency of audio/speaking, time since last speaking, tagged for retention). In subsequent processing for compositing, removing a sub-scene other than a new or subsequent sub-scene does not remove a protected sub-scene from the composited scene. In other words, protected sub-scenes would be lower priority for removal from the composited scene.

In addition or in the alternative, updating or tracking per sub-scene may record, identify, or score indicia for setting an addition criterion or criteria or data or information representative thereof, (e.g., time of speaking, frequency of speaking, audio frequency cough/sneeze/doorbell, amplitude of sound, coincidence of speech angle and face recognition), In processing for compilation, only subsequent sub-scenes satisfying the addition criteria are combined into the composited scene.

In addition or in the alternative, updating or tracking per sub-scene may record, identify, or score indicia for setting a sub-scene emphasis operation, e.g., as audio, CGI, image, video, or compositing effects or data or information representative thereof, (e.g., scaling one sub-scene to be larger, blinking or pulsing a border of one sub-scene, interjecting a new sub-scene with a genie effect (growing from small to large), emphasizing or interjecting a sub-scene with a bouncing effect, arranging one or more sub-scenes with a card sorting or shuffling effect, ordering sub-scenes with an overlapping effect, cornering a sub-scene with a "folded-over" graphic corner appearance) based on an emphasis criterion or criteria (e.g., repeated speaker, designated presenter, most recent speaker, loudest speaker, motion detection of an object being rotated in hands/scene changes, high frequency scene activity in frequency domain, motion or skeletal recognition of hand up). In compilation processing, at least of one of the discrete sub-scenes is emphasized according to the sub-scene emphasis operation based on a respective or corresponding emphasis criterion.

In addition or in the alternative, updating or tracking per sub-scene may record, identify, or score indicia for setting a sub-scene participant notification or reminder operation or data or information representative thereof, (e.g., blinking a light on the device 100 at the attendee M1, M2 . . . Mn, optionally a light on the same side as the sub-scene) based on a sensor or sensed criterion (e.g., too quiet, remote poke from social media). In compilation processing or otherwise, a local reminder indicium or indicia is activated according to the notification or reminder operation based on a respective or corresponding sensed criterion.

In addition or in the alternative, updating or tracking per sub-scene may record, identify, or score indicia for predicting or setting a change vector for each respective angular sector FW1, FW2 . . . FWn or SW1, SW2 . . . SWn or data or information representative thereof, e.g., based on a change in velocity or direction of a recorded characteristic (e.g., color blob, face, audio, as discussed herein with respect to steps S14 or S20) of each recognition or localization, and/or for updating a direction of respective angular sectors FW1, FW2 . . . FWn or SW1, SW2 . . . SWn based on the prediction or setting.

In addition or in the alternative, updating or tracking per sub-scene may record, identify, or score indicia for predicting or setting a search area for recapture or re-acquisition of a lost recognition or localization or data or information representative thereof, e.g., based on a most recent position of a recorded characteristic (e.g., color blob, face, audio) of each recognition or localization, and/or for updating a direction of respective angular sectors based on the prediction or setting. The recorded characteristic may be at least one color blob, segmentation, or blob object representative of skin and/or clothing.

In addition or in the alternative, updating or tracking per sub-scene may maintain a Cartesian or in particular or optionally a polar map (e.g., based on bearings B1, B2 . . . Bn or angles from origin OR within the scene SC and angular ranges such as sub-scenes SS1, SS2 . . . SSn corresponding to angular sectors FW/SW within the scene SC) of recorded characteristics, each recorded characteristic having at least one parameter representative of a bearing B1, B2 . . . Bn of the recorded characteristic.

Accordingly, alternatively or in addition, the embodiment of the device 100, its circuits, and/or executable code stored and executed within the ROM/RAM 8 and/or CPU/GPU 6 may track sub-scenes of interest SS1, SS2 . . . SSn corresponding to widths FW and/or SW within a wide angle scene SC by monitoring a targeted angular range (e.g., a horizontal range of cameras 2n, 3n, 5, or 7 forming the scene SC, or a subset of this) with an acoustic sensor array 4 and an optical sensor array 2, 3, 5, and/or 7. The device 100, its circuits, and/or its executable code may scan the targeted angular range SC for recognition criteria (e.g., sounds, faces), e.g., as discussed herein with respect to steps S14 (new bearing of interest identification) and/or step S20 (tracking and characteristic information for bearings/sub-scenes) of FIG. 8. The device 100, its circuits, and/or its executable code may identify a first bearing of interest B1 based on a first recognition (e.g., detection, identification, triggering, or other causation) and localization (e.g., angle, vector, pose, or location) by at least one of the acoustic sensor array 4 and the optical sensor array 2, 3, 5, and/or 7. The device 100, its circuits, and/or its executable code may identify a second bearing of interest B2 (and optionally a third and subsequent bearings of interest B3 . . . Bn) based on a second recognition and localization (and optionally third and subsequent recognitions and localizations) by at least one of the acoustic sensor array 4 and the optical sensor array 2, 3, 5, and/or 7.

The device 100, its circuits, and/or its executable code may set a respective angular sector (e.g., FW, SW, or other) for each bearing of interest B1, B2 . . . Bn by expanding, widening, setting or resetting an angular sub-scene (e.g., an initial small angular rage or face-based sub-scene FW) including the respective bearing of interest B1, B2 . . . Bn until a threshold (e.g., width threshold as discussed with reference to steps S16-S18 of FIG. 13) based on at least one recognition criteria (e.g., angular span as set or reset is wider than interpupillary distance, twice this, or more; angular span as set or reset is wider than a head-wall contrast, distance, edge, difference, or motion transition) is satisfied.

The device 100, its circuits, and/or its executable code may update or track (these terms used interchangeably herein) a direction or bearing B1, B2 . . . Bn of respective angular sectors FW1, FW2 . . . FWn and/or SW1, SW2 . . . SWn based on a change in direction or bearing B1, B2 . . . Bn of a recorded characteristic (e.g., color blob, face, audio) within or representative of each recognition and/or localization. Optionally, as discussed herein, the device 100, its circuits, and/or its executable code may update or track each respective angular sector FW1, FW2 . . . FWn and/or SW1, SW2 . . . SWn to follow angular changes in the first, second, and/or third and/or subsequent bearings of interest B1, B2 . . . Bn.

Composited Output Examples (w/ Videoconferencing)

In FIGS. 8A-8D, 10A-10B, and 19-24, the "Composited Output CO", i.e., the combined or composited sub-scenes as a composited and rendered/composited camera view, is shown with lead lines to both the main view of Remote Display RD1 (representing the scene received from the Meeting Room Local Display LD), as well as the network interface 10 or 10a, representing that the Meeting Room (Local) Display LD teleconferencing client "transparently" treats the video signal received from USB peripheral device 100 as a single camera view and passes the composited output CO on to the remote clients or Remote Displays RD1 and RD2. It should be noted that all the thumbnail views may also show the Composited Output CO. Generally, FIGS. 19, 20, and 22 correspond to the arrangement of attendees shown in FIGS. 3A-5B, with one additional attendee joining in FIG. 21 in the empty seat shown in FIGS. 3A-5B.

Among exemplary transitions, the reduced panoramic video signal SC.R (taking up approximately 25% of the vertical screen) may show a "zoomed in" piece of the panoramic scene video signal SC (e.g., as shown in FIGS. 9A-9E). The zoom level may be determined by the number of pixels contained in the approximately 25%. When a person/object M1, M2 . . . Mn becomes relevant, a corresponding sub-scene SS1, SS2 . . . SSn is transitioned (e.g., by compositing a sliding video panel) into the stage scene STG or composited output CO, maintaining its clockwise or left to right position among participants M1, M2 . . . Mn. Simultaneously, the processor, using the GPU 6 memory or ROM/RAM 8, may slowly scroll the reduced panoramic video signal SC.R left or right so as to display a current bearing of interest B1, B2 . . . Bn in the center of the screen. The current bearing of interest may be highlighted. As new relevant sub-scenes SS1, SS2 . . . SSn are identified, the reduced panoramic video signal SC.R may rotate or pan so that a most recent sub-scene SS1, SS2 . . . SSn is highlighted and located in the center of the reduced panoramic video signal SC.R. With this configuration, during the course of a meeting, the reduced panoramic video signal SC.R is continuously re-rendered and virtually panned to show relevant parts of the room.

Figure 19:
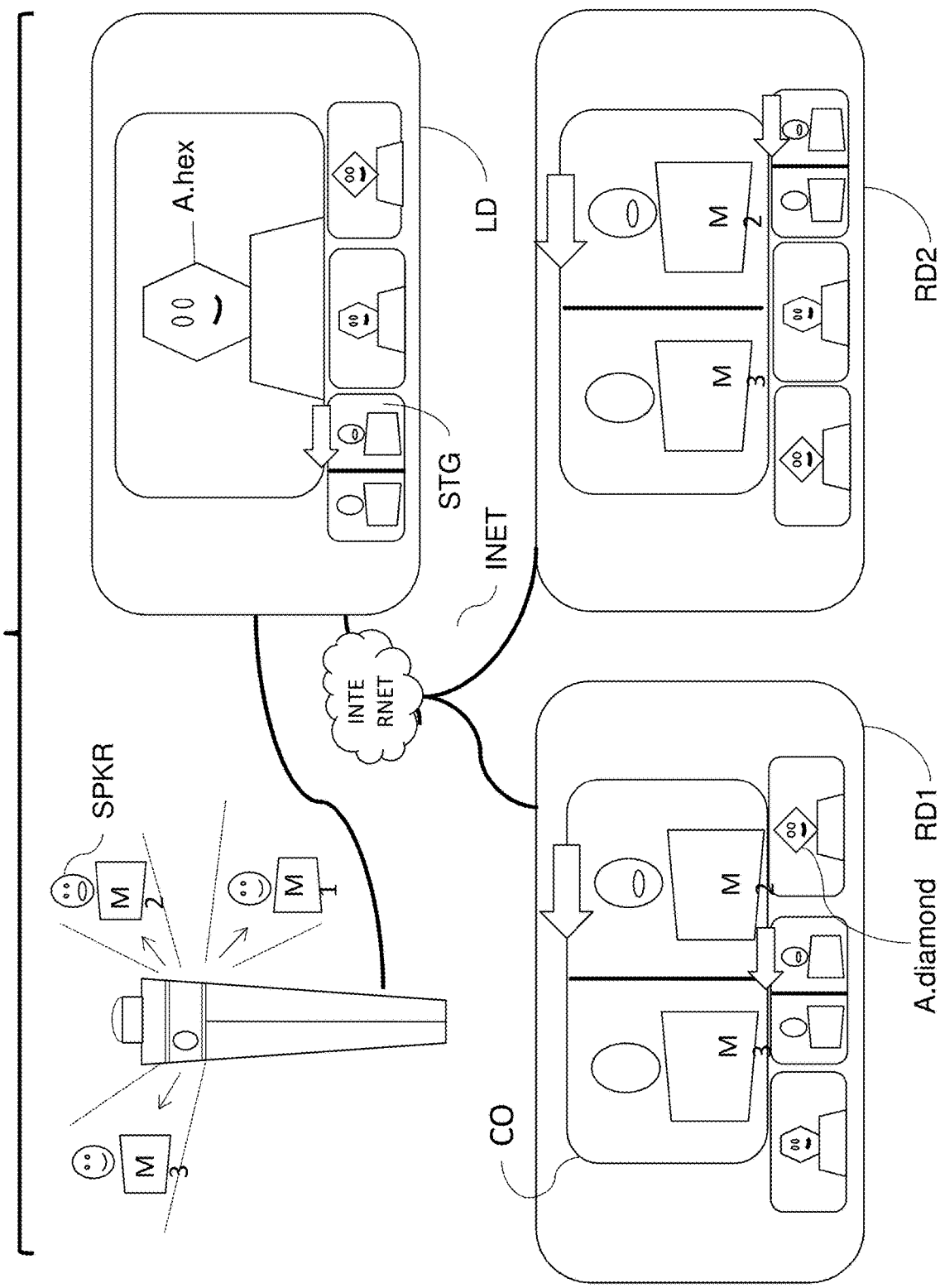
FIGS. 19-21 show the operation of an embodiment including a meeting camera attached to a local PC having a videoconferencing client receiving the single camera signal, substantially corresponding to FIGS. 3A-5B, the PC in turn connected to the internet, and two remote PCs or the like also receiving the single camera signal within the videoconferencing display.

As shown in FIG. 19, in a typical videoconferencing display, each attendee's display shows a master view and a plurality of thumbnail views, each substantially determined by the output signal of a web camera. The master view is typically one of the remote attendees, and the thumbnail views represent other attendees. Depending on the videoconferencing or chat system, a master view may be selected to show an active speaker among the attendees, or may be switched to another attendee, including the local scene in some cases—often by selection of the thumbnail. In some systems, the local scene thumbnail always remains within the overall display so that each attendee may position themselves with respect to the camera to present a useful scene (this example is shown in FIG. 19).

As shown in FIG. 19, the embodiments according to the invention provide, instead of a single camera scene, a composited stage view of multiple attendees. For example, in FIG. 19, potential bearings of interest B1, B2, and B3 to attendees M1, M2, and M2 (represented by icon figures M1, M2, and M3) are available to the meeting camera 100. As described herein, because there are three possible attendees M1, M2, M3 localized or otherwise identified and one SPKR is speaking, the stage STG (equivalent to the composited output CO) may be initially populated with a default number (in this case two) of relevant sub-scenes, including that of the active speaker SPKR, in FIG. 19 attendee M2.

The displays of three participants are shown in FIG. 19: a local display LD, e.g., a personal computer attached to the meeting camera 100 and to the internet INET; a first personal computer ("PC") or tablet display remote display RD1 of a first remote attendant A.hex, and a second PC or tablet display RD2 of a second remote attendant A.diamond. As would be expected in a videoconferencing context, the local display LD most prominently shows a remote speaker selected by the operator or videoconferencing software of the local display PC (in FIG. 19, A.hex), while the two remote displays RD1, RD2 show the views selected by the remote operators or software (e.g., the active speaker's view, the composited view CO of the meeting camera 100).

While the arrangement of attendees within the master and thumbnail views to some extent depends upon user selections and even automated selections within a videoconferencing or video chat system, in the example in FIG. 19, the local display LD shows, as would be typical, a master view in which a last selected remote attendee is shown (e.g., A.hex, the attendee working with a PC or laptop having remote display RD1), and a thumbnail row in which essentially all attendees are represented (including a composited stage view from the local meeting camera 100). The remote displays RD1 and RD2 each show, in contrast, a master view including the composited stage view CO, STG (e.g., because the speaker SPKR is currently speaking) with a thumbnail row again inclu9ing the remaining attendee views.

FIG. 19 makes the assumption that attendee M3 has spoken already, or was previously selected as a default occupant of the stage STG, and occupies the most relevant sub-scene already (e.g., was the most recently relevant sub-scene). As shown in FIG. 19, a sub-scene SS1 corresponding to speaker M2 (icon figure M2, and in Remote Display 2, silhouette M2 with an open mouth) is composited to the single camera view with a sliding transition (represented by the block arrow). A preferred sliding transition starts with zero or negligible width, with the middle, i.e., bearing of interest B1, B2 . . . Bn of the corresponding subscene SS1, SS2 . . . SSn sliding onto the stage, then grows the width of the composited corresponding subscene SS1, SS2 . . . SSn until it reaches at least a minimum width, and may continue to grow the width of the composited corresponding subscene SS1, SS2 . . . SSn until the entire stage is filled. Because the compositing (mid transition) and composited scene is provided as a camera view to the teleconferencing client of the Meeting Room (Local) Display LD, the compositing and composited scenes may be substantially simultaneously (i.e., presented as a current view) presented in the main and thumbnail views of the local client display LD as well as the two remote clients displays RD1, RD2.

Figure 20:
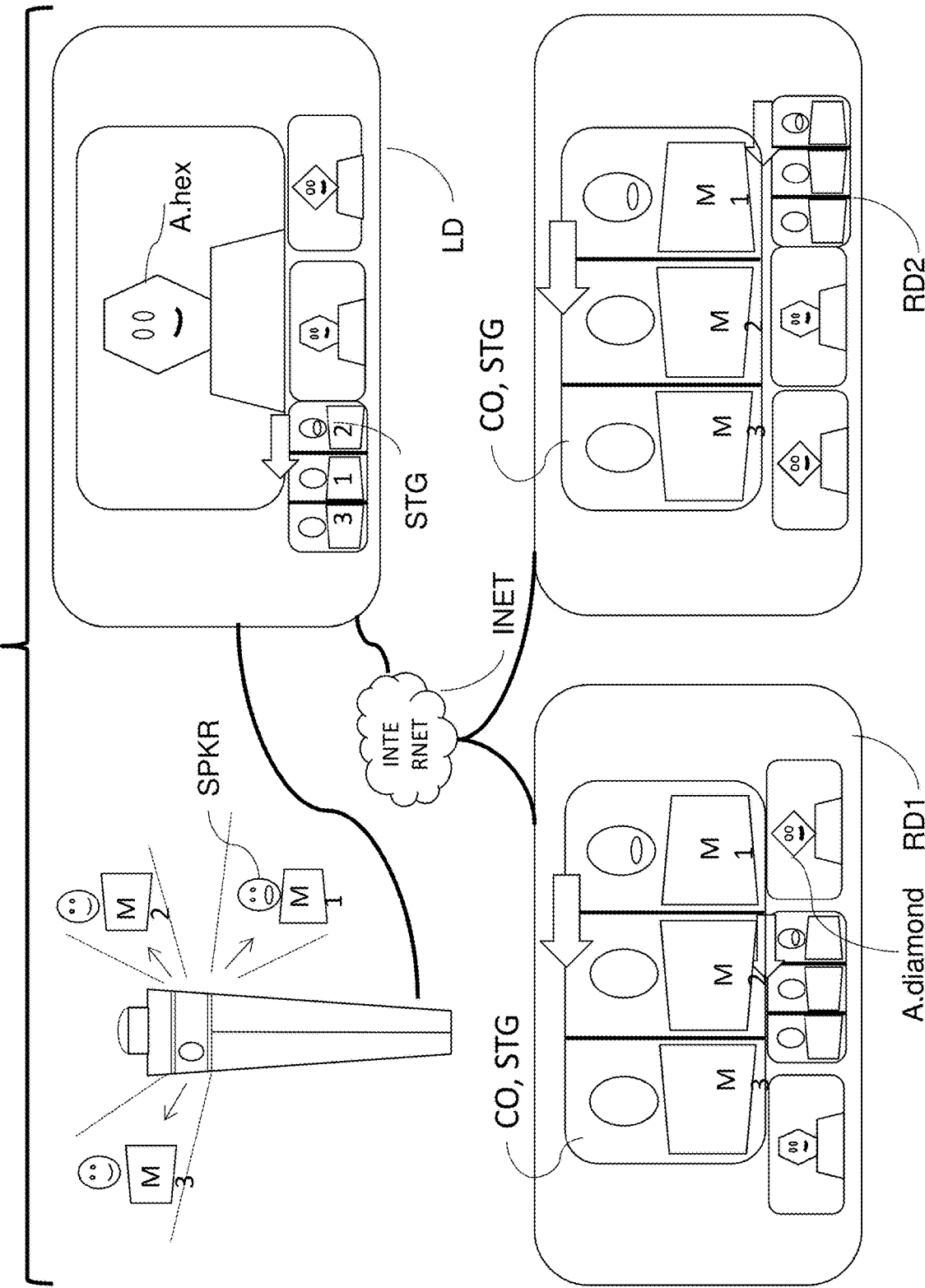

In FIG. 20, subsequent to FIG. 19, attendee M1 becomes the most recent and/or most relevant speaker (e.g., the prior situation was that of FIG. 19, where attendee M2 was the most recent and/or most relevant speaker). The sub-scenes SS3 and SS2 for attendees M3 and M2 remain relevant according to the tracking and identification criteria, and may be re-composited to a smaller width as necessary (either by scaling, or cropping, optionally restricted by the width limitations of 2-12 times interpupillary distance and otherwise as discussed herein). The sub-scene SS2 is similarly composited to a compatible size, and is then composited onto the stage STG with a slide transition (represented again by the block arrow). As noted herein with respect to FIG. 9, FIGS. 10A-10B, and FIGS. 11A-11B, because the new speaker SPKR is attendee M1, which is to the right (from a top down perspective, clockwise) of the bearing of the already displayed attendee M2, it is optional to transition the sub-scene SS1 onto the stage in a manner that preserves the handedness or order (M3, M2, M1) from left to right, in this case a transition from the right.

Figure 21:
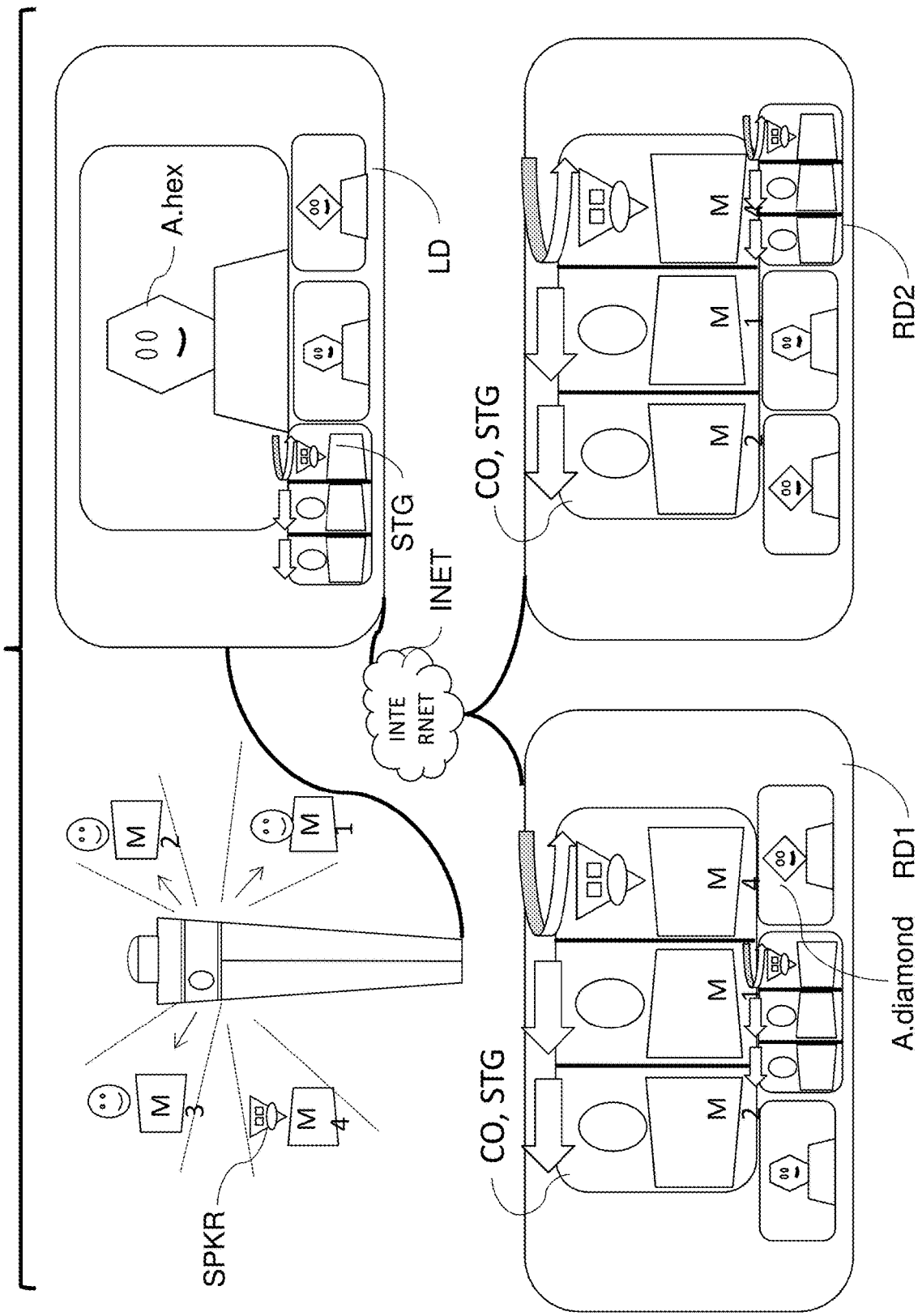

In FIG. 21, subsequent to FIG. 20, new attendee M4 arriving in the room becomes the most recent and most relevant speaker. The sub-scenes SS2 and SS1 for speakers M2 and M1 remain relevant according to the tracking and identification criteria, and remain composited to the "3 on 1" width. The sub-scene corresponding to speaker M3 is "aged out" and is no longer as relevant as the most recent speakers (although many other priorities and relevancies are described herein). The sub-scene SS4 corresponding to speaker M4 is composited to a compatible size, and is then composited to the camera output with a flip transition (represented again by the block arrow), sub-scene SS3 being flipped out as a removal. This may be a slide or alternative transition as well. Although not shown, as an alternative, because the new speaker SPKR is attendee M4, which is to the left (from a top down perspective, clockwise) of the bearing of the already displayed attendees M2, and M1, it is optional to transition the sub-scene SS4 onto the stage in a manner that preserves the handedness or order (M4, M2, M1) from left to right, in this case a transition from the left. In this case, the sub-scenes SS2, SS1 may each transition one place over to the right, and sub-scene M3 may exit (slide transition away) stage right.

As noted herein, FIGS. 19-21 show example local and remote videoconferencing modes on, as an example, mobile devices, in which the composited, tracked, and/or displayed composited scenes have been received and are displayed as a single camera scene. These are referred to and described in context in previous paragraphs.

Figure 22:
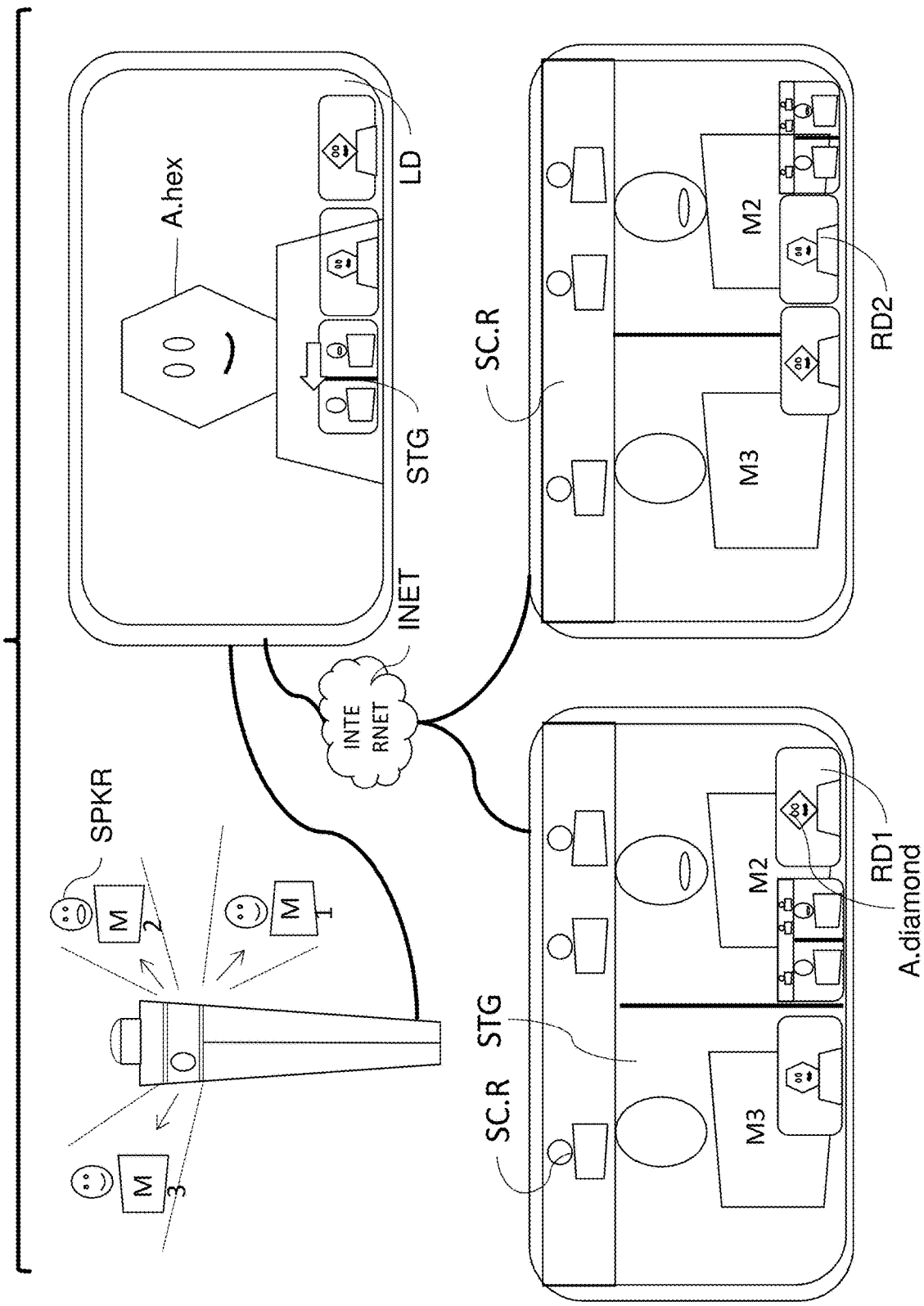
FIG. 22 shows a variation of the system of FIGS. 19-21, in which the videoconferencing client uses overlapping video views instead of discrete, neighboring views.

While the overall information is similar, FIG. 22 presents a form of displaying videoconferencing that is a variation on the form of FIG. 19. In particular, while in FIG. 19 the thumbnail views do not overlap the master view, and a thumbnail view matching the master view is retained within the thumbnail row, in the form of FIG. 22 the thumbnails overlap the master view (e.g., are composited to be superimposed upon the master view), and the current master view is de-emphasized in the thumbnail row (e.g., by dimming or the like).

Figure 23:
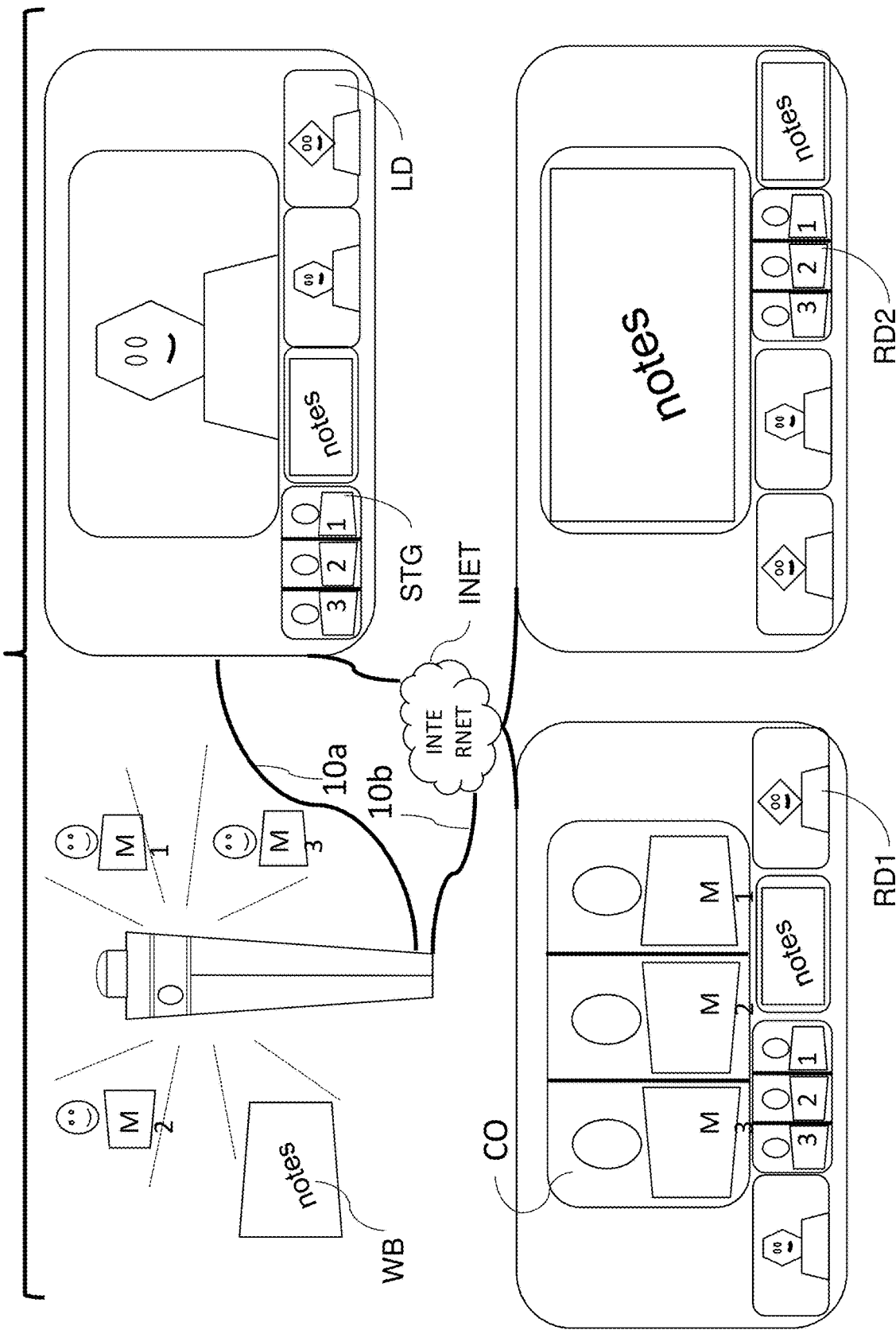
FIG. 23 shows a variation of the system of FIGS. 19-21, substantially corresponding to FIGS. 6A-6B, including a high-resolution camera view for a whiteboard.

FIG. 23 shows a variation of FIGS. 19-22 in which a fourth client corresponding to a high resolution, close-up, or simply separate camera 7 has its own client connected to the teleconferencing group via network interface 10b, while a Composited Output CO and its transitions is presented to the Meeting Room (Local) display LD via network interface 10a.

FIG. 24 shows a variation of FIGS. 19-22 in which a code or document reviewing client having a text review window connects to the meeting camera 100 via local wireless connection (although in a variation, the code or document reviewing client could connect via the internet from a remote station). In one example, a first device or client (PC or tablet) runs the videoconferencing or chat client showing the attendees in a panoramic view, and a second client or device (PC or tablet) runs the code or document review client and provides it to the meeting camera 100 as a video signal of the same form as a web camera. The meeting camera 100 composites the document window/video signal of the code or document review client to the stage STG as a full-frame sub-scene, and optionally also composites the local panorama scene including the meeting attendees, e.g., above the stage STG. In this manner, the text shown within the video signal is available to all participants in lieu of the individual attendee sub-scenes, but the attendees may still be noted by referring to the panoramic view SC. Although not shown, the meeting camera 100 device may alternatively create, instantiate, or execute a second videoconferencing client to host the document view. Alternative, a high resolution, close-up, or simply separate camera 7 has its own client connected to the teleconferencing group via network interface 10b, while a Composited Output CO and its transitions are presented to the Meeting Room (Local) display via network interface 10a.

Figure 25:
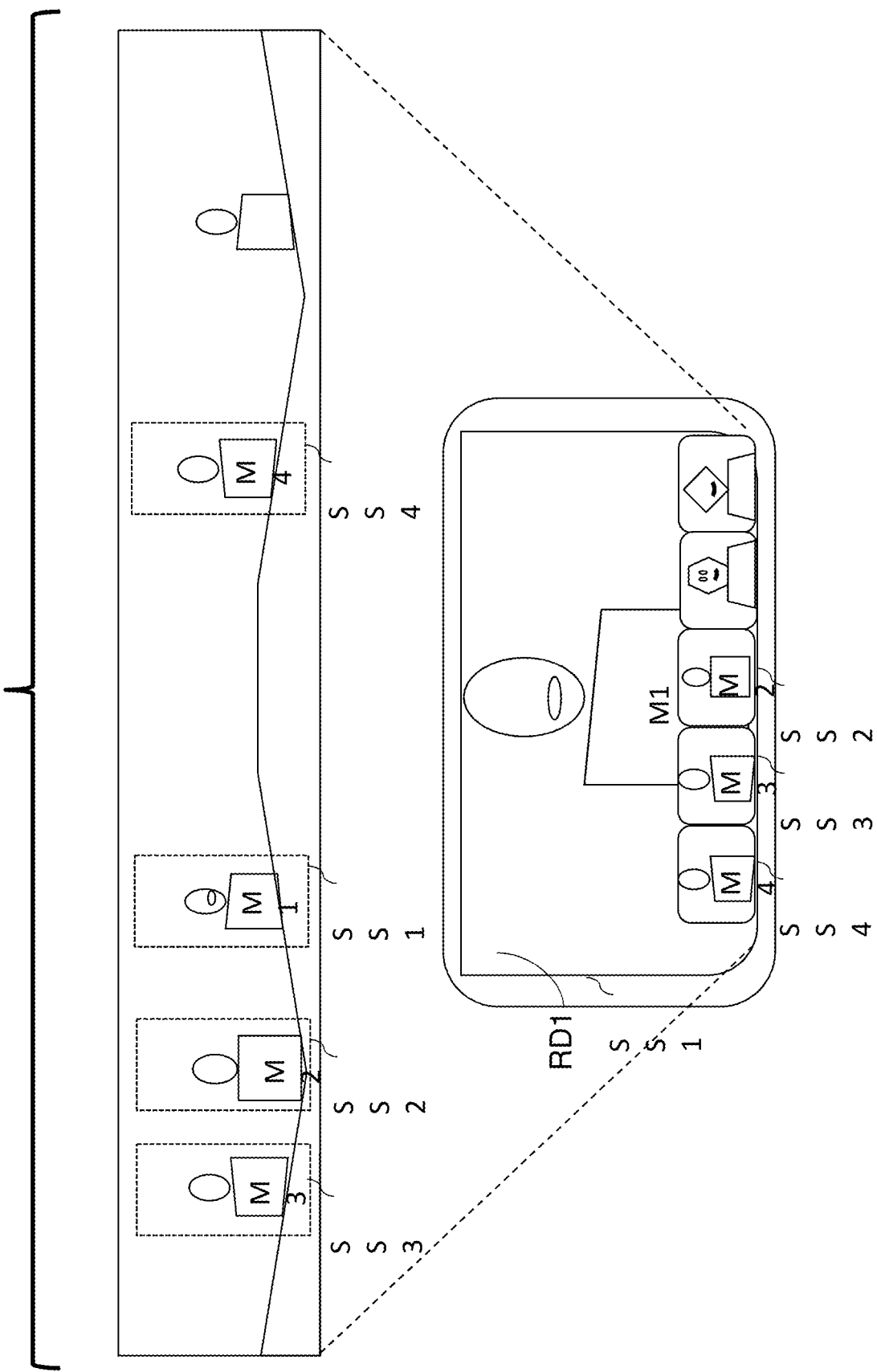
FIG. 25 is a schematic view of an arrangement in which a videoconferencing client is instantiated for each sub-scene, using a configuration similar to that of FIG. 1B.

In at least one embodiment, meeting attendants M1, M2 . . . Mn may be shown in the stage scene video signal or composited output STG, CO at all times. As shown in FIG. 25, for example, based on at least face width detections, the processor 6 may could crop faces as face-only subscenes SS1, SS2 . . . SSn and line them up along top or bottom of the stage scene video signal or composited output STG, CO. In this case, it may be desirable for participants using devices such as remote device RD1 to be able to click on or touch (in the case of a touchscreen) a cropped face-only sub-scene SS1, SS2, SSn to communicate to the local display LD to create a stage scene video signal STG concentrating on that person. In one example solution, using a configuration similar to FIG. 1B and directly connected to the internet INET, the meeting camera 100 may create or instantiate an appropriate number of virtual videoconferencing clients and/or assign a virtual camera to each.

Figure 26:
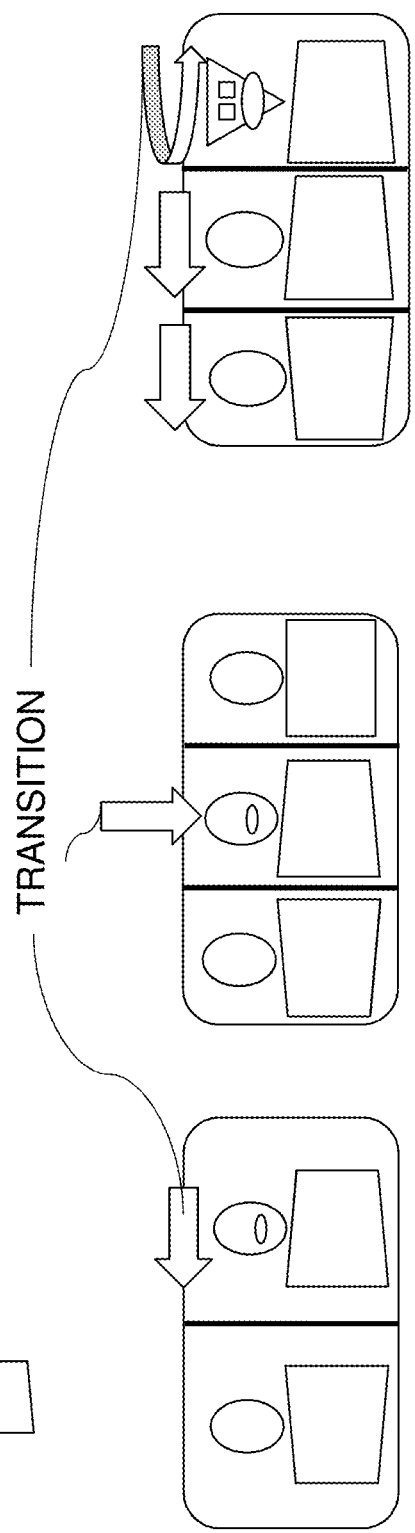
FIG. 26 is a schematic view of some exemplary iconography and symbols used throughout FIGS. 1-26.

FIG. 26 shows some iconography and symbols used throughout FIGS. 1-26. In particular, an arrow extending from the center of a camera lens may correspond to a bearing of interest B1, B2 . . . Bn, whether or not the arrow is so labeled in the various views. Dashed lines extending in an open "V"-like angle from a camera lens may correspond to a field of view of the lens, whether or not the dashed lines are so labeled in the various views. A sketch "stick figure" depiction of a person, having an oval head with a square or trapezoidal body, may corresponds to a meeting participant, whether or not the sketched person is so labeled in the various views. A depiction of an open mouth on the sketched person may depict a current speaker SPKR, whether or not the sketched person with the open mouth is so labeled in the various views. A broad arrow extending from left to right, from right to left, from top to bottom, or in a spiral shape may indicate an ongoing transition or compositing of a transition, whether or not the arrow is so labeled in the various views.

In the present disclosure, "wide angle camera" and "wide scene" is dependent on the field of view and distance from subject, and is inclusive of any camera having a field of view sufficiently wide to capture, at a meeting, two different persons that are not shoulder-to-shoulder.

"Field of view" is the horizontal field of view of a camera, unless vertical field of view is specified. As used herein, "scene" means an image of a scene (either still or motion) captured by a camera. Generally, although not without exception, a panoramic "scene" SC is one of the largest images handled by the system, whether that image is captured by a single camera or stitched from multiple cameras. The most commonly referred to scenes SC referred to herein include a scene SC which is a panoramic scene SC captured by a camera coupled to a fisheye lens, a camera coupled to a panoramic optic, or an equiangular distribution of overlapping cameras. Panoramic optics may substantially directly provide a panoramic scene to an camera; in the case of a fisheye lens, the panoramic scene SC may be a horizon band in which the perimeter or horizon band of the fisheye view has been isolated and dewarped into a long, high aspect ratio rectangular image; and in the case of overlapping cameras, the panoramic scene may be stitched and cropped (and potentially dewarped) from the individual overlapping views. "Sub-scene" means a sub-portion of a scene, e.g., a contiguous and usually rectangular block of pixels smaller than the entire scene. A panoramic scene may be cropped to less than 360 degrees and still be referred to as the overall scene SC within which sub-scenes are handled.

As used herein, an "aspect ratio" is discussed as a H:V horizontal:vertical ratio, where a "greater" aspect ratio increases the horizontal proportion with respect to the vertical (wide and short). An aspect ratio of greater than 1:1 (e.g., 1.1:1, 2:1, 10:1) is considered "landscape-form", and for the purposes of this disclosure, an aspect of equal to or less than 1:1 is considered "portrait-form" (e.g., 1:1.1, 1:2, 1:3). A "single camera" video signal is formatted as a video signal corresponding to one camera, e.g., such as UVC, also known as "USB Device Class Definition for Video Devices" 1.1 or 1.5 by the USB Implementers Forum, each herein incorporated by reference in its entirety (see, i.e., http://www.usb.org/developers/docs/devclass_docs/USB_Video_Class_1_5.zip USB_Video_Class_1_1_90711.zip at the same URL). Any of the signals discussed within UVC may be a "single camera video signal", whether or not the signal is transported, carried, transmitted or tunneled via USB.

A "display" means any direct display screen or projected display. A "camera" means a digital imager, which may be a CCD or CMOS camera, a thermal imaging camera, or an RGBD depth or time-of-flight camera. The camera may be a virtual camera formed by two or more stitched camera views, and/or of wide aspect, panoramic, wide angle, fisheye, or catadioptric perspective.

A "participant" is a person, device, or location connected to the group videoconferencing session and displaying a view from a web camera; while in most cases an "attendee" is a participant, but is also within the same room as a meeting camera 100. A "speaker" is an attendee who is speaking or has spoken recently enough for the meeting camera 100 or related remote server to identify him or her; but in some descriptions may also be a participant who is speaking or has spoken recently enough for the videoconferencing client or related remote server to identify him or her.

"Compositing" in general means digital compositing as is known in the art, i.e., digitally assembling multiple video signals (and/or images or other media objects) to make a final video signal, including techniques such as alpha compositing and blending, anti-aliasing, node-based compositing, keyframing, layer-based compositing, nesting compositions or comps, deep image compositing (using color, opacity, and depth using deep data, whether function-based or sample-based). Compositing is an ongoing process including motion and/or animation of sub-scenes each containing video streams, e.g., different frames, windows, and subscenes in an overall stage scene may each display a different ongoing video stream as they are moved, transitioned, blended or otherwise composited as an overall stage scene. Compositing as used herein may use a compositing window manager with one or more off-screen buffers for one or more windows or a stacking window manager. Any off-screen buffer or display memory content may be double or triple buffered or otherwise buffered. Compositing may also include processing on either or both of buffered or display memory windows, such as applying 2D and 3D animated effects, blending, fading, scaling, zooming, rotation, duplication, bending, contortion, shuffling, blurring, adding drop shadows, glows, previews, and animation. It may include applying these to vector-oriented graphical elements or pixel or voxel-oriented graphical elements. Compositing may include rendering pop-up previews upon touch, mouse-over, hover or click, window switching by rearranging several windows against a background to permit selection by touch, mouse-over, hover, or click, as well as flip switching, cover switching, ring switching, Exposé switching, and the like. As discussed herein, various visual transitions may be used on the stage—fading, sliding, growing or shrinking, as well as combinations of these. "Transition" as used herein includes the necessary compositing steps.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium may be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

All of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors or circuitry or collection of circuits, e.g. a module) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

What is claimed is:

1. A method of compositing and outputting a video signal, comprising:
    recording a panoramic video signal having an aspect ratio of substantially 2.4:1 or greater, captured from a wide camera having a horizontal angular field of view of substantially 90 degrees or greater;
    subsampling at least two sub-scene video signals at respective bearings of interest from the wide camera;
    compositing the at least two sub-scene video signals side-by-side to form a stage scene video signal having an aspect ratio of substantially 2:1 or less, wherein more than 80% of the area of the stage scene video signal is subsampled from the panoramic video signal, wherein the widths of the sub-scene video signals within the stage scene video signal are composited to change according to an activity criterion detected at at least one bearing of interest corresponding to a sub-scene video signal, while a width of the stage scene video signal is kept constant, wherein compositing the at least two sub- scene video signals comprises setting a width of each of the at least two sub-scene video signals based on a face width, a shoulder width, or a motion width of a person recognized along a bearing of interest corresponding to the sub-scene video signal, wherein the face width and the shoulder width are set according to an interpupillary distance of the person recognized along a bearing of interest corresponding to the sub-scene video signal;
    outputting the stage scene video signal formatted as a single camera video signal;
    subsampling at least one additional sub-scene video signal at a respective bearing of interest from the panoramic video signal; and
    compositing the at least two sub-scene video signals together with the at least one additional sub-scene video signal to form the stage scene video signal having an aspect ratio of substantially 2:1 or less including a plurality of side-by-side sub-scene video signals,
    wherein compositing the at least two sub-scene video signals together with the at least one additional sub-scene video signal to form the stage scene video signal comprises:
        transitioning the at least one additional sub-scene video signal into the stage scene video signal by reducing a width of at least one of the at least two sub- scene video signals by an amount corresponding to the width of the at least one additional sub-scene video signal such that the stage scene video signal includes both the at least two sub-scene video signals and the at least one additional sub-scene video.

2. The method according to claim 1, wherein compositing at least two sub-scene video signals together with the at least one additional sub-scene video signals to form a stage scene video signal comprises:
    transitioning the at least one additional sub-scene video signal into the stage scene video signal by replacing at least one of the at least two sub-scene video signals to form a stage scene video signal having an aspect ratio of substantially 2:1 or less.

3. The method according to claim 2, wherein each sub-scene video signal is assigned a minimum width, and upon completing each respective transition into the stage scene video signal, each sub-scene video signal is composited side-by-side at substantially no less than its minimum width to form the stage scene video signal.

4. The method according to claim 3, wherein a composited width of each respective sub-scene video signal being transitioned increases throughout the transition until the composited width is substantially equal to or greater than the corresponding respective minimum width.

5. The method according to claim 3, wherein each sub-scene video signal is composited side-by-side at substantially no less than its minimum width, and each at a respective width at which the sum of all composited sub-scene video signals substantially equals a width of the stage scene video signal.

6. The method according to claim 1, wherein the activity criterion comprises one or more of visual motion, sensed motion, and acoustic detection of speech detected at at least one bearing of interest corresponding to a sub-scene video signal.

7. The method according to claim 1, wherein each sub-scene video signal is assigned a respective minimum width, each sub-scene video signal is composited side-by-side at substantially no less than the corresponding respective minimum width to form the stage scene video signal, and when a sum of the respective minimum widths of the at least two sub-scene video signals together with the at least one additional sub-scene video signals exceeds a width of the stage scene video signal, at least one of the at least two sub-scene video signals is transitioned to be removed from the stage scene video signal.

8. The method according to claim 7, further wherein the at least one of the two sub-scene video signals that is transitioned to be removed from the stage scene video signal corresponds to a respective bearing of interest at which an activity criterion was least recently satisfied.

9. The method according to claim 7, wherein a left to right order with respect to the wide camera among respective bearings of interest of the at least two sub-scene video signals and the at least one additional sub-scene video signal is preserved as the at least two sub-scene video signals are composited together with the at least one additional sub-scene video signals to form the stage scene video signal.

10. The method according to claim 1, wherein each respective bearing of interest from the panoramic video signal is selected dependent upon a selection criterion detected at the respective bearing of interest with respect to the wide camera, and further comprising:

after a selection criterion is no longer true, transitioning the corresponding sub-scene video signal to be removed from the stage scene video signal.

11. The method according to claim 10, wherein the selection criteria includes the presence of an activity criterion satisfied at the respective bearing of interest, and further comprising:

counting time since the activity criterion was satisfied at the respective bearing of interest, wherein a predetermined period of time after the activity criterion was satisfied at the respective bearing of interest, the respective sub-scene signal is transitioned to be removed from the stage scene video signal.

12. The method according to claim 1, further comprising:
subsampling a reduced panorama video signal of substantially 8:1 aspect ratio or greater from the panoramic video signal; and
compositing the at least two sub-scene video signals together with the reduced panorama video signal to form a stage scene video signal having an aspect ratio of substantially 2:1 or less including a plurality of side-by-side sub-scene video signals and the panoramic video signal.

13. The method according to claim 12, further comprising:
compositing the at least two sub-scene video signals together with the reduced panorama video signal to form a stage scene video signal having an aspect ratio of substantially 2:1 or less including a plurality of side-by-side sub-scene video signals and the panoramic video signal above the plurality of side-by-side sub-scene video signals, the panoramic video signal being no more than ⅕ of the area of the stage scene video signal and extending substantially across the width of the stage scene video signal.

14. The method according to claim 12, further comprising:
subsampling a text video signal from a text document; and
transitioning the text video signal into the stage scene video signal by replacing at least one of the at least two sub-scene video signals with the text video signal.

15. The method according to claim 2, further comprising:
setting at least one of the at least two sub-scene video signals as a protected sub-scene video signal protected from transition based on a retention criterion, wherein transitioning the at least one additional sub-scene video signal into the stage scene video signal by replacing at least one of the at least two sub-scene video signals transitions a sub-scene video signal other than the protected sub-scene.

16. The method according to claim 1, further comprising setting a sub-scene emphasis operation based on an emphasis criterion, wherein at least one of the at least two sub-scene video signals is emphasized according to the sub-scene emphasis operation based on a corresponding emphasis criterion.

17. The method according to claim 1, further comprising:
setting a sub-scene participant notification operation based on a sensed criterion from a sensor, wherein a local reminder indicium is activated according to the notification operation based on a corresponding sensed criterion.

18. The method according to claim 1, wherein the panoramic video signal has an aspect ratio of substantially 8:1 or greater, captured from a wide camera having a horizontal angular field of view of substantially 360 degrees.

* * * * *